US012574629B2

(12) United States Patent
Yi et al.

(10) Patent No.: US 12,574,629 B2
(45) Date of Patent: Mar. 10, 2026

(54) CAMERA FUNCTION CONTROL METHOD, ELECTRONIC DEVICE, AND STORAGE MEDIUM

(71) Applicant: HONOR DEVICE CO., LTD., Shenzhen (CN)

(72) Inventors: Jie Yi, Shenzhen (CN); Jianli Shao, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 56 days.

(21) Appl. No.: 18/730,904

(22) PCT Filed: Aug. 21, 2023

(86) PCT No.: PCT/CN2023/114101
§ 371 (c)(1),
(2) Date: Jul. 22, 2024

(87) PCT Pub. No.: WO2024/060903
PCT Pub. Date: Mar. 28, 2024

(65) Prior Publication Data
US 2025/0106496 A1      Mar. 27, 2025

(30) Foreign Application Priority Data

Sep. 22, 2022    (CN) .......................... 202211157870.0

(51) Int. Cl.
*H04N 23/62* (2023.01)
*G06F 3/04817* (2022.01)
(Continued)

(52) U.S. Cl.
CPC ......... *H04N 23/62* (2023.01); *G06F 3/04847* (2013.01); *H04N 23/631* (2023.01); *G06F 3/04817* (2013.01); *H04M 1/72403* (2021.01)

(58) Field of Classification Search
CPC .... H04N 23/60; H04N 23/667; H04N 23/631; H04N 23/62; H04N 23/632;
(Continued)

(56) References Cited

U.S. PATENT DOCUMENTS 9,542,087 B2 * 1/2017 Arai .................... G06F 3/04883
9,871,962 B2 * 1/2018 Stricker ............. G06F 3/04886
(Continued)

FOREIGN PATENT DOCUMENTS

CN        108668083 A      10/2018
CN        112153283 A      12/2020
(Continued)

*Primary Examiner* — Pritham D Prabhakher
(74) *Attorney, Agent, or Firm* — WOMBLE BOND DICKINSON (US) LLP

(57) ABSTRACT

This application provides a camera function control method, an electronic device, and a storage medium. The method includes: displaying a first interface of a first camera function of the electronic device; receiving a first operation of a user on the first interface of the first camera function, where the first operation includes a swiping operation; when the swiping operation enters a second region from a first region on the first interface of the first camera function, determining whether a swiping direction corresponding to the swiping operation points to a first function label; if the swiping direction points to the first function label, switching to display a second interface of a second camera function identified by the first function label; and controlling the second camera function to run in response to the swiping operation.

20 Claims, 61 Drawing Sheets

(51) Int. Cl.
    *G06F 3/04847*     (2022.01)
    *H04M 1/72403*     (2021.01)
    *H04N 23/63*     (2023.01)

(58) Field of Classification Search
    CPC ............. G06F 3/04883; G06F 3/04847; G06F
                      3/04817; H04M 1/72403
    USPC ..................................................... 348/333.01
    See application file for complete search history.

(56)            References Cited

U.S. PATENT DOCUMENTS

| | | | | | |
|---|---|---|---|---|---|
| 9,967,455 | B2* | 5/2018 | Wang | ...................... | H04N 23/64 |
| 10,542,205 | B2* | 1/2020 | Stricker | ................. | H04N 23/62 |
| 11,706,521 | B2* | 7/2023 | Manzari | ................. | H04N 23/56 |
| | | | | | 348/216.1 |
| 12,212,884 | B2* | 1/2025 | Dong | ................... | H04N 23/741 |
| 2011/0063236 | A1* | 3/2011 | Arai | ........................ | H04N 23/62 |
| | | | | | 345/173 |
| 2012/0229411 | A1* | 9/2012 | Arai | .................... | G06F 3/04817 |
| | | | | | 345/173 |

| | | | | | |
|---|---|---|---|---|---|
| 2013/0208163 | A1* | 8/2013 | Choi | ...................... | H04N 23/62 |
| | | | | | 348/333.01 |
| 2014/0362274 | A1* | 12/2014 | Christie | ............... | H04N 23/632 |
| | | | | | 715/763 |
| 2016/0127638 | A1* | 5/2016 | Guo | ....................... | H04N 23/62 |
| | | | | | 348/333.02 |
| 2016/0191790 | A1* | 6/2016 | Wang | ................... | H04N 23/633 |
| | | | | | 348/333.01 |
| 2016/0334983 | A1* | 11/2016 | Lee | ...................... | G06F 3/04883 |
| 2017/0257559 | A1* | 9/2017 | Stricker | ............... | H04N 23/631 |
| 2018/0081502 | A1 | 3/2018 | Sangco et al. | | |
| 2018/0213143 | A1* | 7/2018 | Stricker | ................. | H04N 23/62 |
| 2021/0409588 | A1 | 12/2021 | Dong | | |
| 2022/0053142 | A1 | 2/2022 | Manzari et al. | | |
| 2024/0037708 | A1 | 2/2024 | Chen et al. | | |

FOREIGN PATENT DOCUMENTS

| | | | |
|---|---|---|---|
| CN | 112770058 | A | 5/2021 |
| CN | 113840089 | A | 12/2021 |
| CN | 114415927 | A | 4/2022 |
| CN | 114615421 | A | 6/2022 |
| KR | 20180097027 | A | 8/2018 |

\* cited by examiner

TO

CONT.
FROM

TO FIG. 2C

CONT. FROM FIG. 2B

TO

CONT. FROM FIG. 2C

TO FIG. 3B

CONT.
FROM

TO

CONT. FROM FIG. 4B

CONT.
FROM

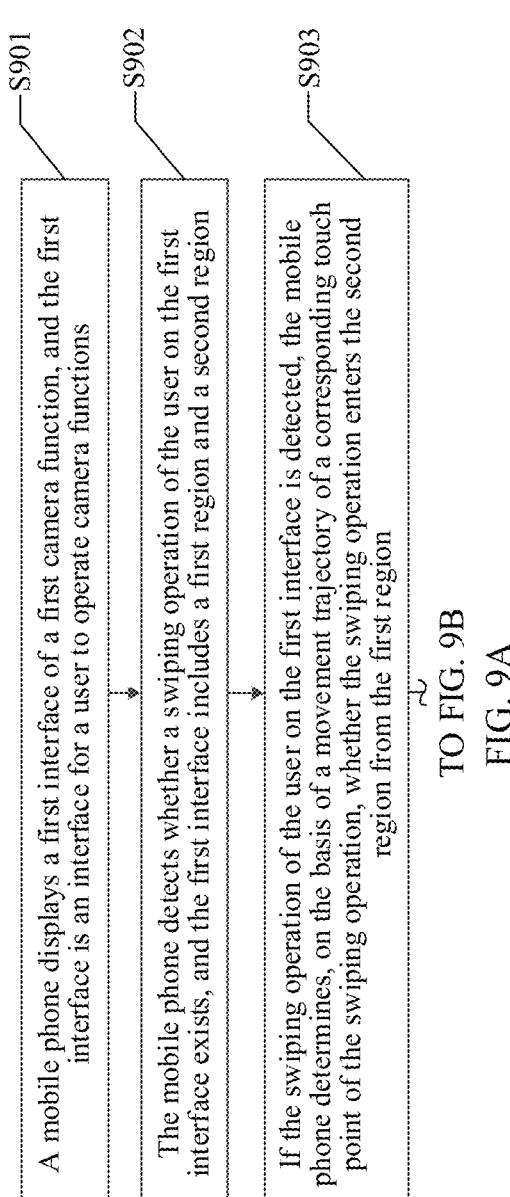

S901

A mobile phone displays a first interface of a first camera function, and the first interface is an interface for a user to operate camera functions

S902

The mobile phone detects whether a swiping operation of the user on the first interface exists, and the first interface includes a first region and a second region

S903

If the swiping operation of the user on the first interface is detected, the mobile phone determines, on the basis of a movement trajectory of a corresponding touch point of the swiping operation, whether the swiping operation enters the second region from the first region

CONT. FROM FIG. 9A

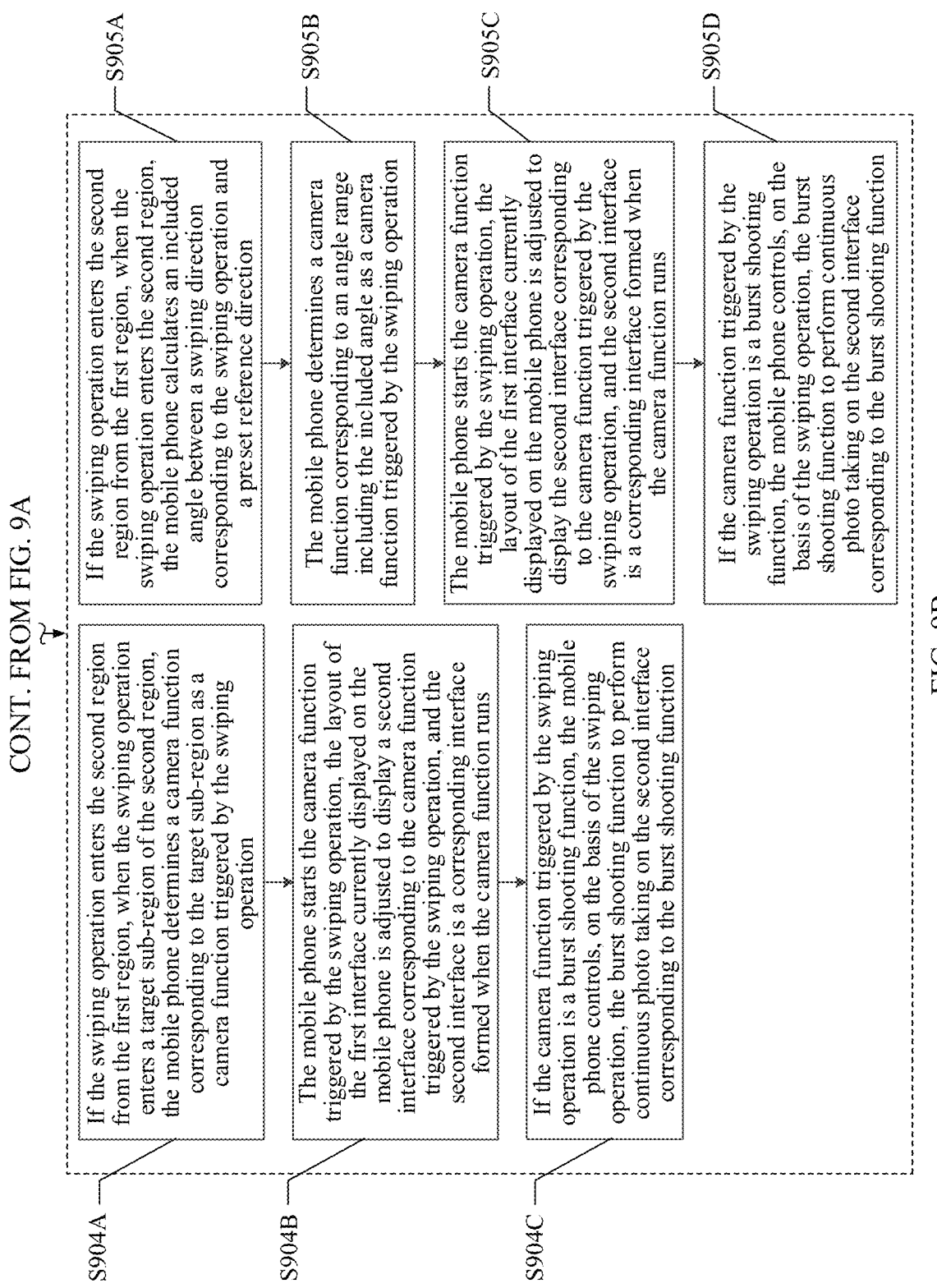

S904A

If the swiping operation enters the second region from the first region, when the swiping operation enters a target sub-region of the second region, the mobile phone determines a camera function corresponding to the target sub-region as a camera function triggered by the swiping operation

S904B

The mobile phone starts the camera function triggered by the swiping operation, the layout of the first interface currently displayed on the mobile phone is adjusted to display a second interface corresponding to the camera function triggered by the swiping operation, and the second interface is a corresponding interface formed when the camera function runs

S904C

If the camera function triggered by the swiping operation is a burst shooting function, the mobile phone controls, on the basis of the swiping operation, the burst shooting function to perform continuous photo taking on the second interface corresponding to the burst shooting function

S905A

If the swiping operation enters the second region from the first region, when the swiping operation enters the second region, the mobile phone calculates an included angle between a swiping direction corresponding to the swiping operation and a preset reference direction

S905B

The mobile phone determines a camera function corresponding to an angle range including the included angle as a camera function triggered by the swiping operation

S905C

The mobile phone starts the camera function triggered by the swiping operation, the layout of the first interface currently displayed on the mobile phone is adjusted to display the second interface corresponding to the camera function triggered by the swiping operation, and the second interface is a corresponding interface formed when the camera function runs

S905D

If the camera function triggered by the swiping operation is a burst shooting function, the mobile phone controls, on the basis of the swiping operation, the burst shooting function to perform continuous photo taking on the second interface corresponding to the burst shooting function

CONT.
FROM

TO

101

Burst shooting

0

104

103

CONT.
FROM

101

Burst shooting

CONT. FROM FIG. 10C

TO

101

Burst shooting

15

104

103

CONT.
FROM

TO FIG. 11B

CONT. FROM FIG. 11A

TO FIG. 11C

CONT.
FROM

TO

101

Burst shooting

0

104

103

CONT.
FROM

101

Burst shooting

CONT. FROM FIG. 11D

TO

FROM

Burst shooting

CONT. FROM FIG. 12A

Portrait burst shooting

0

104

103

CONT.
FROM

TO FIG. 12D

CONT. FROM FIG. 12C

TO

101

Portrait burst shooting

8

104

103

TO

FROM

101

Portrait burst shooting

15

104

103

CONT.
FROM

TO FIG. 13B

CONT. FROM FIG. 13A

TO

CONT.
FROM

TO

Portrait burst shooting

CONT.
FROM

Portrait burst shooting

TO FIG. 13E

CONT. FROM FIG. 13D

TO

Portrait burst shooting

TO

FROM

Portrait burst shooting

15

104

103

CONT.
FROM

CONT.
FROM

CONT. FROM FIG. 14B

101

TO

Portrait

104

103

CONT.
FROM

CONT.
FROM

TO FIG. 16D

CONT. FROM FIG. 17B

CONT.
FROM

CAMERA FUNCTION CONTROL METHOD, ELECTRONIC DEVICE, AND STORAGE MEDIUM

CROSS-REFERENCE TO RELATED APPLICATIONS

This application is a National Stage of International Application No. PCT/CN2023/114101, filed on Aug. 21, 2023, which claims priority to Chinese Patent Application No. 202211157870.0, filed on Sep. 22, 2022, both of which are hereby incorporated by reference in their entireties.

TECHNICAL FIELD

This application relates to the technical field of photography, and in particular, to a camera function control method, an electronic device, and a storage medium.

BACKGROUND

More and more electronic devices are provided with cameras, so that users can carry electronic devices to take photos or record videos anytime and anywhere. Meanwhile, in order to improve user experience, the electronic devices usually provide a variety of camera functions such as a portrait function, a night scene function, a video recording function, and a movie function. If the user needs to use a camera function, the user usually needs to perform such operations: open a camera application→select a certain camera function→operate the camera function to take photos or record videos. When the user needs to capture some pictures of some wonderful moments, the user needs to perform the above operation steps in sequence, and consequently a speed for using a camera by the user is low.

In order to increase the speed for using the camera by the user, a shortcut operation is introduced in the prior art for continuously taking photos or recording videos. For example, after opening the camera application, by taking a shooting button as a starting point of swipe, the user swipes to the left to quickly and continuously take photos, or swipes to the right to quickly record videos. Although this type of manner increases the speed for using the camera by the user to a certain extent, the user needs to remember a camera function corresponding to each swiping direction before use. If the user does not remember the swiping direction or remember the swiping direction incorrectly, it may lead to an operation error, thereby failing to achieve a desired effect of a quick operation.

SUMMARY

This application mainly aims to provide a camera function control method, an electronic device, and a storage medium, to solve the technical problem that an operation speed for a user and user experience are affected because an existing camera function control manner is not convenient and fast enough.

To achieve the above technical objective, this application adopts the following technical solutions.

According to a first aspect, this application provides a camera function control method, applied to an electronic device, where the electronic device includes a plurality of camera functions, a first interface corresponding to the camera function includes a first region and a second region, the first region is a shooting button of a camera, the second region is a region other than the shooting button of the camera, the second region includes a plurality of function labels for identifying the camera function, and the method includes: displaying the first interface of a first camera function of the electronic device: receiving a first operation of a user on the first interface of the first camera function, where the first operation includes a swiping operation: when the swiping operation enters the second region from the first region on the first interface of the first camera function, determining whether a swiping direction corresponding to the swiping operation points to a first function label: if the swiping direction points to the first function label, switching to display a second interface of a second camera function identified by the first function label, where the second interface includes a text indicating the second camera function, a display position of the text is the same as a display position of the first function label; and controlling the second camera function to run in response to the swiping operation that continues to swipe in a direction in which the text of the second camera function is located on the second interface of the second camera function.

In the above method of this application, a new camera function control operation manner is redefined, the operation manner associates the swiping direction with a position of the function label, so that the user only needs to swipe towards a position where a target function label is located, and then a camera function corresponding to the function label can be triggered. In addition, after the user swipes toward the function label, the above second interface is displayed, and the text indicating the second camera function is displayed on the second interface, prompting the user that the camera will run the function, so that the user can know that the camera runs the function after the operation, thereby avoiding misoperation. The display position of the text of the second camera function is the same as the display position of the first function label, which can guide the user to continue to swipe to trigger the second camera function.

Therefore, the operation manner is more flexible for the user, that is, what camera function is triggered when the swipe points to what camera function, and therefore shortcut control can be performed based on any camera function selected by the user, for example, swiping to different directions can correspondingly control the variety of different camera functions. In addition, it is not needed for the user to deliberately remember a correspondence relationship between the swiping direction and the camera function, the user just needs to swipe towards a certain function label, and then a corresponding camera function can be triggered to run, thereby improving the flexibility and the use experience of the user for operating a camera.

In one possible design of the first aspect, the second region includes a plurality of non-overlapping sub-regions, each sub-region covers one function label, and division of each sub-region is related to a relative position between the shooting button and each function label. In the above design, based on the relative position between the shooting button and each function label, the region other than the shooting button is divided into the plurality of non-overlapping sub-regions, and it is ensured that each sub-region correspondingly covers one function label, thereby facilitating the swiping operation of the user. When the user starts to swipe towards a certain function label from the shooting button, as long as the user swipes within the same sub-region, it can be guaranteed to correspondingly trigger a camera function identified by a function label covered by the sub-region, thereby facilitating the swiping operation of the user and improving the convenience of the operation.

In one possible design of the first aspect, when the swiping operation enters the second region from the first region on the first interface of the first camera function, the determining whether a swiping direction corresponding to the swiping operation points to a first function label includes: when the swiping operation enters the second region from the first region on the first interface of the first camera function, determining whether the swiping operation enters a target sub-region of the second region; and if the swiping operation enters the target sub-region of the second region, determining that a function label covered by the target sub-region is the first function label to which the swiping direction corresponding to the swiping operation points. In the above design, the division of the sub-region of the second region conforms to the characteristics of the swiping operation of the user, and even if there exists a certain offset in the swiping operation of the user, it can also be ensured that the function label is accurately pointed to, thereby facilitating the operation of the user and improving the flexibility of camera control.

In one possible design of the first aspect, the second region corresponds to a plurality of non-overlapping angle ranges, each angle range covers one function label, and division of each angle range is related to the relative position between the shooting button and each function label. In the above design, based on the relative position between the shooting button and each function label, the region other than the shooting button is divided into the plurality of non-overlapping angle ranges, and it is ensured that each angle range correspondingly covers one function label, thereby facilitating the swiping operation of the user. When the user starts to swipe towards a certain function label from the shooting button, as long as the user swipes within the same angle range, it can be guaranteed to correspondingly trigger a camera function identified by a function label covered by the sub-region, thereby facilitating the swiping operation of the user and also improving the convenience of the operation.

In one possible design of the first aspect, when the swiping operation enters the second region from the first region on the first interface of the first camera function, the determining whether a swiping direction corresponding to the swiping operation points to a first function label includes: when the swiping operation enters the second region from the first region on the first interface of the first camera function, calculating an included angle between the swiping direction corresponding to the swiping operation and a preset reference direction; and if the angle range includes the included angle, determining that a function label covered by the angle range including the included angle is the first function label to which the swiping direction corresponding to the swiping operation points. In the above design, the division of the angle range of the second region conforms to the characteristics of the swiping operation of the user, and even if there exists a certain offset in the swiping operation of the user, it can also be ensured that the function label is accurately pointed to, thereby facilitating the operation of the user and improving the flexibility of camera control.

In one possible design of the first aspect, the camera function control method further includes: when switching to display the second interface of the second camera function identified by the first function label, hiding related controls displayed on the first interface of the first camera function, where the related controls include all function labels displayed on the first interface of the first camera function. In the above design, since the first interface and the second interface both include a viewfinder frame and the shooting button, when switching the first interface and the second interface, hiding the relevant controls of the first interface can make the user intuitively feel a change of the interface when displaying the second interface, and meanwhile can also make the user know that the swiping operation has triggered a camera shortcut control function, thereby improving the use experience of the user. In addition, displaying text corresponding to the triggered camera function at an original function label position can make the user know the camera function triggered by the current swiping operation, thereby improving the use experience of the user.

In one possible design of the first aspect, the first operation further includes a long-press operation, and the camera function control method further includes: when there exists the long-press operation in the first region on the first interface of the first camera function, determining whether long-press duration of the long-press operation reaches a preset duration threshold: if the long-press duration of the long-press operation reaches the preset duration threshold, switching to display a second interface of a video recording function; and when the long-press duration of the long-press operation exceeds the duration threshold on the second interface of the video recording function, controlling the video recording function to run. In the above design, compared with a photo taking function with a variety of photo taking modes, the video recording function is relatively single, and therefore an additional user operation manner different from that of the photo taking function is provided for the video recording function. The manner is easy to operate and convenient for the user to remember, such that the video recording function can be quickly opened.

In one possible design of the first aspect, the camera function control method further includes: when the long-press operation fails on the second interface of the video recording function, stopping running the video recording function and resuming displaying the first interface of the first camera function. In the above design, when a user raises his/her hand, the long-press operation fails and then video recording ends. Meanwhile, in order to reduce operations of the user and then facilitate continuing to use a shortcut operation function by the user, when the video recording function opened in the manner of this application ends, it is able to automatically resume an operation interface before start at the end, thereby improving the use experience of the user.

In one possible design of the first aspect, the function label is swipeable, and when the user swipes any function label on the first interface of the first camera function, display positions of all the function labels change. In the above design, swiping the function label can make the user operate more camera functions on the same interface. Since the division of the sub-region or the angle range in this application is not fixedly bound to a certain function label, i.e., in different application scenarios, swiping to the same sub-region or angle range can trigger different camera functions, so that the camera control manner of this application can be adapted to a variety of application scenarios, thereby improving the convenience of use for the user.

In one possible design of the first aspect, the camera function control method further includes: obtaining a second function label selected by the user by swiping the function label on the first interface of the first camera function; and switching to display a first interface of a third camera function identified by the second function label. In the above design, operation interfaces corresponding to different function labels can be displayed by swiping the function label, i.e., camera function control can be performed by using the swiping operation manner of this application regardless of the operation interfaces corresponding to the camera functions, thereby facilitating the user for performing a shortcut operation of the camera function in various application scenarios.

In one possible design of the first aspect, the second camera function includes a burst shooting function, the first function label includes a photo taking function label, and the second interface of the second camera function includes: a text of the burst shooting function: the controlling the second camera function to run in response to the swiping operation that continues to swipe in a direction in which the text of the second camera function is located on the second interface of the second camera function includes: controlling the burst shooting function to continuously capture photos in response to the swiping operation that continues to swipe in a direction in which the text of the burst shooting function is located on a second interface of the burst shooting function. In the above design, the burst shooting function specifically includes a photo taking function for continuously taking photos or a portrait function for continuously taking photos. By ways of the swiping operation of the user, the photo taking function or the portrait function is implemented to continuously take photos, thereby forming a new burst shooting function, reducing photo taking operations of the user and improves the use experience of the user.

The camera function control method further includes: when the swiping operation fails or a number of continuously taken photos reaches a preset threshold, stopping running the burst shooting function and resuming displaying the first interface of the first camera function, where the number of continuously taken photos is related to duration of the swiping operation, and the duration includes swiping duration and staying duration of the swiping operation on the second interface of the burst shooting function. The above design gives conditions for exiting from running the camera function, one condition is that the swiping operation fails, for example, the user raises his/her finger, and the second condition is that the number of the continuously taken photos reaches a maximum number. Meanwhile, after the operation ends, it is able to automatically resume displaying an interface before the start, so as to reduce the user operations and facilitate the user for continuing to use the shortcut operation function.

In one possible design of the first aspect, the second camera function includes a portrait function, the first function label includes a portrait function label, and the controlling the second camera function to run in response to the swiping operation that continues to swipe in a direction in which the text of the second camera function is located on the second interface of the second camera function includes: controlling the portrait function to take a photo in response to the swiping operation that continues to swipe in a direction in which text of the portrait function is located on the second interface of the portrait function; and invoking an image processing program adapted to the portrait function to perform image processing on the generated photo and saving a processed photo. In the above design, by ways of the swiping operation, not only can the camera function be triggered in a shortcut manner, but also continuous photo taking can be achieved, thereby reducing the user operations. In addition, in the above design, the generated photos can further be performed image processing, for example, after the photos are taken, an algorithm corresponding to a night scene function is used to process the photos and then save the photos, or an algorithm corresponding to the portrait function is used to perform background blurring, portrait beautification (smoothing and face slimming), and the like on the photos, and then save the processed photos, or a filter in a movie mode is added in a process of recording videos, thereby reducing the user operations and improving the use experience of the user.

In one possible design of the first aspect, the second camera function includes a video recording function, the first function label includes a video recording function label, and the controlling the second camera function to run in response to the swiping operation that continues to swipe in a direction in which the text of the second camera function is located on the second interface of the second camera function includes: controlling the video recording function to record a video in response to the swiping operation that continues to swipe in a direction in which text of the video recording function is located on the second interface of the video recording function; and when the swiping operation fails, switching to display a third interface of the video recording function and continuing to keep the video recording function running. In the above design manner, the user can control, by swiping from the shooting button towards a direction where the video recording function label is located, the video recording function to run, improving the convenience of the user for using the video recording function. In addition, considering that the video recording function has a longer running time compared to the photo taking function, and the video recording function also supports pausing video recording, when the swiping operation fails, for example, when the user raises his/her finger, interface resuming processing is not performed, but switching to display a complete video recording function operation interface and continuing to keep the video recording function running are performed, thereby making it convenient for the user to control a video recording process at any time.

In one possible design of the first aspect, the camera function control method further includes: when a user-triggered command for stopping video recording is received on the third interface of the video recording function, stopping running the video recording function and resuming displaying the first interface of the first camera function. In the above design method, the second interface of the video recording function can display a video recording process shooting button, such as a video recording control button and a pause button. When the user manually clicks the video recording control button to trigger the command for stopping video recording, then it is determined that the true intention of the user is to exit from video recording. Therefore, while stopping running the video recording function, it is able to resume displaying the interface before the start, thereby facilitating subsequent operations of the user and improving the use experience of the user.

According to a second aspect, this application further provides an electronic device, including a processor and a memory, where the processor is configured to invoke a computer program in the memory to perform the camera function control method provided according to the first aspect or any design of the first aspect.

According to a third aspect, this application further provides a computer-readable storage medium, where the computer-readable storage medium stores computer instructions, and the computer instructions, when run on an electronic device, cause the electronic device to perform the camera function control method provided according to the first aspect or any design of the first aspect.

According to a fourth aspect, this application further provides a computer program product, where the computer program product includes computer instructions, and the computer instructions, when run on an electronic device, cause the electronic device to perform the above method.

The effect descriptions of the above second, third and fourth aspects can refer to the effect description of the first aspect, and will not be repeated here.

BRIEF DESCRIPTION OF DRAWINGS

FIG. 9A and FIG. 9B are a schematic flowchart of a camera function control method provided by an embodiment of this application:

DESCRIPTION OF EMBODIMENTS

To make the objectives, technical solutions, and advantages of this application clearer, the following further describes this application with reference to the accompanying drawings.

Terms such as "first", "second" in this specification, claims, and the accompanying drawings of this application are only used to distinguish different objects and are not used to describe a specific sequence. In addition, terms such as "include", "have", and any variant thereof are intended to cover a non-exclusive inclusion. For example, a process, method, system, product, or device or the like that includes a series of steps or units is not limited to the listed steps or units, but further optionally includes a step or unit or the like that is not listed, or further optionally includes another step or unit that is intrinsic to the process, method, product, or device or the like.

Reference to an "embodiment" in this application means that a particular feature, structure, or characteristic described in connection with the embodiment can be included in at least one embodiment of this application. The phrase appearing at different positions of this specification may not refer to the same embodiment or an independent or alternative embodiment that is mutually exclusive with other embodiments. A person skilled in the art can explicitly or implicitly understand that the embodiments described in this application may be combined with other embodiments.

In this application, "at least one (item)" means one or more, "a plurality of" means two or more, "at least two (items)" means two or three or more, and "and/or" is used to describe the association relationship of related objects, indicating that three types of relationships can exist, for example, "A and/or B" can represent: only A exists, only B exists and both A and B exist, where A and B may be singular or plural. The character "/" generally indicates an "or" relationship between the associated objects. "At least one item of the following" or its similar expression is any combination of these items. For example, at least one of a, b, or c may represent: a, b, c, "a and b", "a and c", "b and c", or "a and b and c".

In an embodiment of this application, an electronic device has one or more cameras and is installed with a camera application, which can achieve functions such as taking photos and recording videos. It can be understood that the electronic device can be a mobile phone, a wearable device, a tablet computer, a computer with a wireless transmission and reception function, a virtual reality (virtual reality, VR) terminal device, an augmented reality (augmented reality, AR) terminal device, and so on. The following is a specific example of using a mobile phone to illustrate the electronic device.

Figure 1:
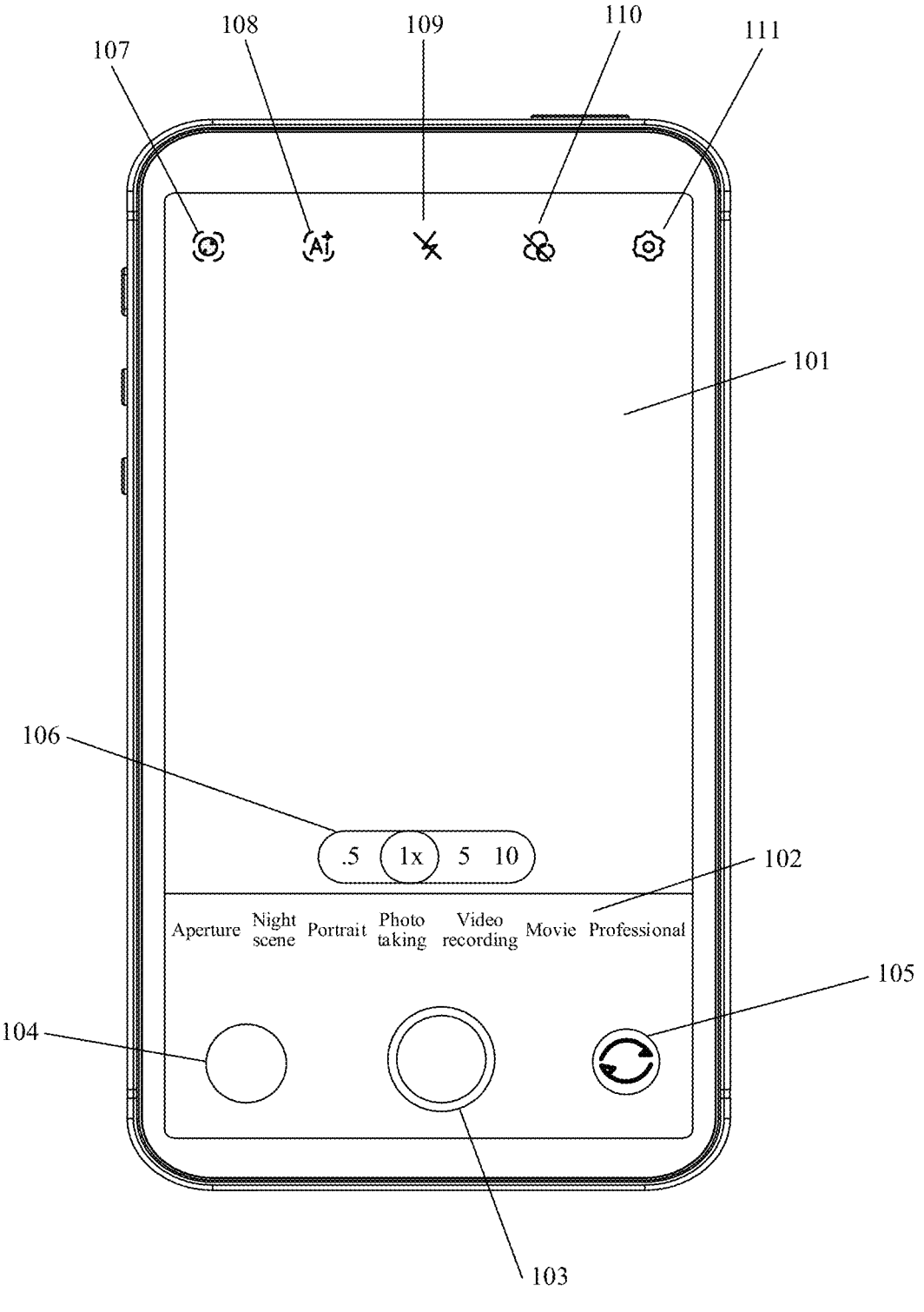
FIG. 1 is a schematic diagram of a camera function interface of a mobile phone provided by an embodiment of this application.
Figures 2A, 2B:
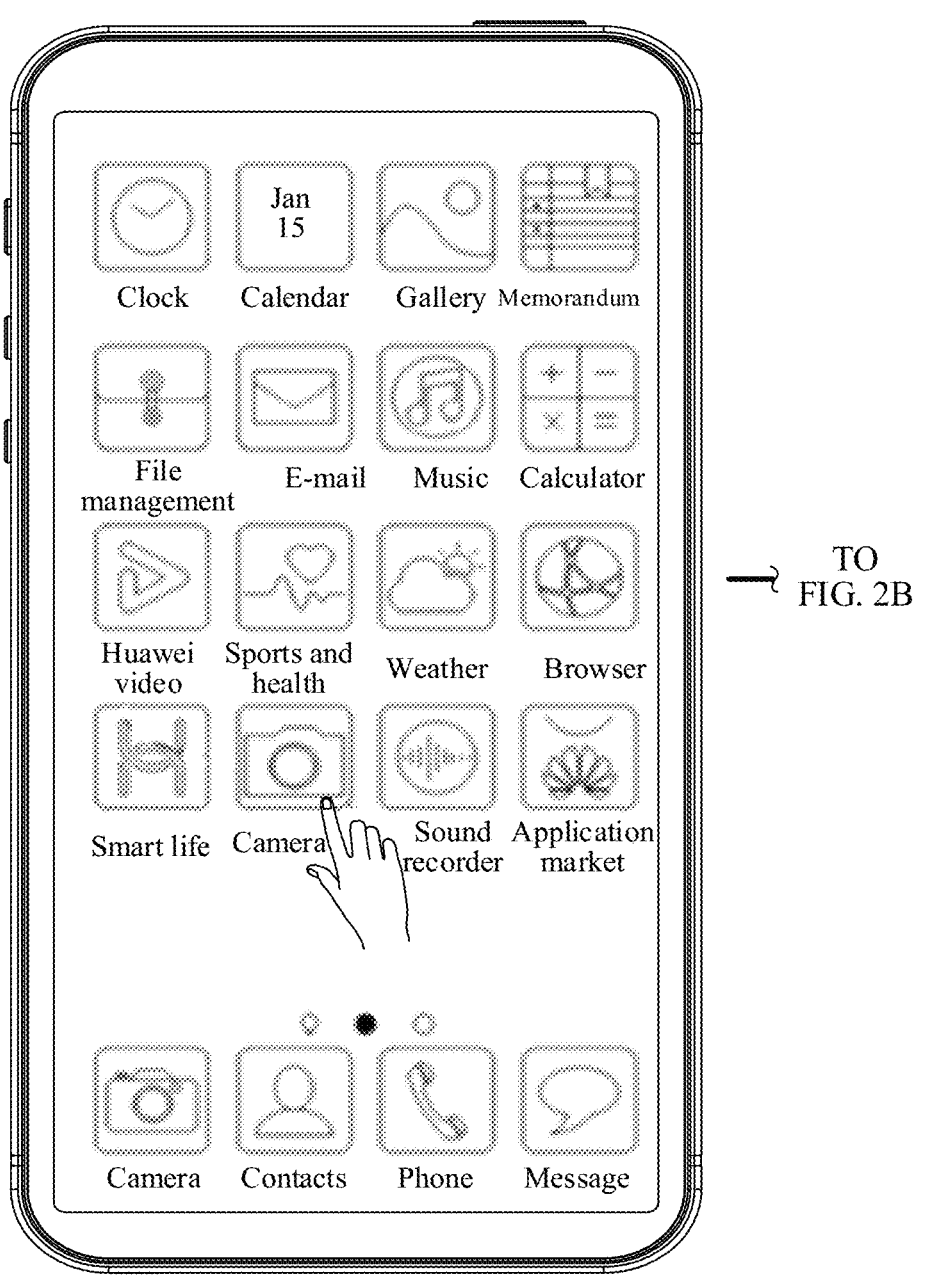
FIG. 2A to FIG. 2D are a schematic flowchart of a user operation of an existing camera function control method.
Figures 2A, 2B:
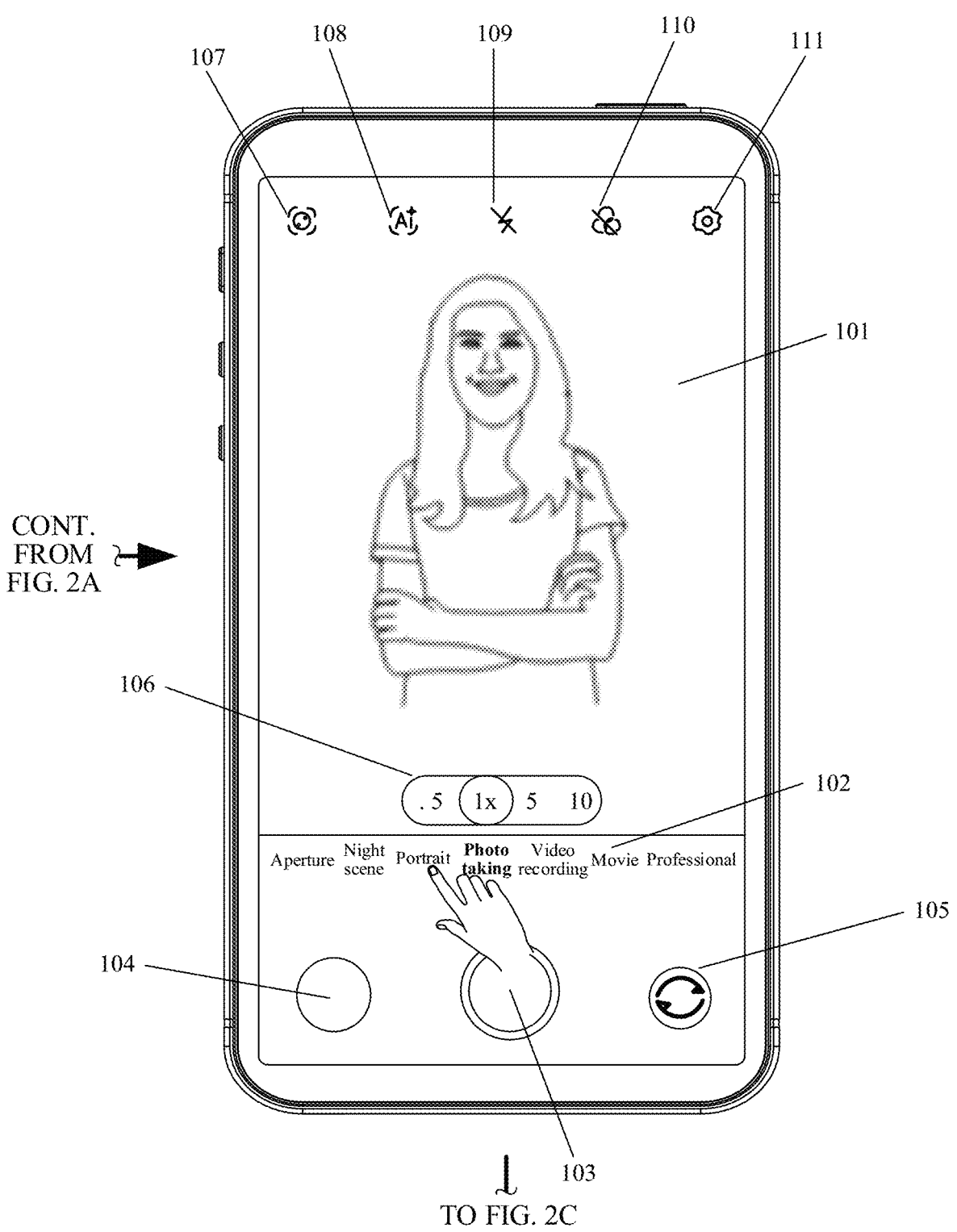
Figures 2C, 2D:
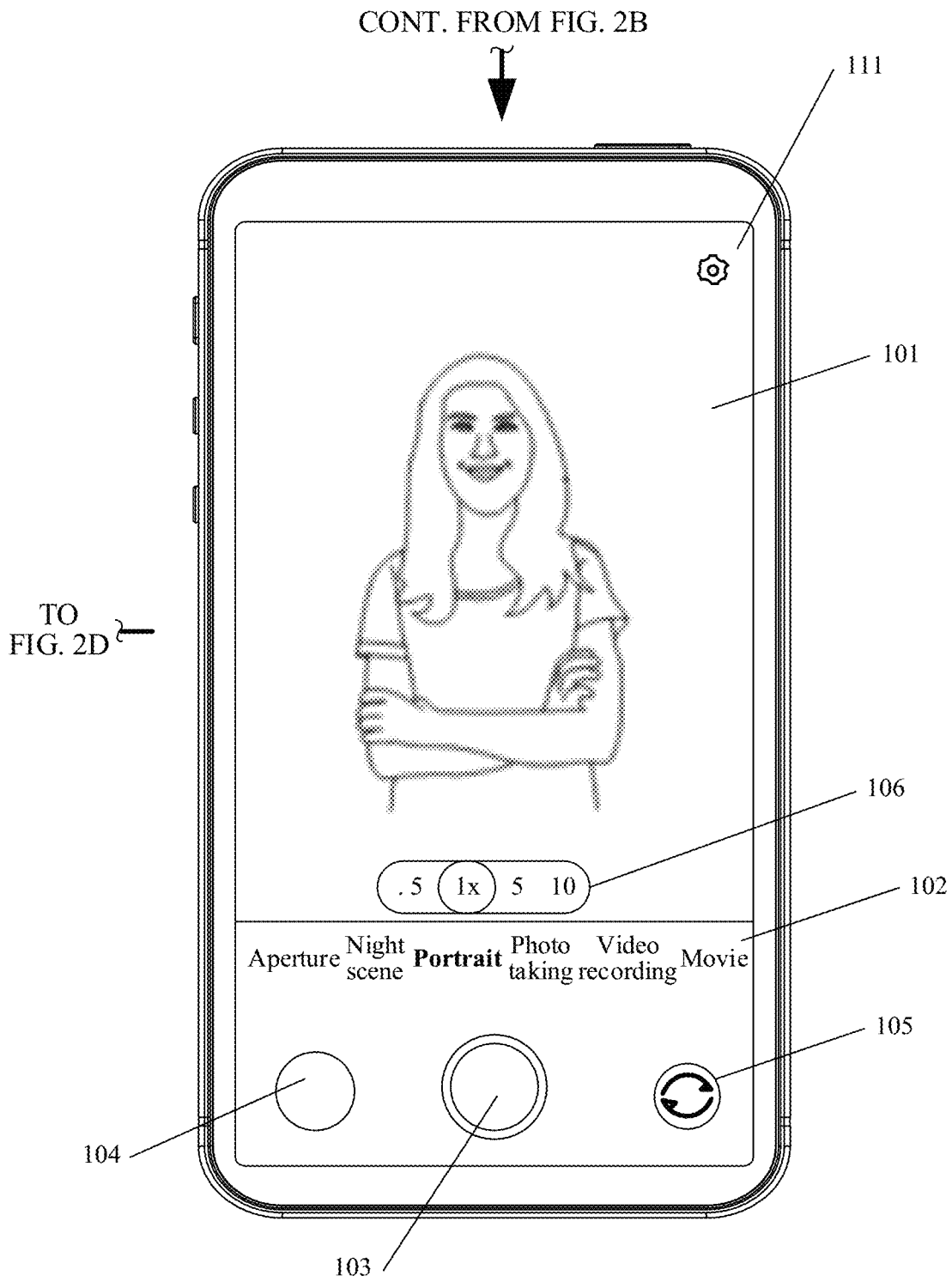
Figure 2D:
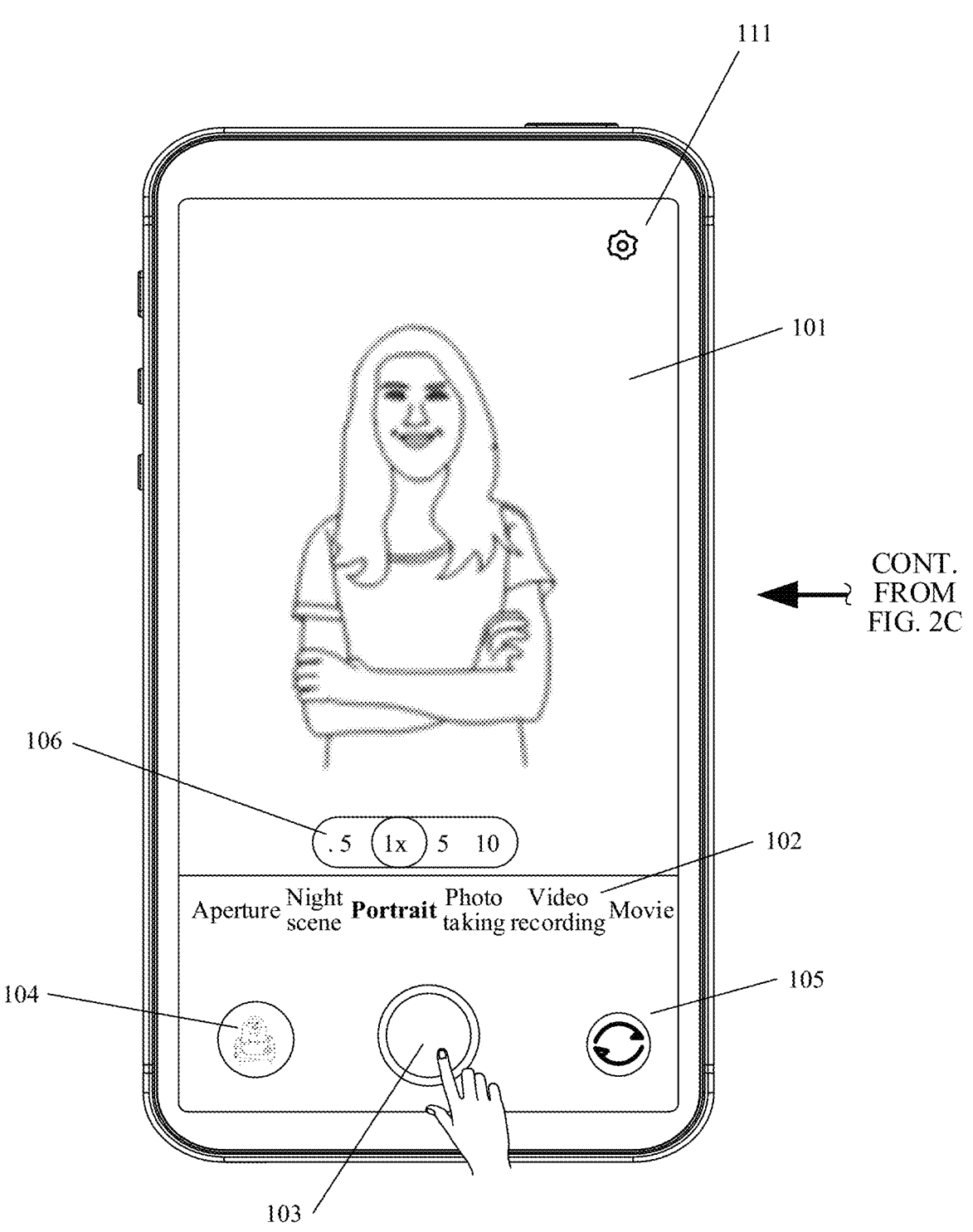
Figure 3A:
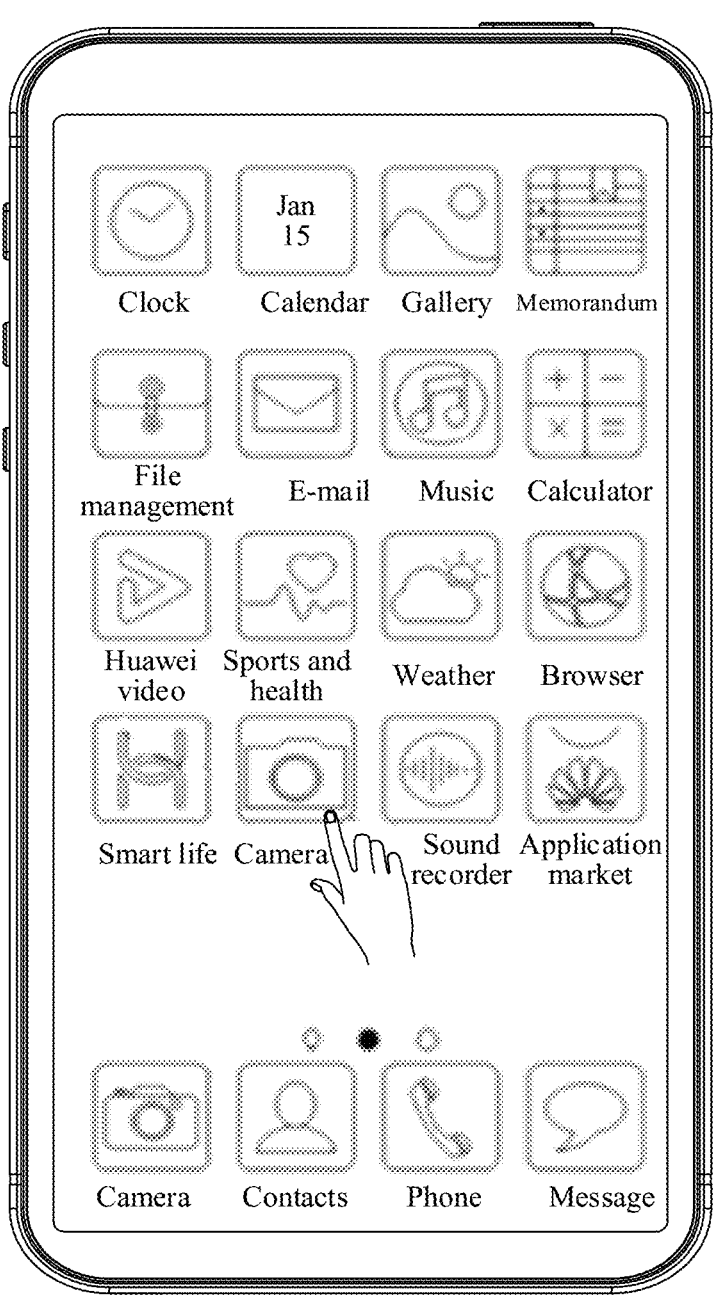
FIG. 3A to FIG. 3D are another schematic flowchart of a user operation of an existing camera function control method.
Figure 3B:
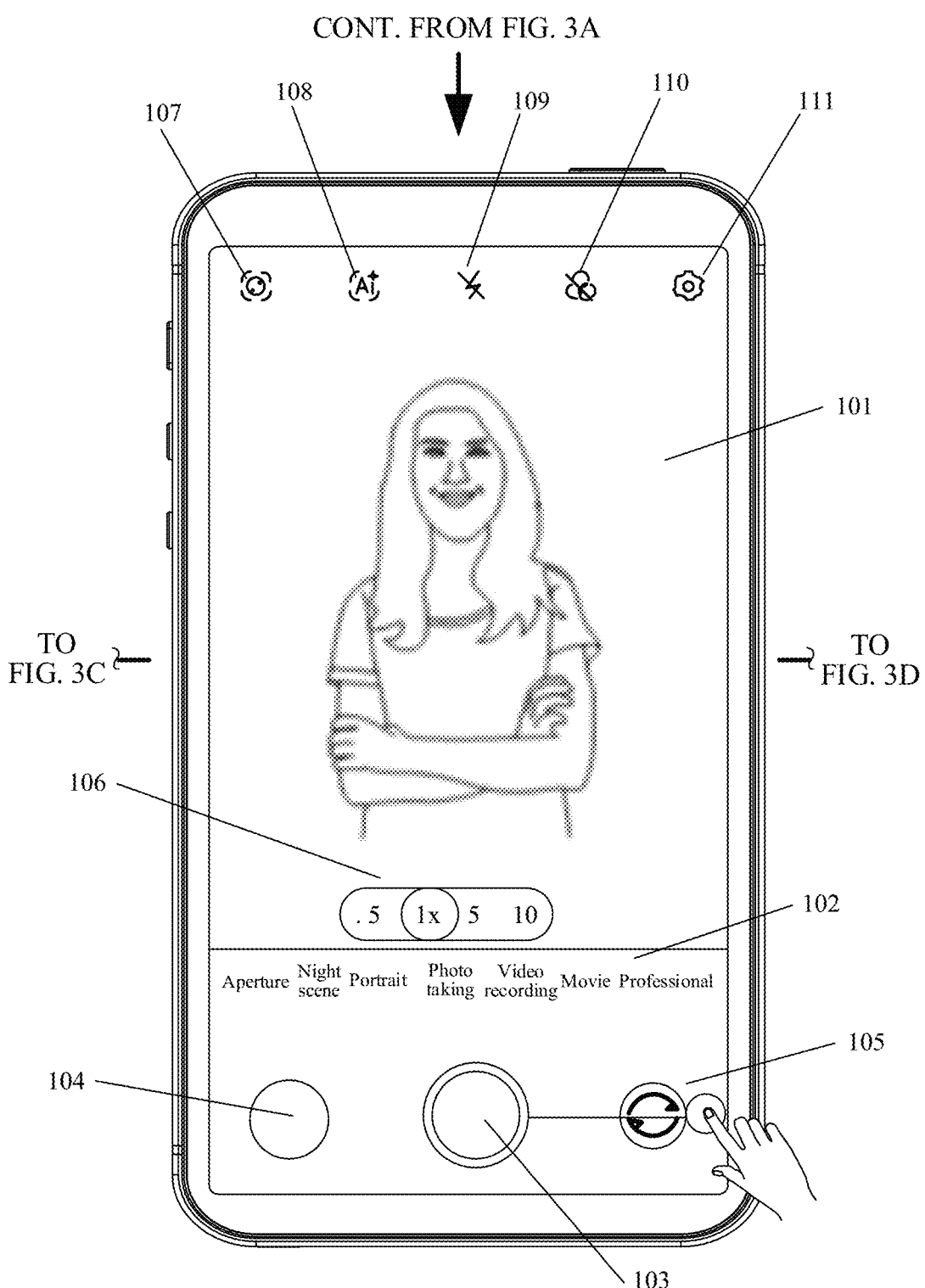
Figures 3B, 3C:
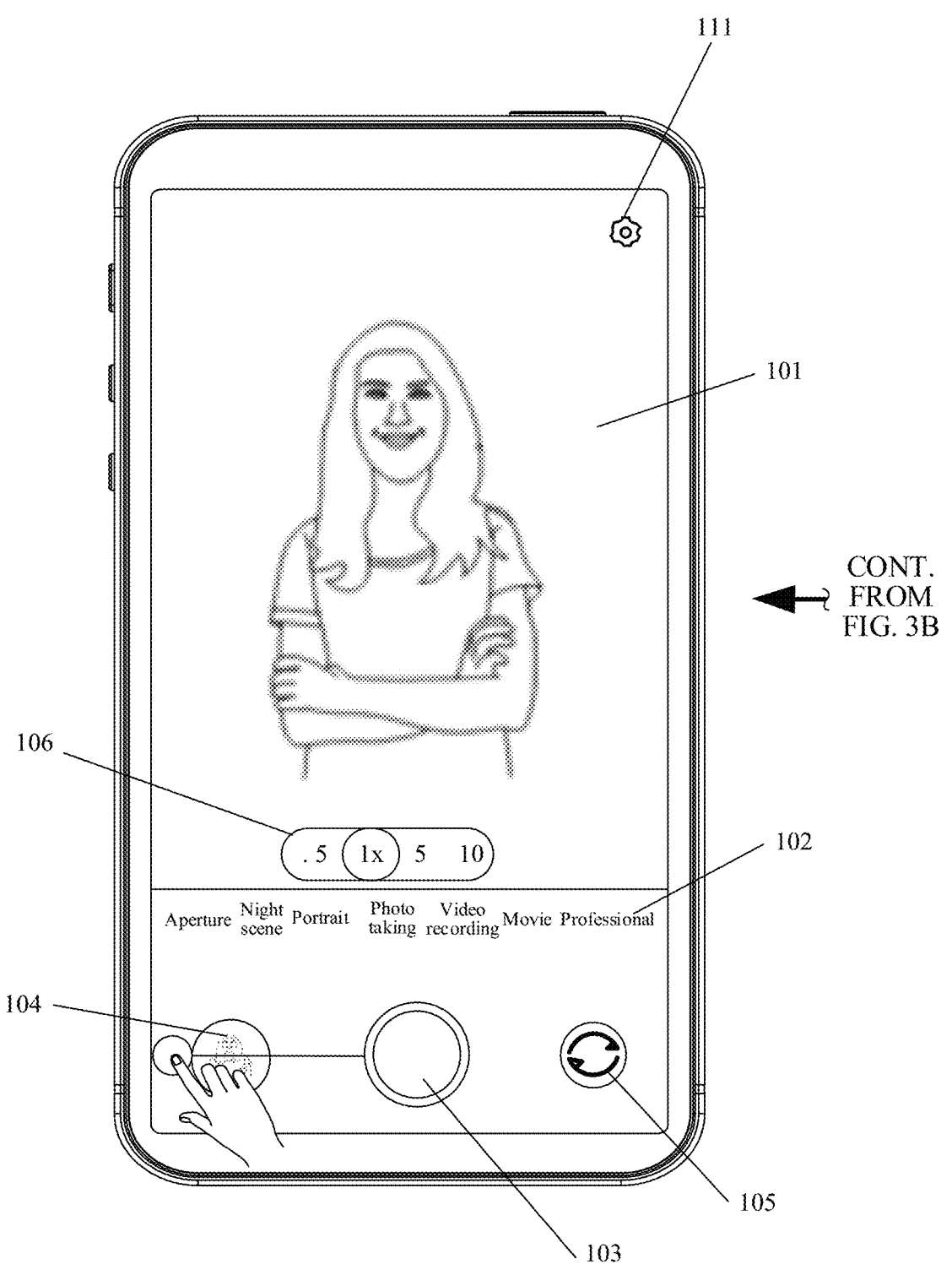
Figure 3D:
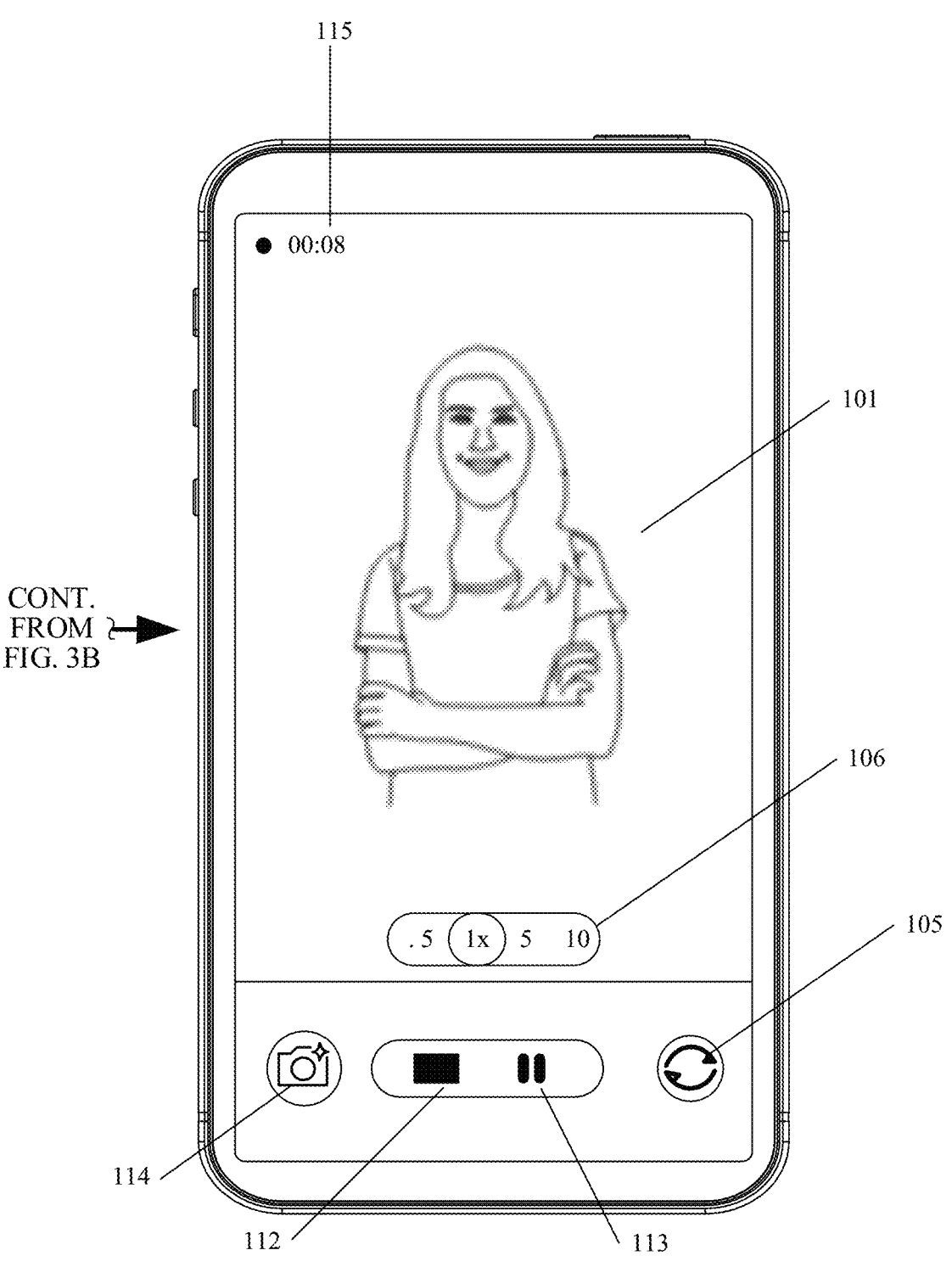
Figures 4A, 4B:
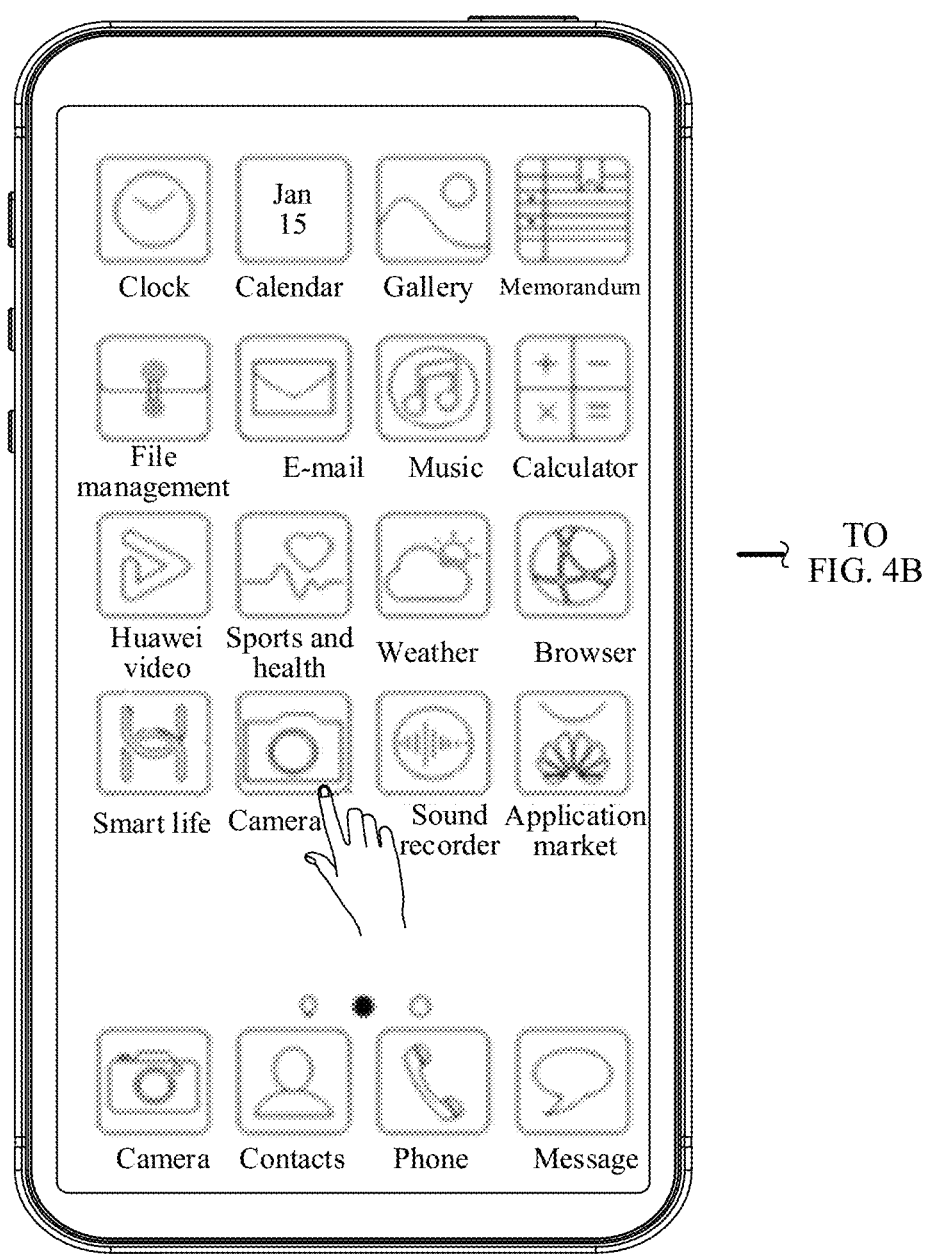
FIG. 4A to FIG. 4D are a schematic flowchart of a user operation of a camera function control method provided by an embodiment of this application.
Figure 4B:
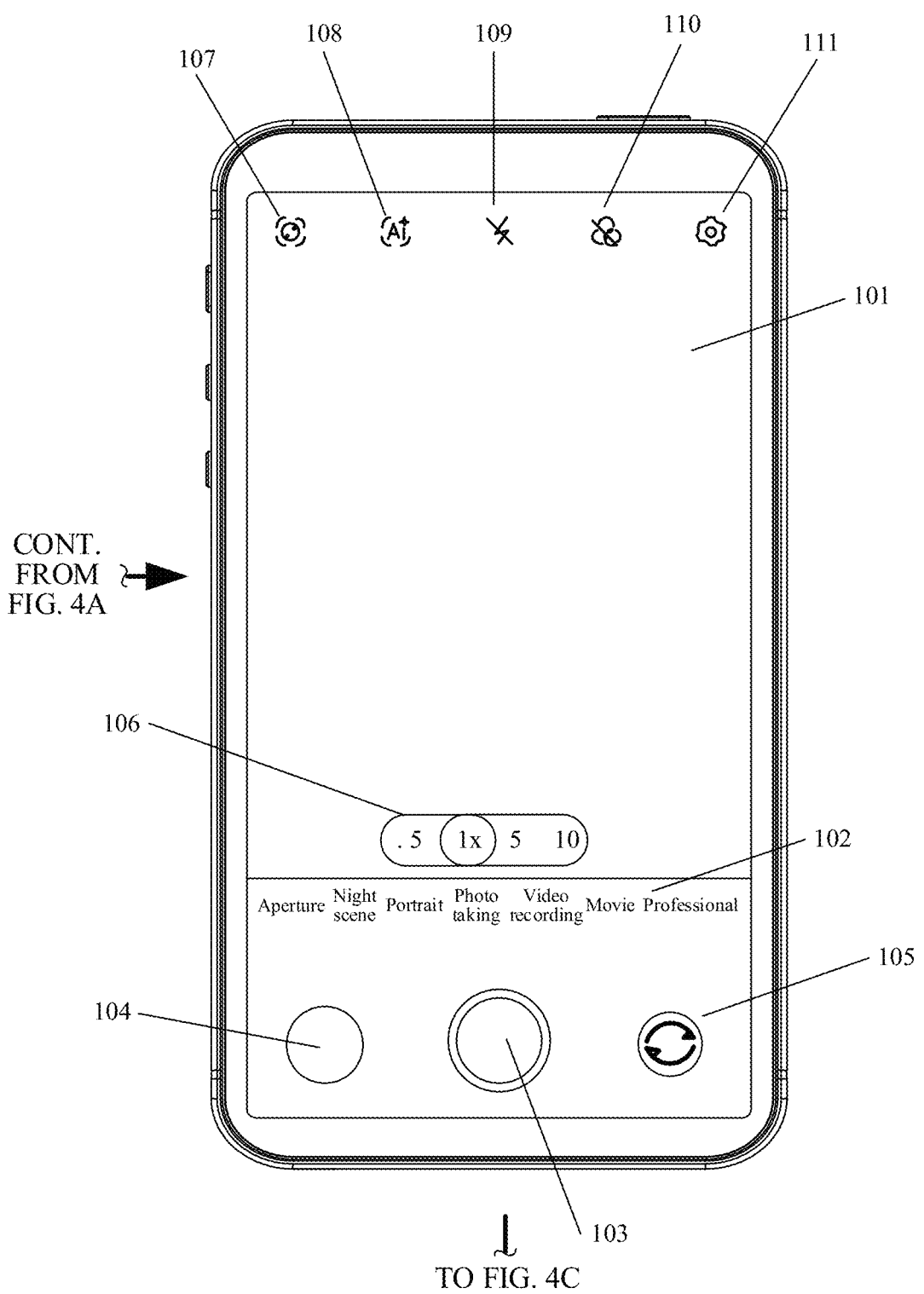
Figure 4C:
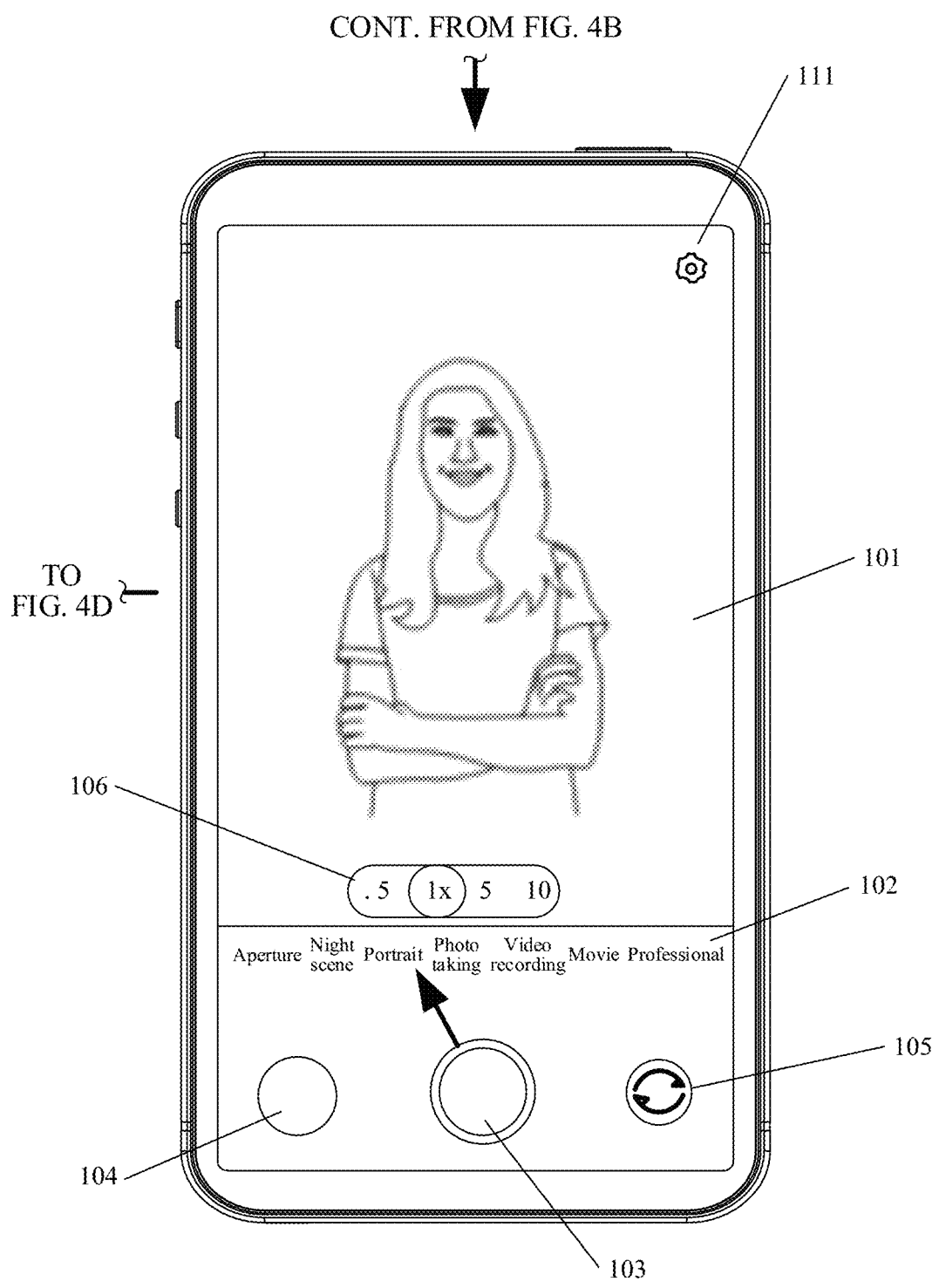
Figures 4C, 4D:
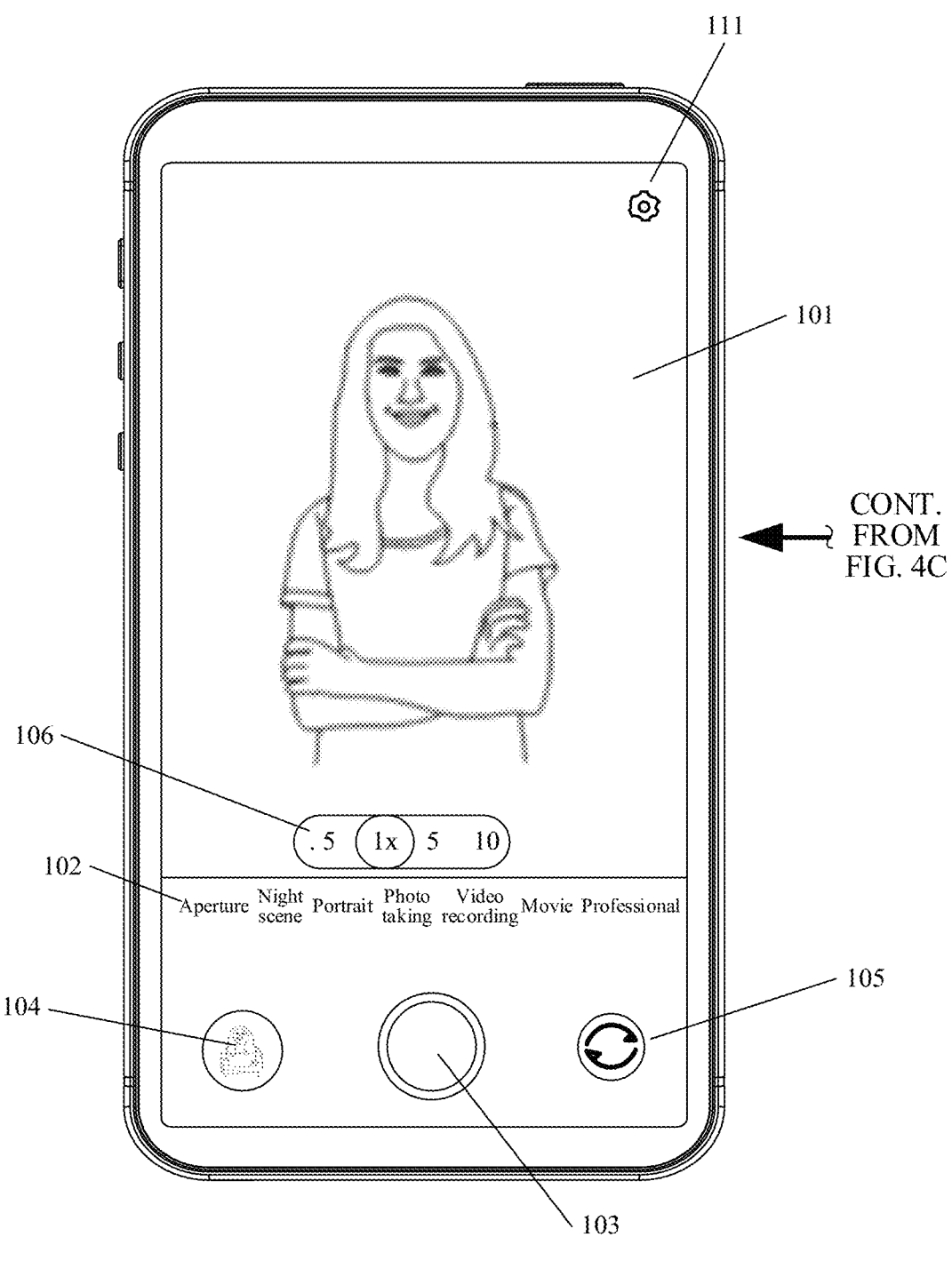

FIG. 1 is a schematic diagram of a camera function interface displayed on a mobile phone provided by an embodiment of this application. The mobile phones support a plurality of camera functions, such as a photo taking function, a portrait function, a night scene function and a video recording function, and each camera function respectively corresponds to one camera function interface. For example, if a user selects the photo taking function, a photo taking function interface is correspondingly displayed on the mobile phone. While if the user selects the video recording function, a video recording function interface is correspondingly displayed on the mobile phone. It is to be noted that when the user opens a camera application of the mobile phone, a default function interface is usually displayed, for example a default photo taking function interface is displayed. If the user wants to use other functions of a camera, such as the portrait function, the user needs to manually select the portrait function first, and then the mobile phone automatically switches to display a function interface corresponding to the portrait function.

As shown in FIG. 1, the layout of the camera function interface mainly includes: a viewfinder frame 101, function labels 102, and a shooting button 103.

The viewfinder frame 101 is configured to display images captured in real time by a camera.

The function labels 102 are configured to indicate different camera functions for the user to choose from. Each function label 102, such as a photo taking function label, a portrait function label, a night scene function label, and a video recording function label, corresponds to one camera function. Some or all function labels can be displayed on the same camera function interface. The function label 102 can be displayed on either side of the viewfinder frame 101, or the plurality of function labels 102 can be horizontally or vertically arranged or annularly arranged around the shooting button 103. When the function label 102 is triggered, the mobile phone automatically displays an interface of a camera function corresponding to the triggered label. For example, if the photo taking function label is triggered, the photo taking function interface is displayed.

The shooting button 103 is configured to execute a corresponding camera function, which is specifically determined on the basis of a photo taking function interface currently displayed on the mobile phone. For example, if the photo taking function interface is currently displayed on the mobile phone, when the user touches the shooting button 103, the mobile phone automatically takes a photo for an image in the current viewfinder frame 101 and saves the photo.

It needs to be supplemented that on the basis of the actual design requirement of the camera application, the layout of the camera function interface can also include: a gallery thumbnail 104, a front and rear camera switch button 105, a camera focal length adjustment control 106, a smart visual control 107, an AI photography control 108, a flashlight control 109, a filter shooting mode control 110, a setting button 111, etc. By clicking the gallery thumbnail 104, most recently saved photos or videos in the album can be displayed. By swiping to the left or right, the user can also view other pictures or videos in the album. By clicking the front and rear camera switch button 105, front and rear cameras can be switched. By swiping the camera focal length adjustment control 106, the camera focal length can be adjusted. By clicking the smart visual control 107, a preset application function, such as item recognition and text recognition, can be opened. By opening the AI photography control 108, photo taking environments, such as a portrait and a night scene, can be automatically recognized according to different scenarios, and photo taking parameters can be automatically adjusted. By clicking the flashlight control 109, a flashlight can be controlled to be turned on or off. B clicking the filter shooting mode control 110, different shooting modes can be selected to add different filters, such as an original image mode, a green and astringent filter mode, and an impression filter mode, to the taken pictures. By ways of the setting button 111, a setting menu can be opened for setting camera parameters. In general, there may be differences in the camera function interfaces corresponding to different camera functions, for example, there may be differences in the function interface of the photo taking function and the function interface of the portrait function, the function interface of the video recording function, and the like. The difference is specifically reflected on the layout of the camera function interface, which is specifically designed according to the actual needs of the camera application and will not be elaborated in detail here.

FIG. 2A to FIG. 2D are a schematic flowchart of a user operation of an existing camera function control method. Taking a portrait function as an example, as shown in 2a in FIG. 2A to FIG. 2D, a user first clicks an icon of a camera application from a mobile phone desktop to start the camera application (assuming it takes one second). As shown in 2b in FIG. 2A to FIG. 2D, after the camera application is started, a mobile phone displays a default camera function interface (such as a photo taking function interface). In the interface shown in 2b in FIG. 2A to FIG. 2D, the user finds a portrait function label from a plurality of horizontally arranged function labels and clicks it. The mobile phone switches from a photo taking function interface to display a portrait function interface (assuming it takes two seconds), as shown in 2c in FIG. 2A to FIG. 2D. As shown in 2d in FIG. 2A to FIG. 2D, the user first aims at a photographed object, then clicks a shooting button, and the mobile phone automatically runs a photo taking function to generate a corresponding photo (assuming it takes one second).

From FIG. 2A to FIG. 2D, it can be seen that the existing camera function control method needs to go through three operation steps: open a camera application, select a certain camera function, and operate the camera function to take photos or record videos, which takes about four seconds. If the user needs to capture pictures of some wonderful moments, the user needs to go through the above operation steps in order to take photos or record videos. Due to the plurality of operation steps, increased consumption time, reducing the speed of taking photos or recording videos and consequently makes the user miss out on the wonderful moments.

FIG. 3A to FIG. 3D are another schematic flowchart of a user operation of an existing camera function control method. As shown in 3a in FIG. 3A to FIG. 3D, a user first clicks an icon of a camera application from a mobile phone desktop to start the camera application: as shown in 3b in FIG. 3A to FIG. 3D, after the camera application is started, a mobile phone displays a default camera function interface (such as a photo taking function interface). As shown in 3c and 3d in FIG. 3A to FIG. 3D, the user first aims at a photographed object, and then uses a shooting button as a starting point of swipe. If the user swipes to the left, a photo taking function of a camera is triggered to quickly and continuously take photos, and corresponding photos are saved. If the user swipes to the right, a video recording function of the camera is triggered to record videos and generate a corresponding video. From FIG. 3A to FIG. 3D, it can be seen that compared to FIG. 2A to FIG. 2D, the camera function control method adopts a fixed shortcut operation manner to take photos and record videos fast, reducing the operation steps of taking photos or recording videos, thereby accelerating a user operation speed. Although this type of manner increases the speed for using the camera by the user to a certain extent, the user needs to remember a camera function corresponding to each swiping direction before use. If the user does not remember it or remember it incorrectly, it may lead to an operation error, thereby affecting user experience.

In response to the problems existing in the above existing camera function control method, an embodiment of this application provides a camera function control method. A new interactive manner combines a camera function selection operation with a camera function control operation, thereby reducing the operation steps of taking photos or recording videos, and accelerating the user operation speed. The user does not need to deliberately remember the swiping direction, and the shortcut operation of this application supports more camera functions, thereby improving user experience. The camera function selection operation in this application specifically is the operation of selecting the camera function, such as an operation of clicking "portrait" on the interface corresponding to the "photo taking" function, and an operation of clicking "video recording" on the interface corresponding to the "photo taking" function. The camera function control operation is an operation of clicking the shooting button. In response to the operation, the electronic device uses the camera to take photos or record videos. The method of this application combines the above process, such that the user can quickly use different shooting modes, thereby facilitating remembering it, and improving user experience.

The following describes the technical solutions of this application and how to solve the above technical problems according to the technical solutions of this application in detail by using specific embodiments. The following several specific embodiments may be independently implemented, and may also be combined with each other, and the same or similar concepts or processes may not be described repeatedly in some embodiments.

FIG. 4A to FIG. 4D are a schematic flowchart of a user operation of a camera function control method provided by an embodiment of this application. Taking control of a portrait function as an example below; operation steps of a user using a camera application of a mobile phone to perform portrait photo taking are described, and specific operations are as follows.

Operation step I: the user opens the camera application.

Exemplarily, as shown in 4a in FIG. 4A to FIG. 4D, the user opens a mobile phone desktop, finds a camera icon, and then clicks the camera icon so as to open the camera application. The manner to open the camera application is quite common. The user can open the mobile phone desktop, find the camera icon, and then open the camera application.

In an optional embodiment, the camera application can be triggered and opened by using a shortcut key or in a manner of a shortcut operation. For example, in a screen locked state of a mobile phone, the user finds the camera icon on a screen locked interface, clicks it and swipes upwards to open the camera application, thereby saving time of the user for opening the camera application.

Operation step II: the user selects a portrait function and makes the function run to take photos.

Exemplarily, as shown in 4b in FIG. 4A to FIG. 4D, after the camera application is opened, the mobile phone displays a default photo taking function operation interface. As shown in 4c in FIG. 4A to FIG. 4D, the user aims at a photographed object and starts to swipe towards a portrait function label from the position of a shooting button on the current photo taking function operation interface (a black arrow in 4c in FIG. 4A to FIG. 4D points to a swiping direction). As shown in 4d in FIG. 4A to FIG. 4D, after the mobile phone detects a swiping operation, it determines that a camera function triggered by the current swiping operation is the portrait function. In response to the swiping operation, an image is captured and a portrait processing algorithm is used to process the image and then save it.

Compared to the operation manner of the existing camera function control method in FIG. 2A to FIG. 2D, this application combines the last two operation steps in existing operation steps into one operation step, thereby facilitating the user in quickly switching different photo taking modes and improving user experience. If the mobile phone performs camera function control while the camera application is already started, the user can select the camera function and control the camera function to run in one step with just one swiping operation, thereby greatly improving the user operation speed. Compared to that a fixed shortcut operation manner is adopted to control camera functions in the operation manner of the existing camera function control method in FIG. 3A to FIG. 3D, for example, swiping to the left can only fixedly trigger the photo taking function, while swiping to the right can only fixedly trigger the video recording function, this application redefines a new camera function control operation manner, the operation manner associates the swiping direction with a position of the function label, so that the user only needs to swipe towards a position where a target function label is located, and then a camera function corresponding to the function label can be triggered. Therefore, the operation manner is more flexible for the user, that is, what camera function is triggered when the swipe points to what camera function, and therefore shortcut control can be performed on the basis of any camera function selected by the user, for example, swiping to different directions can correspondingly control the variety of different camera functions. In different application scenarios, even swiping in the same direction can also trigger different camera functions, or the same camera function can also be triggered even swiping in different directions in different application scenarios. Therefore, the camera function control manner of this application is more flexible and can be adjusted on the basis of the application scenario in use by the user. In addition, it is not needed for the user to deliberately remember a correspondence relationship between the swiping direction and the camera function, the user just needs to swipe towards a certain function label, and then a corresponding camera function can be triggered to run. Since the operation manner is more flexible, shortcut control of all camera functions can be achieved.

In another embodiment of this application, as shown in FIG. 4A to FIG. 4D, in the interface as shown in 4b in FIG. 4A to FIG. 4D, the user performs a swiping operation from the shooting button to a "photo taking" label. In response to the swiping operation of the user, the mobile phone performs continuous photo taking, and saves a plurality of images.

In one possible implementation, after the user swipes from the shooting button to the "photo taking" label and continues to swipe upwards to a certain distance, the finger stays on a screen of the mobile phone, and in response to the user operation of staying on the screen of the mobile phone, the mobile phone continues to perform continuous photo taking and saves images. Continuous photo taking and the number of the saved images can be related to the length of time during which the user's finger stays on the screen. After the user raises his/her finger from the screen, in response to the raising operation, the mobile phone can stop taking photos.

In one possible implementation, the mobile phone sets the maximum number of burst shooting by default, or the user can pre-set the maximum number of burst shooting. In this way, if the mobile phone continues to perform continuous photo taking in response to the user operation of staying on the screen of the mobile phone, and saves images. When the number of performing continuous photo taking reaches the maximum number, even if the mobile phone detects that the user's finger still stays on the screen of the mobile phone, that is, the operation of the user raising his/her finger from the screen is not detected, the mobile phone can also stop taking photos.

In another embodiment of this application, as shown in FIG. 4A to FIG. 4D, in the interface as shown in 4*b* in FIG. 4A to FIG. 4D, the user performs a swiping operation from the shooting button to a "video recording" label. The mobile phone performs a video recording function in response to the swiping operation of the user, and saves recorded videos. The specific process will be described in detail below:

It is to be noted that the user can also perform swiping operations from the shooting button to other labels, such as a "movie" label, and a "night scene" label. The mobile phone can perform, in response to the swiping operation of the user, camera functions corresponding to the labels. For example, after taking pictures, an algorithm corresponding to a night scene function is used to process the pictures and then save them, or a filter in a movie mode is added in a process of recording videos, and so on. In addition, although the above embodiments illustrate the shooting method of the embodiment of this application by using a mobile phone as an example, this application is not limited to this. An executing subject of the shooting method of the embodiment in this application can also be an electronic device such as a tablet computer and a foldable screen device.

That the user uses the swiping operation to achieve selecting the camera function and run the camera function is further described below.

Figure 5:
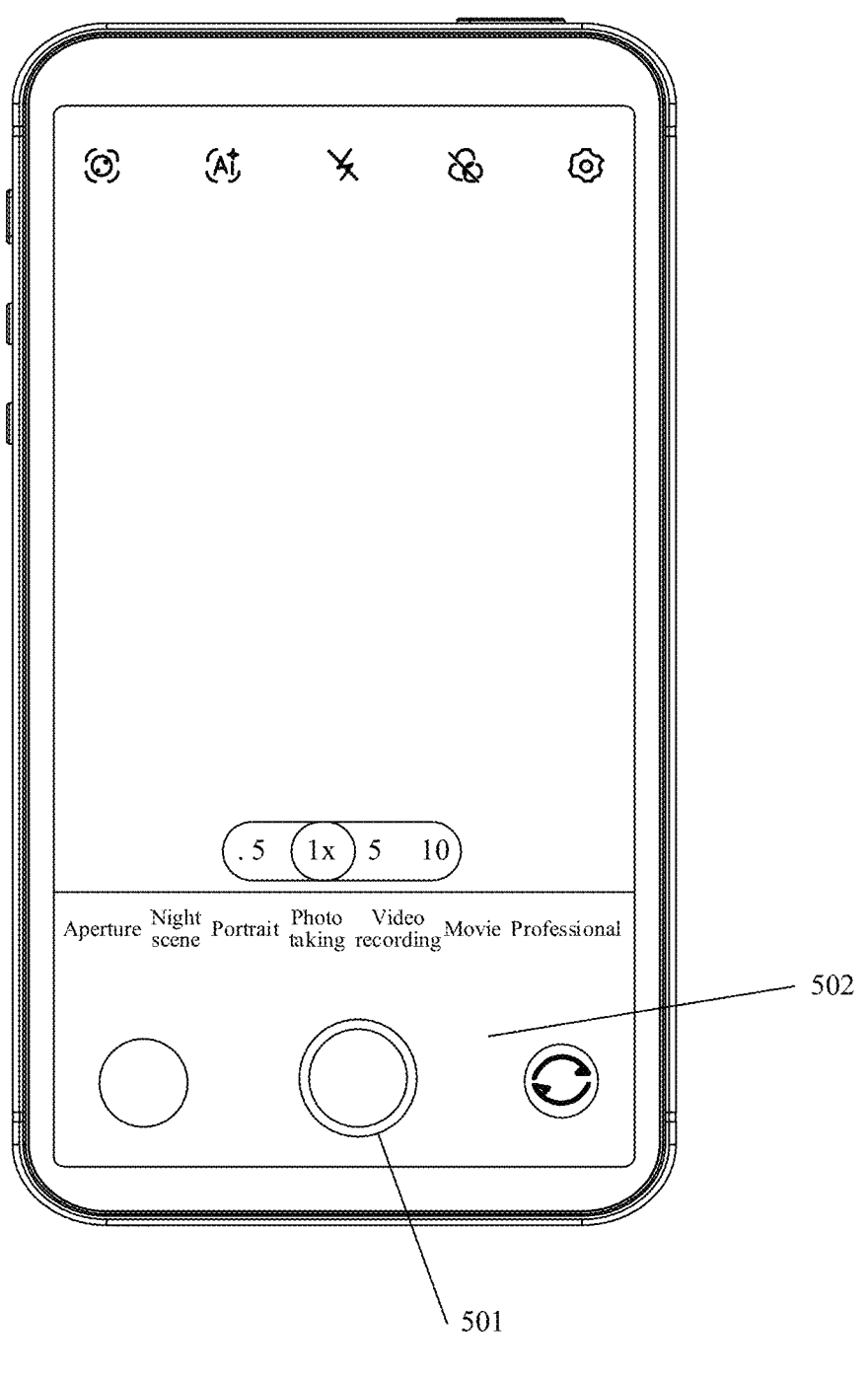
FIG. 5 is a schematic diagram of division of a camera function interface provided by an embodiment of this application.

Exemplarily, as shown in FIG. 5, a camera function interface includes a first region 501 and a second region 502. The first region 501 is a control region of the camera function, preferably a shooting button, and the second region 502 is a region around the first region 501. The first region 501 is the shooting button is illustrated as an example below:

In the embodiment of this application, on the basis of the first region 501 and an intersection angle generated when swiping from the first region 501 to the second region 502 and passing through the edge of the first region 501, control conditions associated with the swiping operation are set. The mobile phone can determine, on the basis of the control condition, a camera function selected by the swiping operation, and then the mobile phone controls the camera function selected by the swiping operation to run. For a user, the user only needs to perform swiping operation once, then the camera function can be achieved to select and the camera function can be triggered to run.

In the embodiment of this application, the control condition is preferably set to that the swiping operation needs to pass through the first region 501 and the second region 502, respectively. A swiping direction of the swiping operation can be from the first region 501 to the second region 502, or from the second region 502 to the first region 501. The swiping operation passes through the first region 501 (shooting button) to determine whether the user wants to take a photo or record a video. When the swiping operation passes through the first region 501 and enters the second region 502 the camera function selected by the user is determined. That is, the user can simultaneously achieve selecting the camera function and control the camera function to run by ways of one swiping operation. On the basis of the interface layout position of the shooting button in an existing camera application (the button is located in the middle of the bottom of the interface) and the size of a button region (the button region is relatively small), it is preferred to use the first region 501 as a starting point region of the swiping operation and the second region 502 as an ending point region of the swiping operation, that is, the swiping direction of the swiping operation is preferably from the first region 501 to the second region 502.

Figure 6:
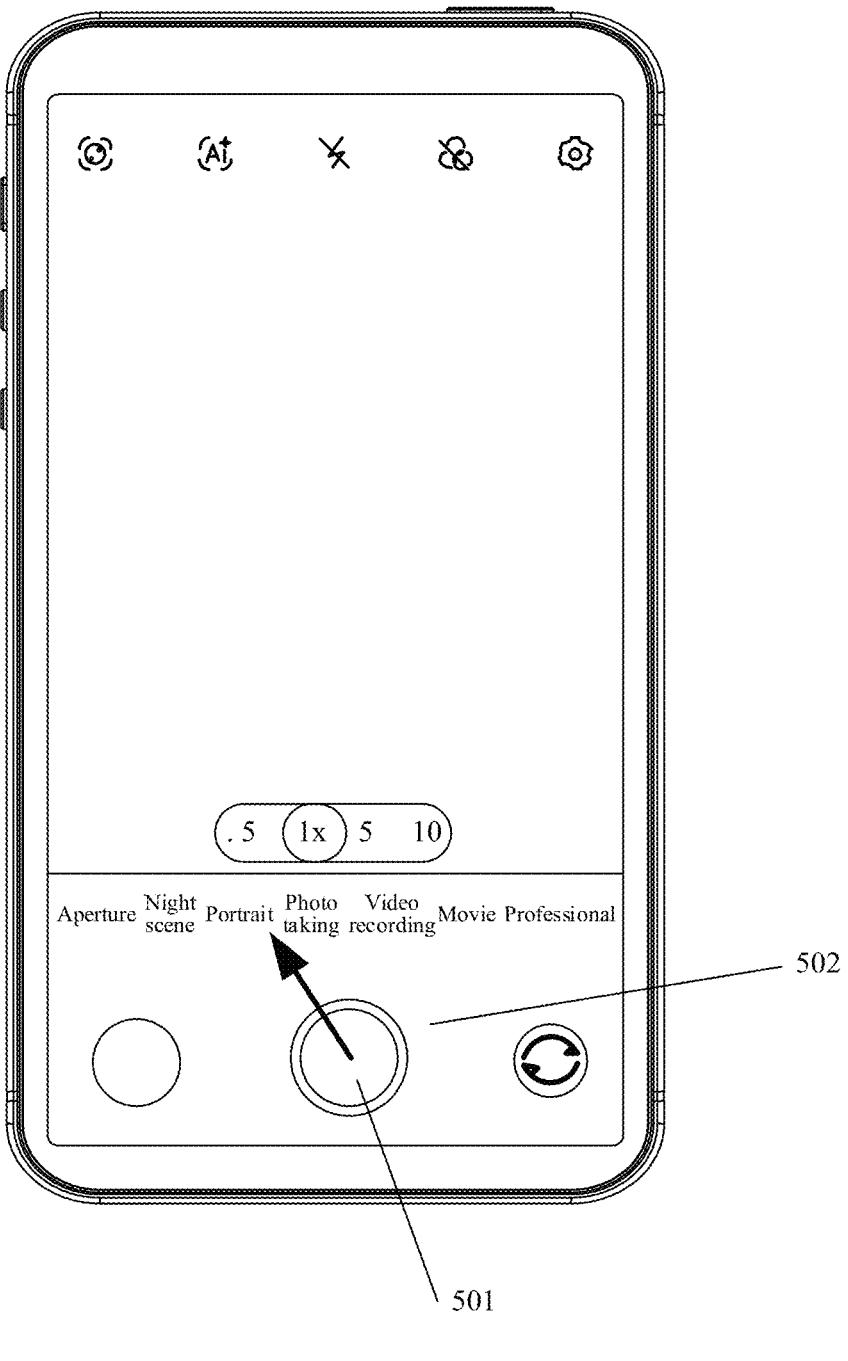
FIG. 6 is a schematic diagram of a user performing a swiping operation in a first region and a second region provided by an embodiment of the application.

For example, as shown in FIG. 6, when the swiping operation of the user (a black arrow indicates the swiping direction) swipes from the first region 501 (shooting button region) to the second region 502 (region outside the shooting button region), and passes through the edge of the first region 501, it is determined that the current swiping operation achieves selecting the camera function and triggering the camera function to run.

The embodiment in this application provides control conditions of two manners and combines the swiping operation to achieve selecting the camera function by ways of the swiping operation, including but not limited to the following two manners.

Manner I: Swiping Operation+Sub-Region

Figure 7:
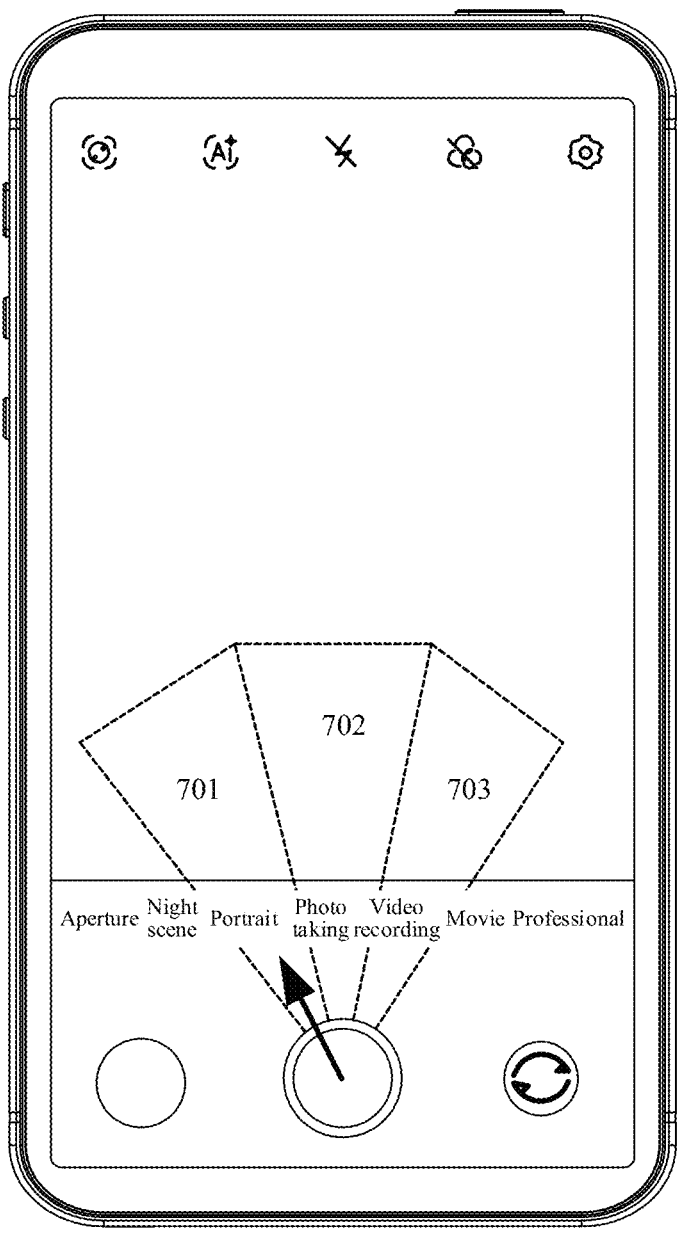
FIG. 7 is a schematic diagram of a user performing a swiping operation in any sub-region of the first region and the second region provided by an embodiment of the application.

Exemplarily, as shown in FIG. 7, the second region 502 in FIG. 6 is divided into a plurality of sub-regions with different orientations, each sub-region does not overlap, and each sub-region corresponds to the position of one function label. For example, in FIG. 7, a sub-region 701 corresponds to a portrait function label, a sub-region 702 corresponds to a photo taking function label, and a sub-region 703 corresponds to a video recording function label. When a swiping operation (a black arrow indicates a swiping direction) enters the sub-region 701 from a shooting button region, it is determined that the swiping operation triggers a portrait function. When the swiping operation enters the sub-region 702 from the shooting button region, it is determined that the swiping operation triggers a burst shooting function. When the swiping operation enters the sub-region 703 from the shooting button region, it is determined that the swiping operation triggers a video recording function. This embodiment does not limit the number and a division manner of the sub-regions. The burst shooting function can be regarded as a photo taking function that can achieve continuous photo taking.

Exemplarily, for facilitating a shortcut operation of a user, it is preferable to divide the second region 502 above the first region 501 into a plurality of non-overlapping sub-regions, and each sub-region covers one camera function label. The division number of the sub-region and a corresponding camera function label can be pre-set by a mobile phone manufacturer by default or manually configured by the user.

A camera function corresponding to each sub-region is determined on the basis of the currently displayed camera function. For example, if the photo taking function is currently displayed on a mobile phone, a portrait function label is on the left of a photo taking function label, a video recording function label is on the right thereof, then the middle sub-region 702 corresponds to the burst shooting function, the left sub-region 701 corresponds to the portrait function, and the right sub-region 703 corresponds to the video recording function. If the portrait function is currently displayed on the mobile phone, a night scene function label is on the left of a portrait function label, a photo taking function label is on the right thereof, then the middle sub-region 702 corresponds to the portrait function, the left sub-region 701 corresponds to a night scene function, and the right sub-region 703 corresponds to the burst shooting function.

In one embodiment, it is preferred to cover the text range of the function label in each sub-region, and each sub-region corresponds to the camera function corresponding to the function label covered by each sub-region, so as to ensure that when the user performs a swiping operation, just by swiping towards a corresponding function label, it can be guaranteed that a camera function corresponding to the function label is triggered. For example, if the user swipes towards the portrait function label, it is determined to trigger the portrait function when the swiping operation passes through the first region 501 and enters the second region 502. If the user swipes towards the video recording function label, it is determined to trigger the video recording function when the swiping operation passes through the first region 501 and enters the second region 502.

In addition, to accelerate the response speed of control condition judgment, it is preferred that the boundary of one side of each sub-region intersects with the boundary of one side of the first region 501. When the swiping operation of the user comes out of the first region 501 and enters the second region 502, it is ensured that the swiping operation can enter one sub-region of the second region 502 at the instant of leaving the first region 501, and then the camera function triggered by the swiping operation can be quickly determined.

Manner II: Swiping Operation+Angle Range

Figure 8:
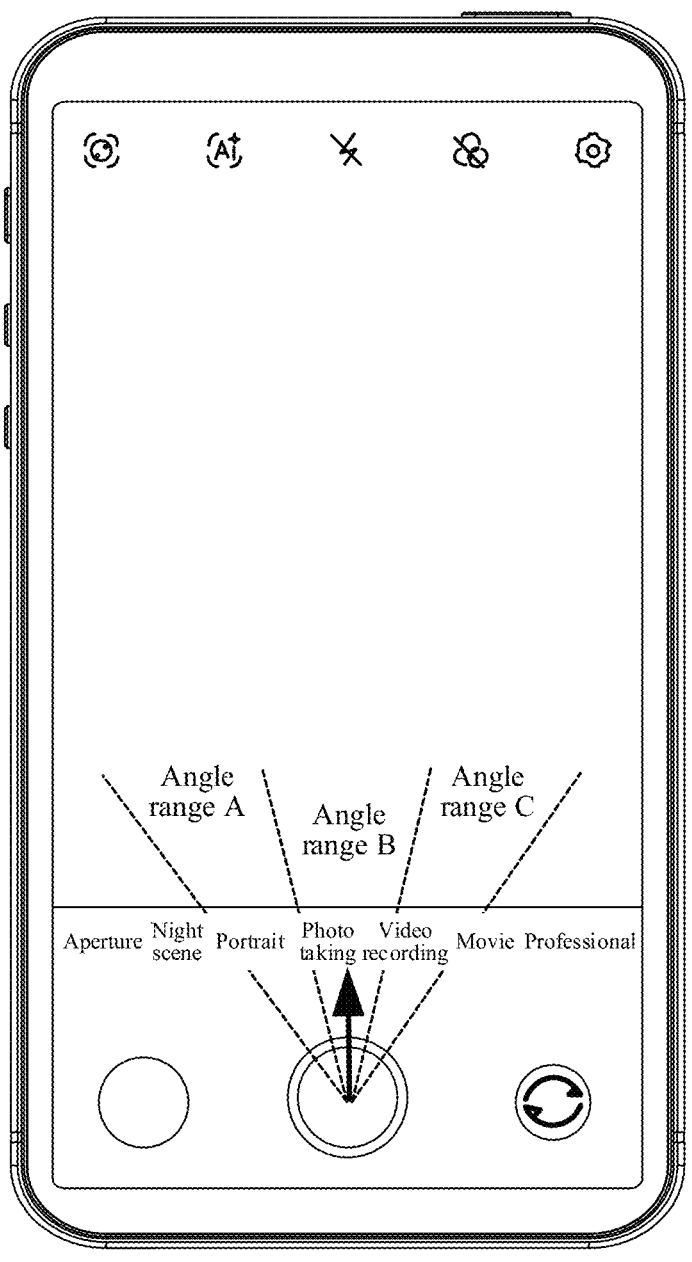
FIG. 8 is a schematic diagram of a user performing a swiping operation in any angle range of the first region and the second region provided by an embodiment of the application.
Figures 10A, 10B:
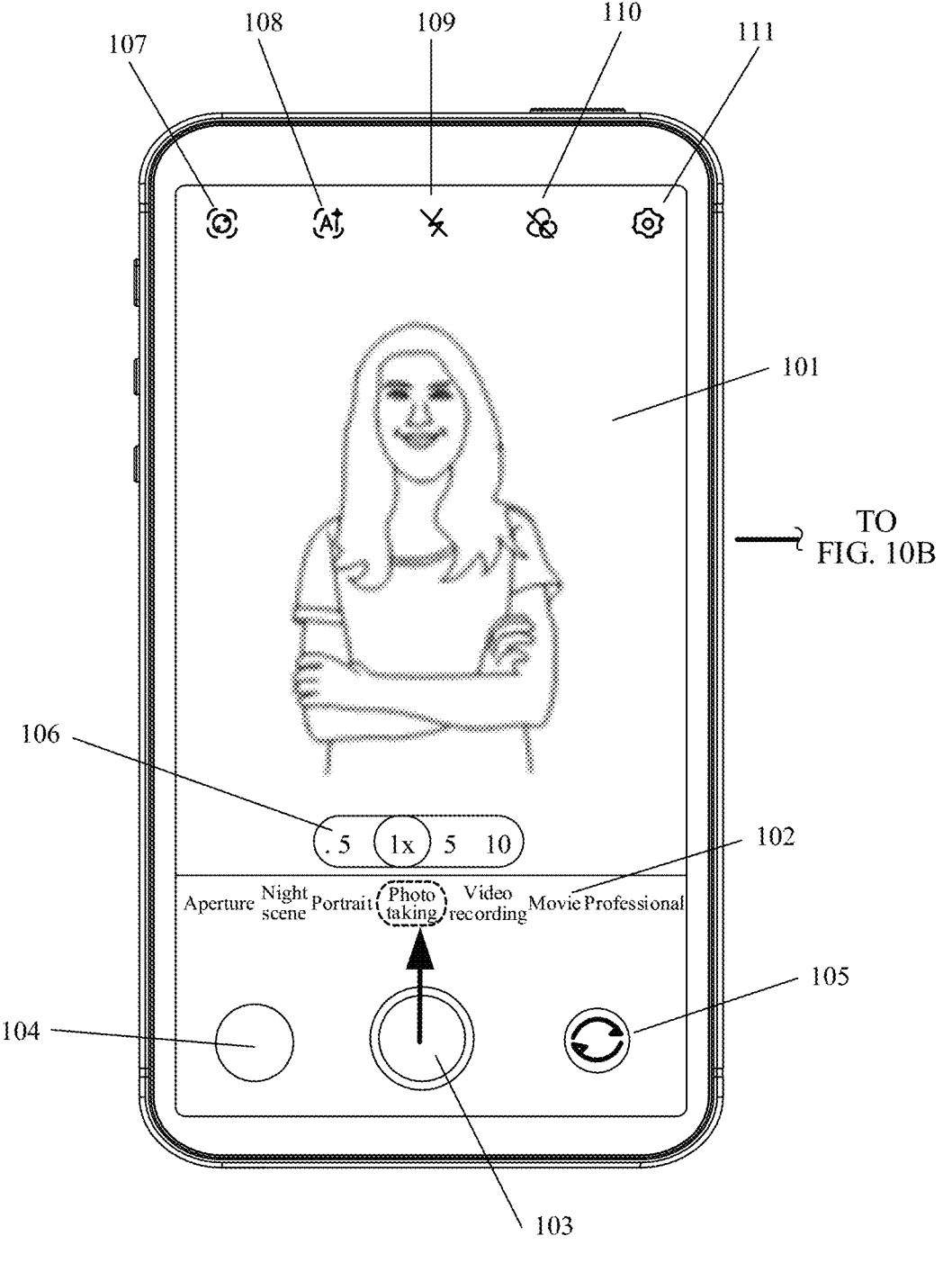
FIG. 10A to FIG. 10F are a schematic diagram of an interface provided by an embodiment of this application where a user swipes to perform continuous photo taking.
Figures 10A, 10B, 10C:
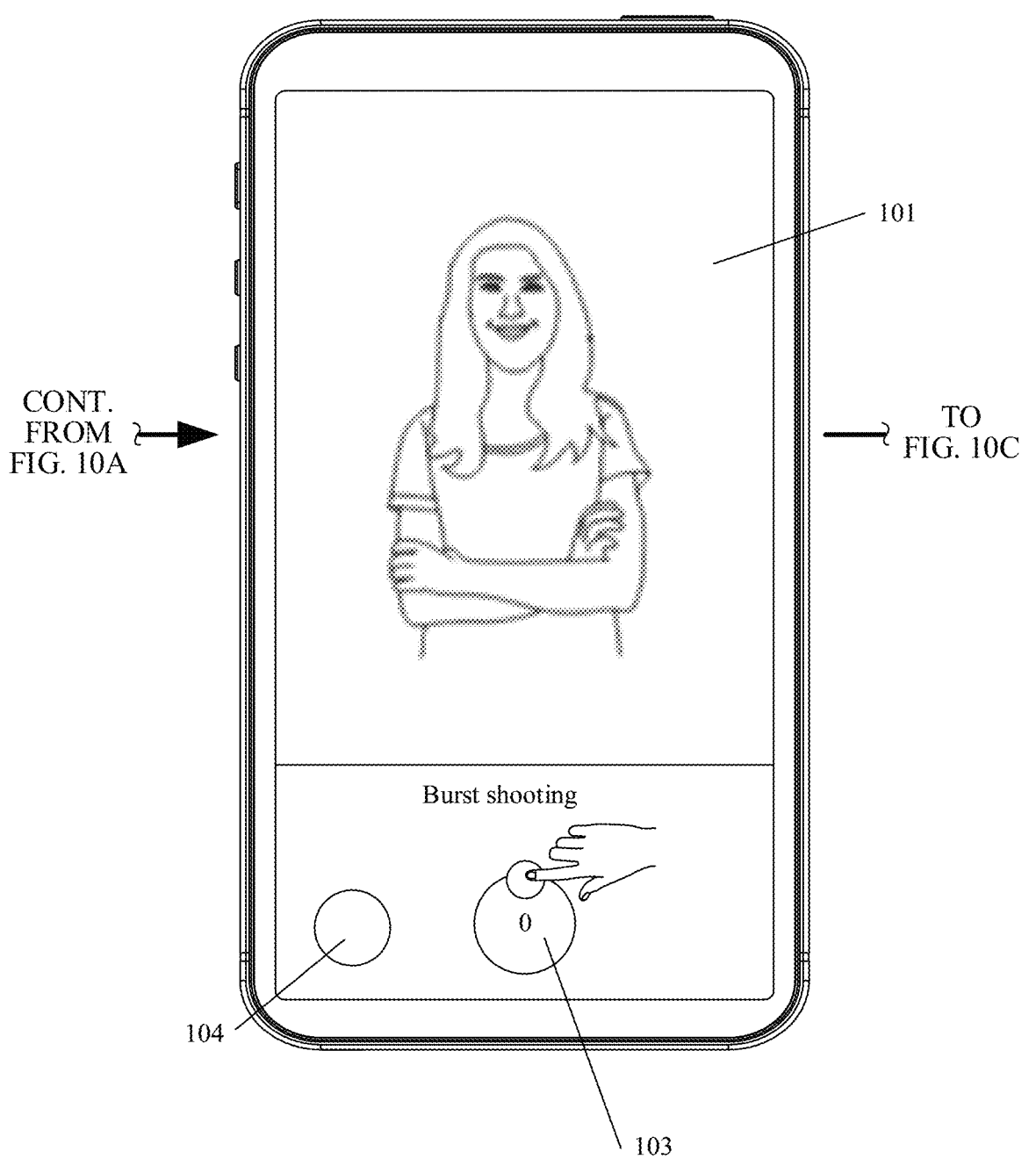
Figures 10B, 10C:
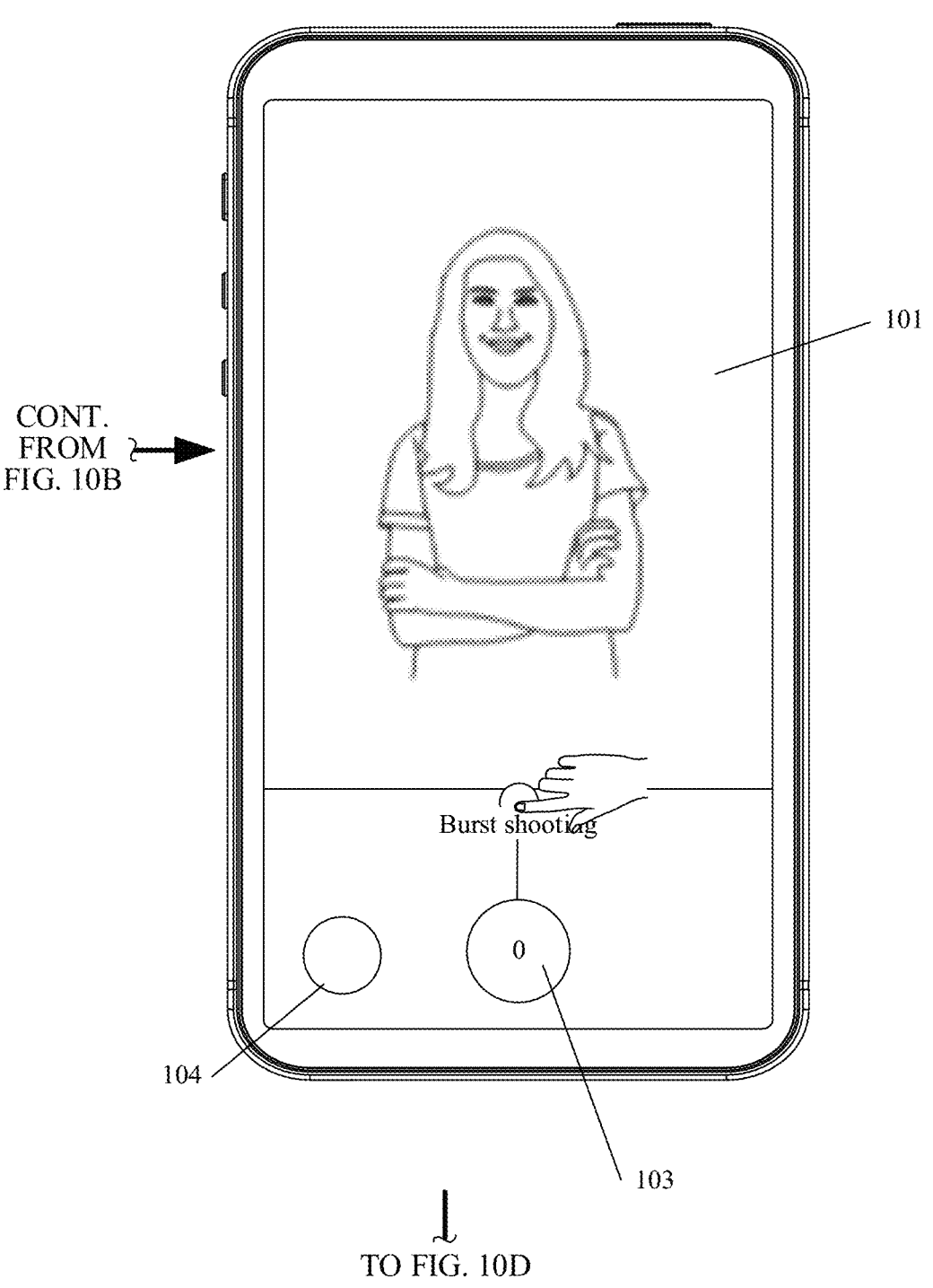
Figures 10D, 10E:
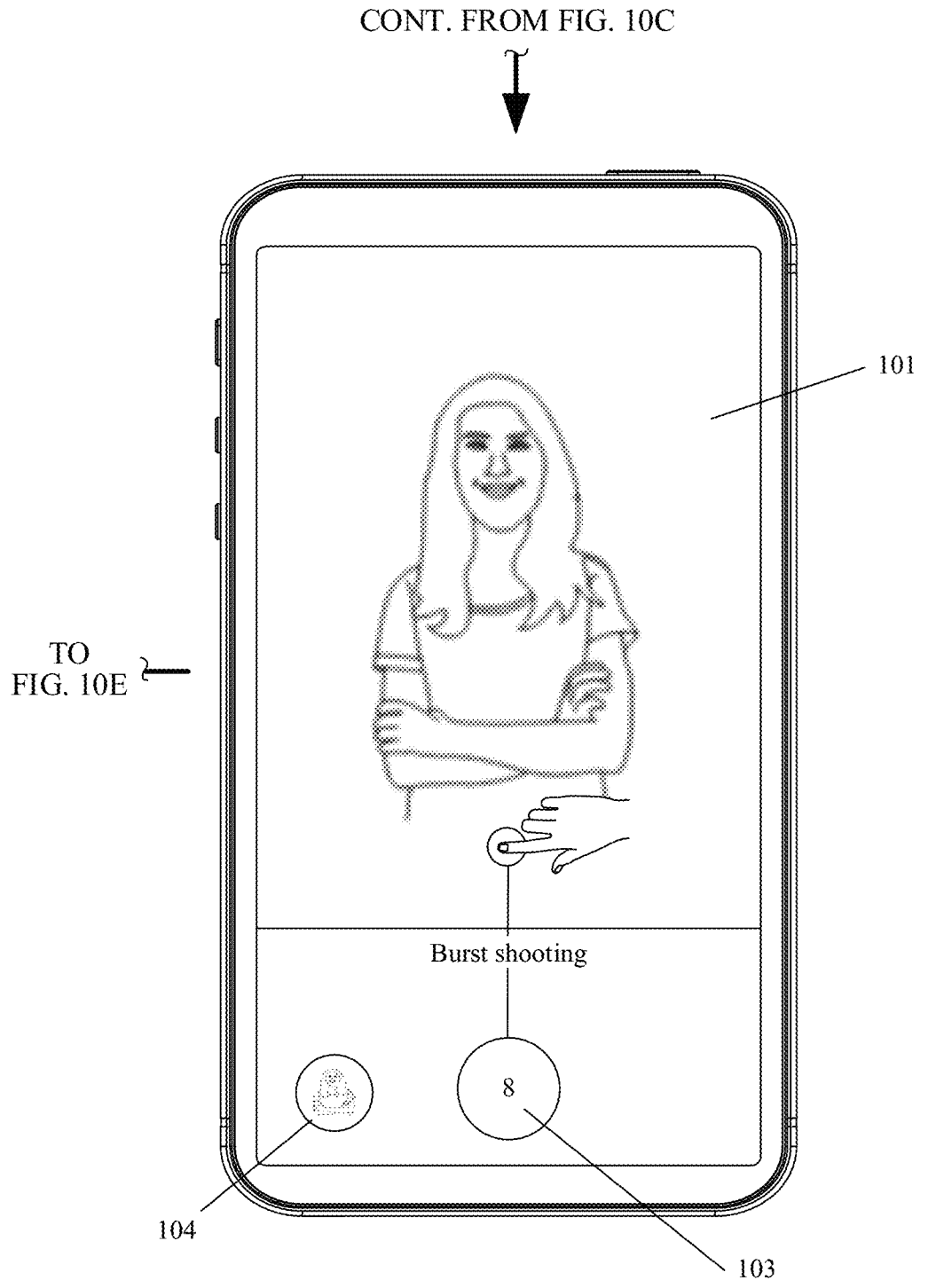
Figure 10E:
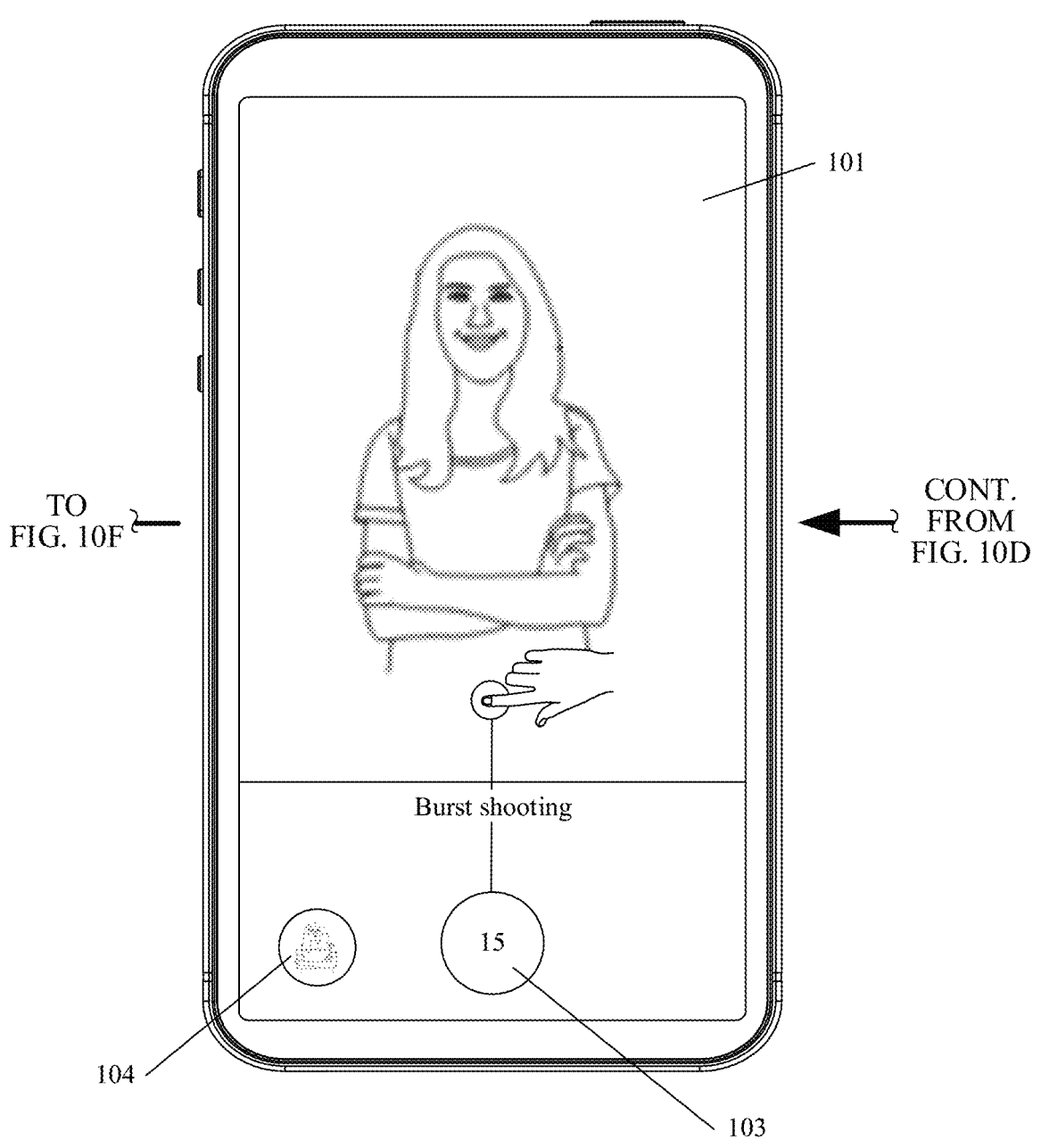
Figures 10E, 10F:
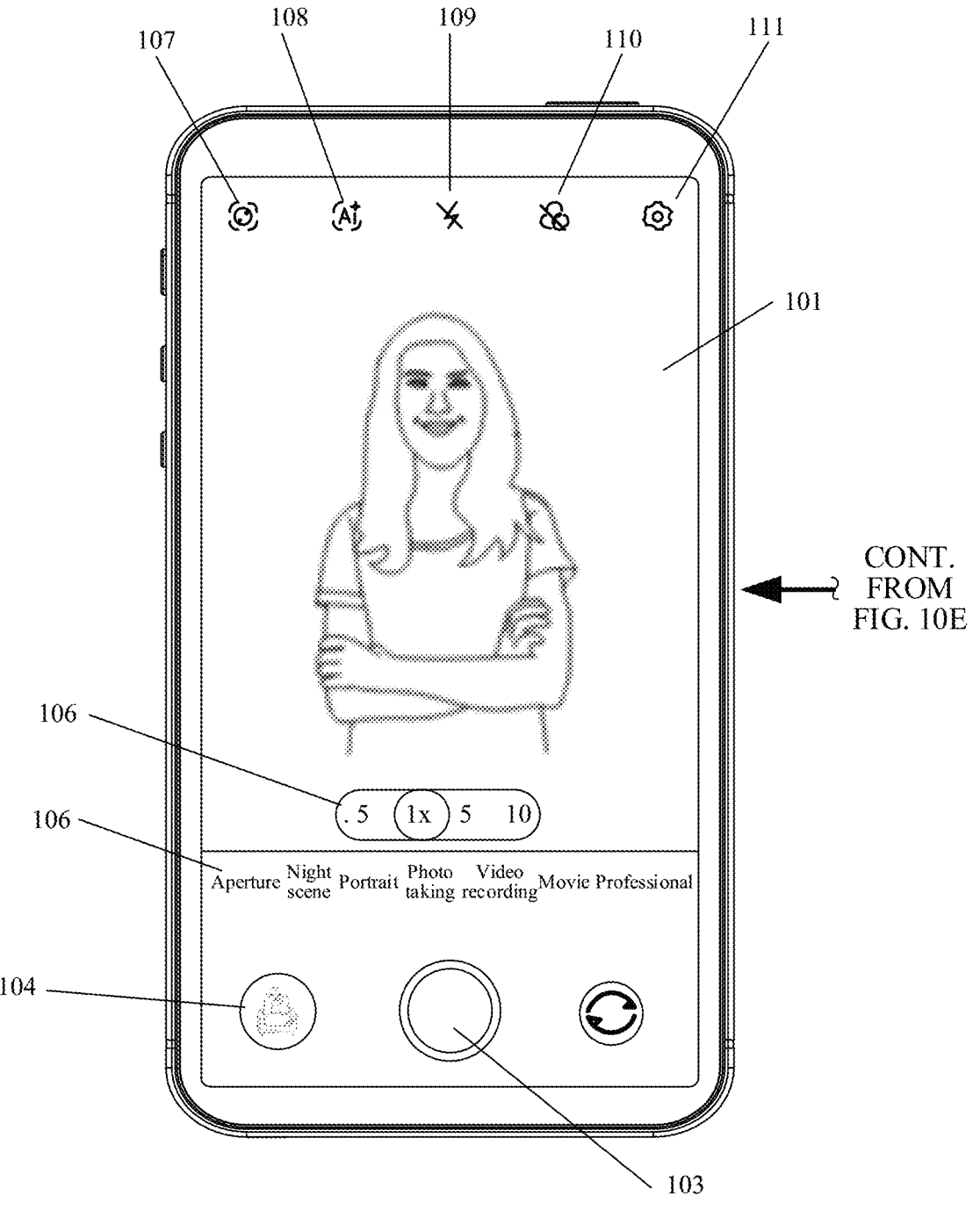
Figure 11A:
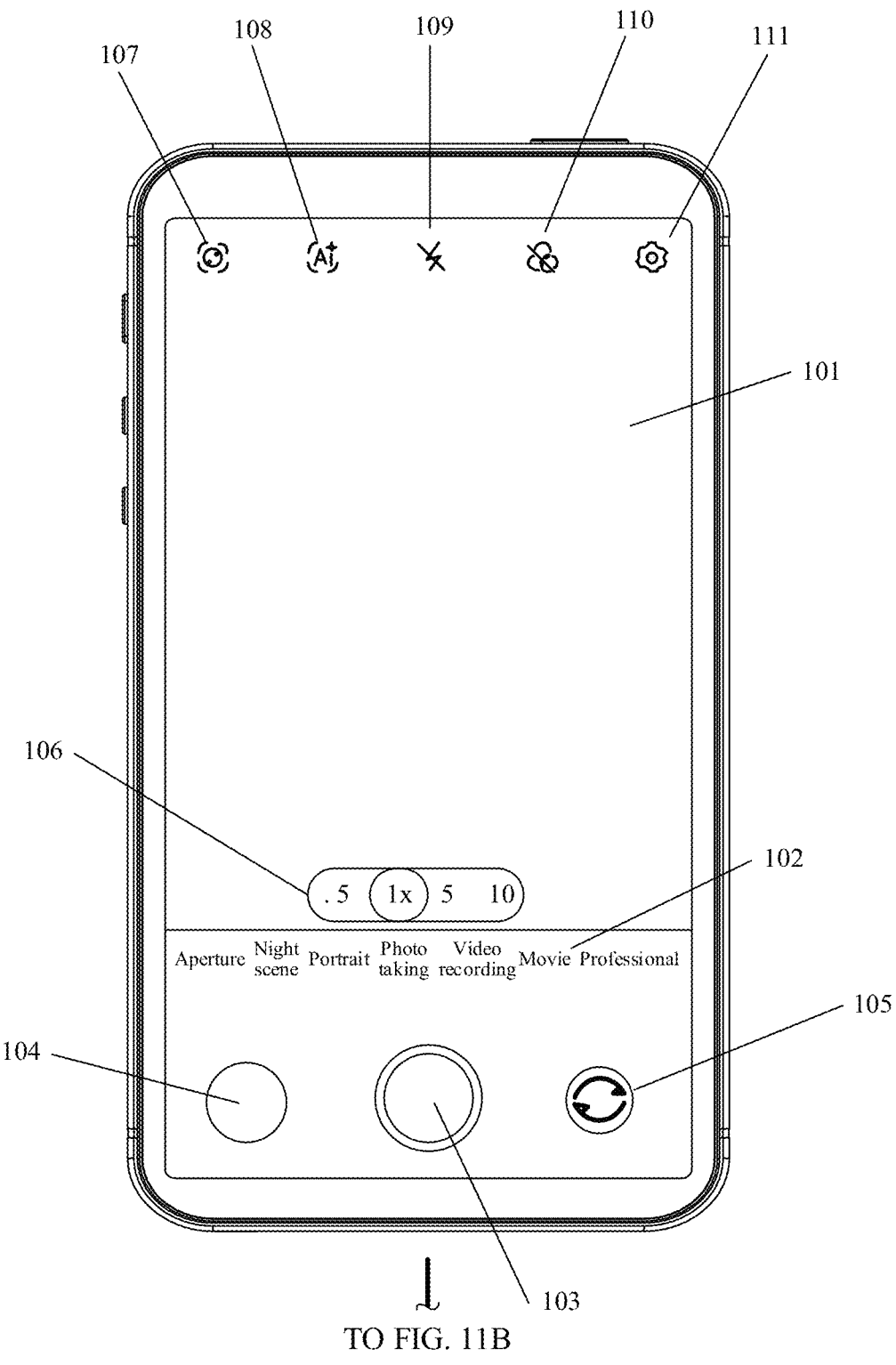
FIG. 11A to FIG. 11G are another schematic diagram of an interface provided by an embodiment of this application where a user swipes to perform continuous photo taking.
Figure 11B:
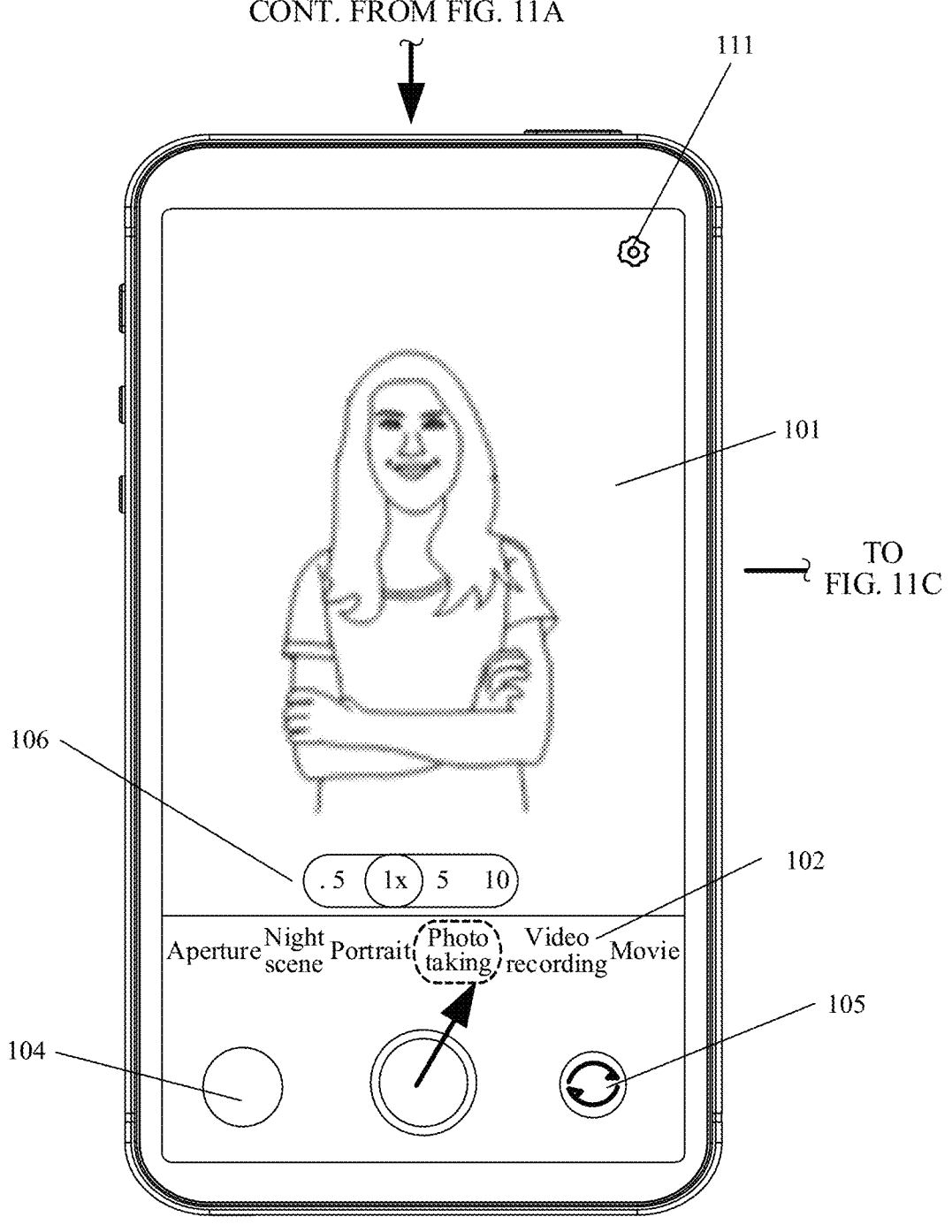
Figures 11B, 11C, 11D:
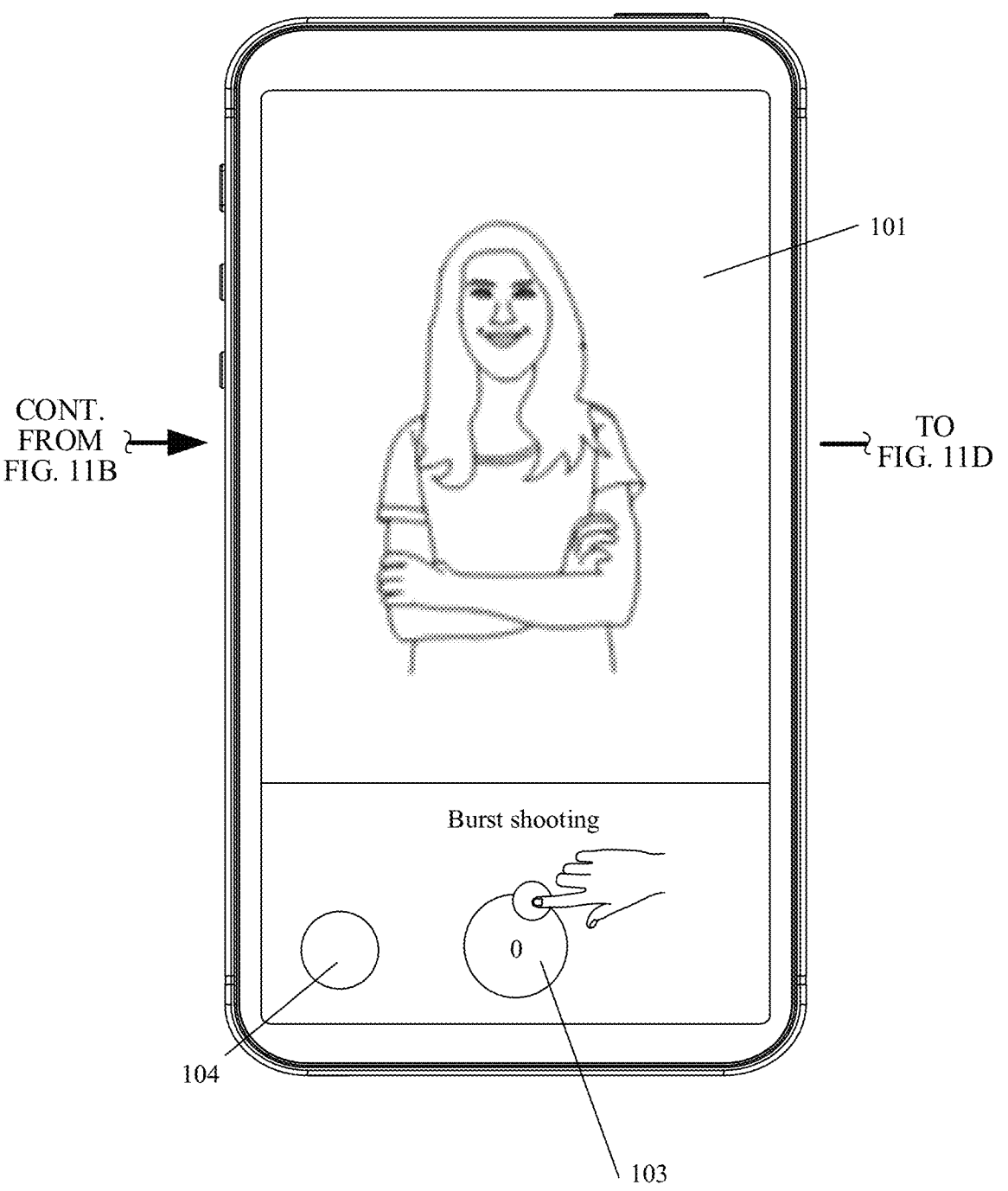
Figures 11C, 11D:
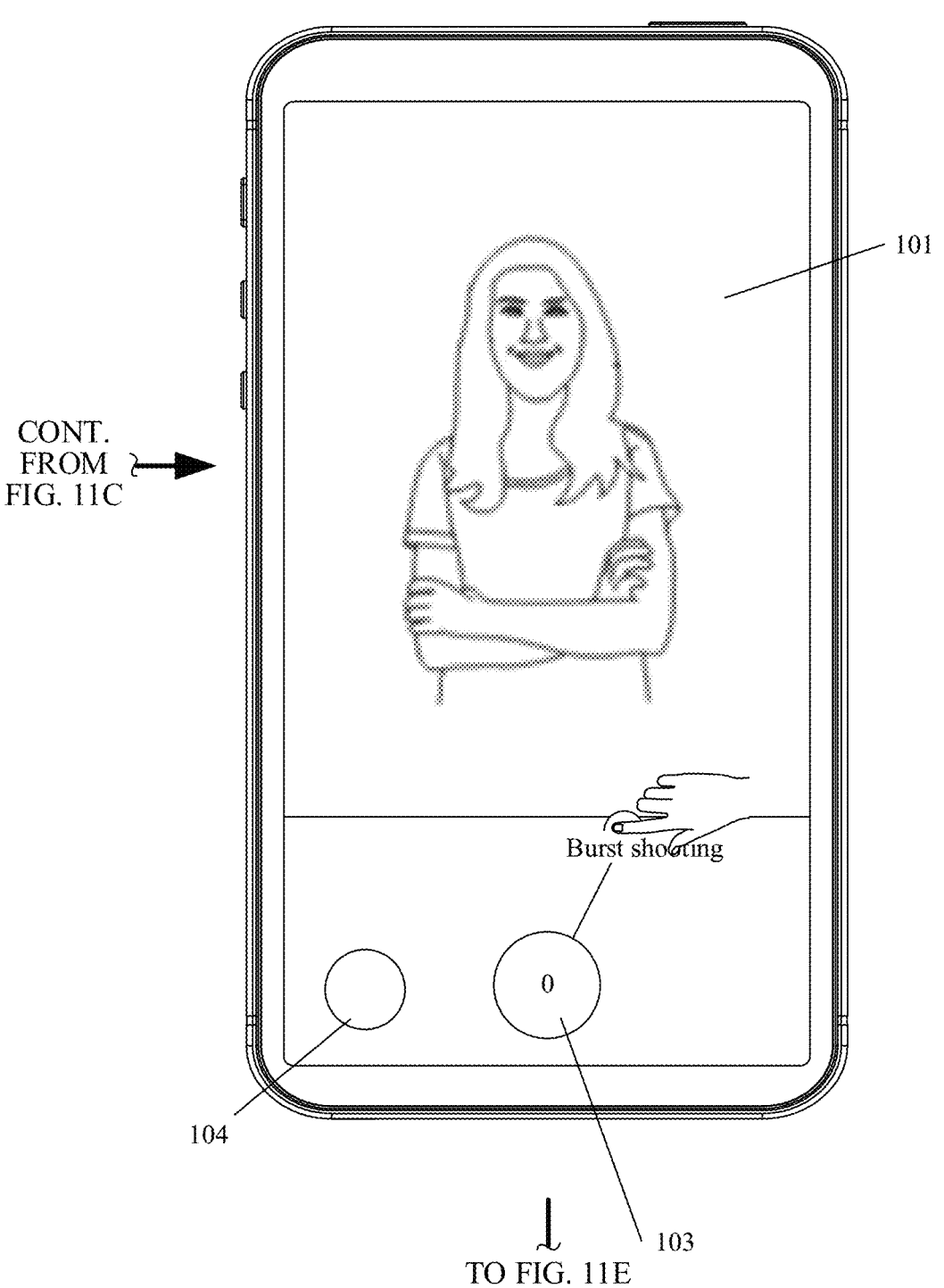
Figure 11E:
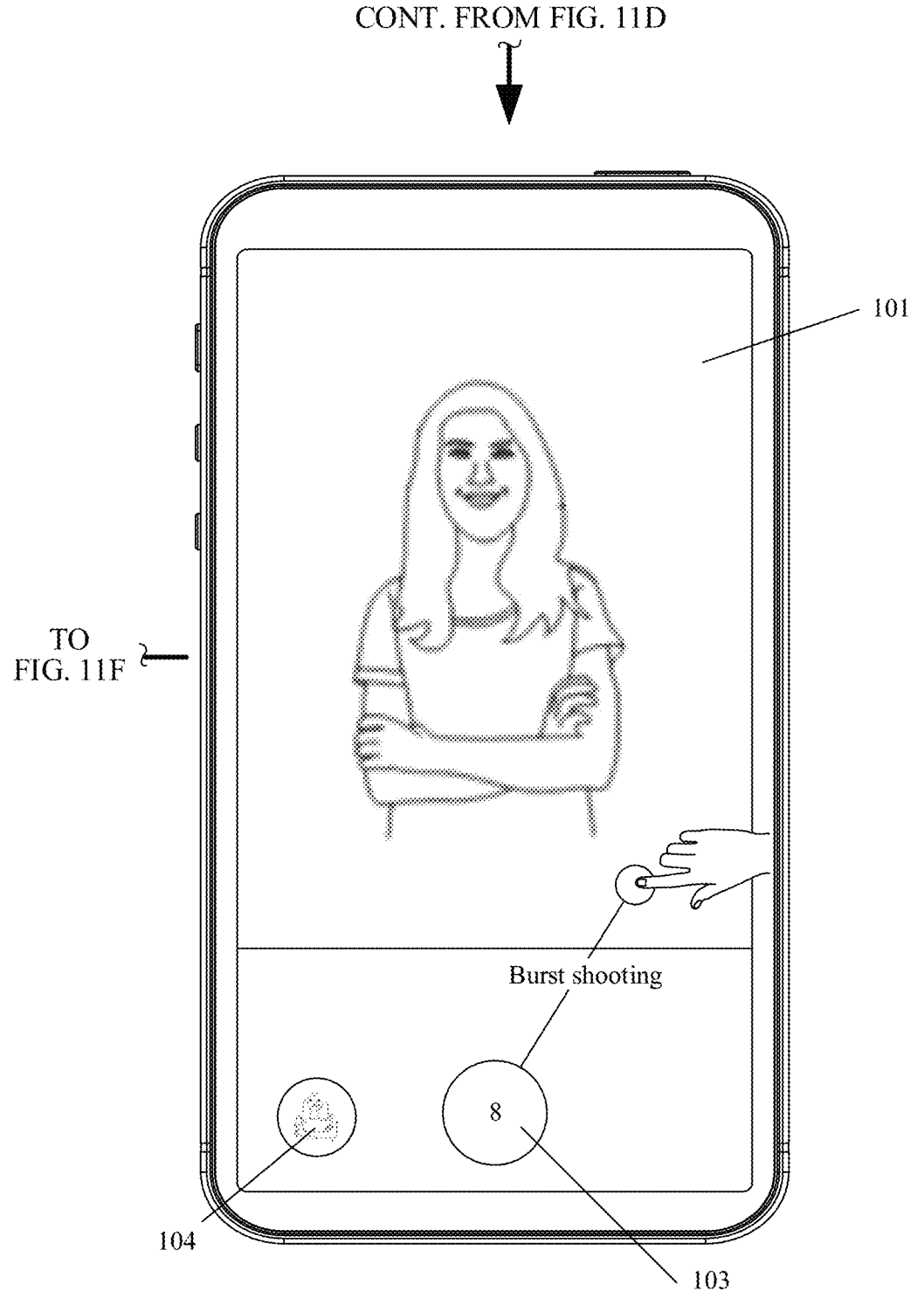
Figures 11E, 11F, 11G:
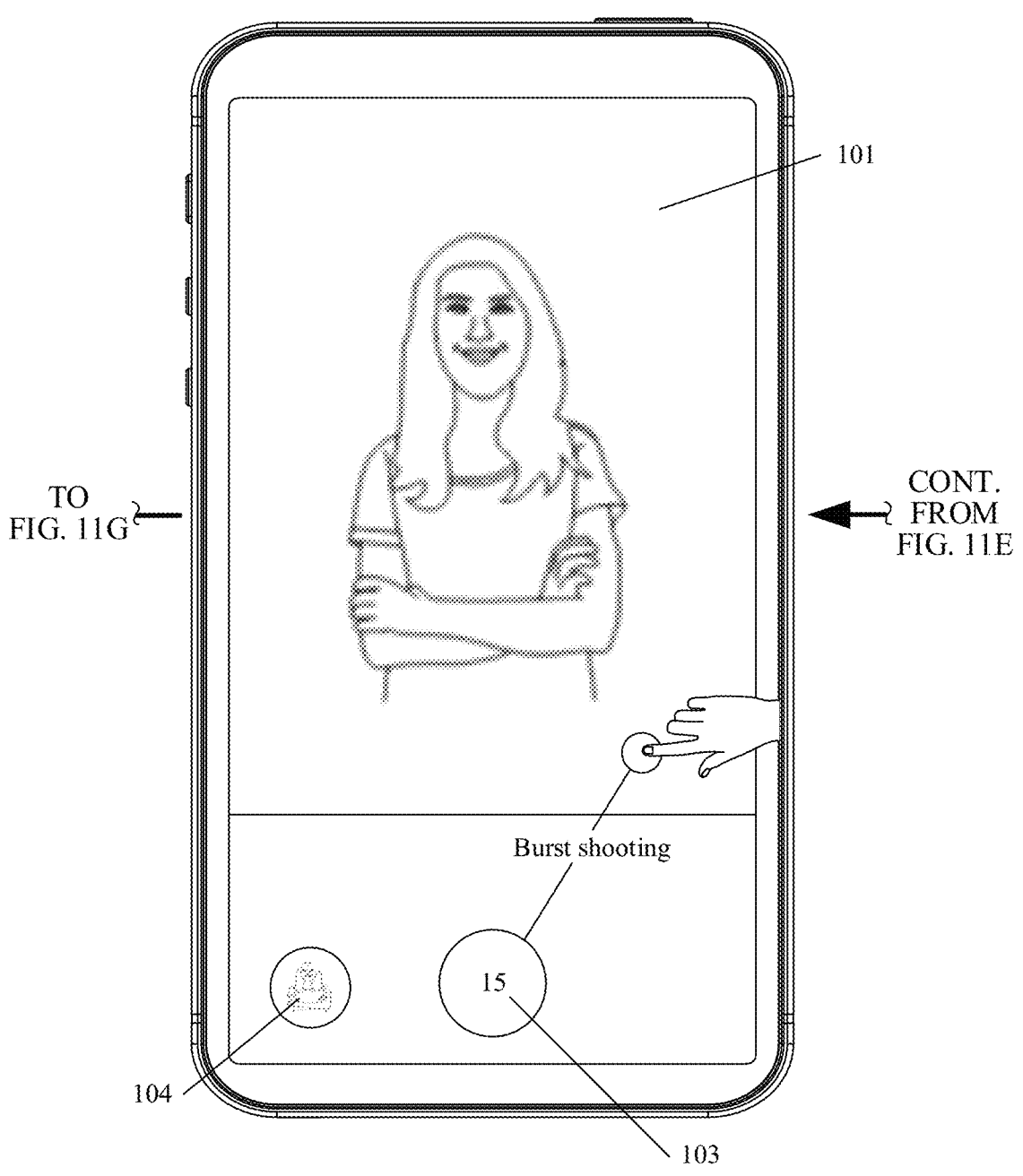
Figure 11G:
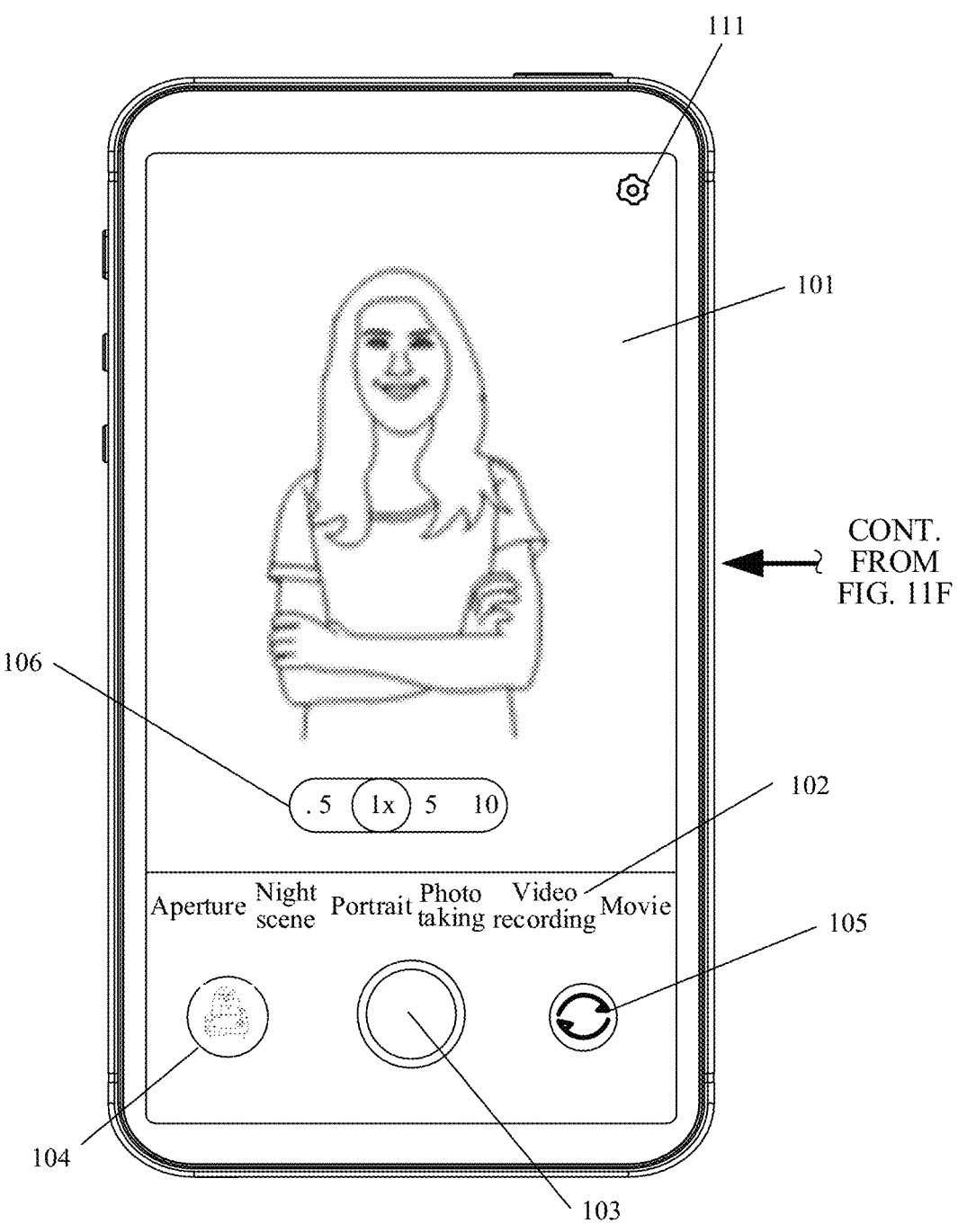

Exemplarily, as shown in FIG. 8, the second region 502 in FIG. 6 is divided into a plurality of angle ranges with different angle ranges, each angle range does not overlap, and each angle range corresponds to the position of one function label. For example, in FIG. 8, an angle range A corresponds to a portrait function, an angle range B corresponds to a burst shooting function, and an angle range C corresponds to a video recording function. When the swiping operation enters the second region 502 from a shooting button region, and a swiping direction corresponds to the angle range A, it is determined that the swiping operation triggers the portrait function. When the swiping operation (indicated by a black arrow) enters the second region 502 from the shooting button region and the swiping direction corresponds to the angle range B, it is determined that the swiping operation triggers the burst shooting function. When the swiping operation enters the second region 502 from the shooting button region, and the swiping direction corresponds to the angle range C, it is determined that the swiping operation triggers the video recording function. This embodiment does not limit the number and a division manner of the angle ranges.

Exemplarily, for facilitating a shortcut operation of a user, it is assumed that a reference direction is divided by taking a positive x-axis direction as an angle, the first region 501 corresponding to 0-180 degrees is divided into a plurality of angle ranges, and each angle range covers one function label. The division number of the angle range and the numerical interval of each angle range can be pre-set by a mobile phone manufacturer by default or manually configured by the user.

A camera function corresponding to each angle range is specifically determined on the basis of the currently displayed camera function. For example, if the photo taking function is currently displayed on a mobile phone, a portrait function label is on the left of a photo taking function label, a video recording function label is on the right thereof, then the middle angle range B (60-120 degrees) corresponds to the burst shooting function, the left angle range A (120-180 degrees) corresponds to the portrait function, and the right angle range C (0-60 degrees) corresponds to the video recording function. If the portrait function is currently displayed on the mobile phone, a night scene function label is on the left of a portrait function label, a photo taking function label is on the right thereof, then the middle angle range B (60-120 degrees) corresponds to the portrait function, the left angle range A (120-180 degrees) corresponds to a night scene function, and the right angle range C (0-60 degrees) corresponds to the burst shooting function.

In one embodiment, each angle covers the text range of the function label, and each angle range corresponds to the camera function corresponding to the function label covered by each angle range, so as to ensure that when the user performs a swiping operation, just by swiping towards a corresponding function label, it can be guaranteed that a camera function corresponding to the function label is triggered. For example, if the user swipes towards the portrait function label, it is determined to trigger the portrait function when the swiping operation passes through the first region 501 and enters the second region 502. If the user swipes towards the video recording function label, it is determined to trigger the video recording function when the swiping operation passes through the first region 501 and enters the second region 502.

It can be understood that any one of the above two manners can be pre-configured by the mobile phone manufacturer by default, or both of them can be pre-configured by the mobile phone manufacturer, and then any one of them is manually selected by the user. In the above two manners, the division manner of the sub-region and the division manner of the angle can be pre-set by the mobile phone manufacturer by default, or manually configured by the user. In addition, the division manner of the sub-region or the angle range can be set on the basis of the swiping direction of the swiping operation or the swiping direction of the swiping operation can be determined on the basis of the division manner of the sub-region or the division manner of the angle. It needs to be supplemented that the swiping direction of the swiping operation is related to division of the sub-region and division of the angle range. Therefore, the swiping direction of the swiping operation needs to match the division manner of the sub-region and the division manner of the angle.

In this application, the division of the sub-region and the division of the angle range are specifically related to the relative position between the shooting button and each function label. In order to facilitate the user in accurately triggering the corresponding camera function by ways of the swiping operation, both the sub-region range and the angle range need to cover a corresponding text for identifying each function label. The text corresponding to each function label can be used to indicate the direction of the swiping operation of the user, so that the user can also accurately trigger the corresponding camera function without deliberately remembering the direction of the swiping operation.

In the existing camera function control manner, the user needs to remember a camera function corresponding to each swiping direction before use. If the user does not remember it or remember it incorrectly, it may lead to an operation error. In addition, the existing camera function control manner only has two swiping directions of swiping to the left and swiping to the right, so the user can only use two camera functions. Moreover, this application associates the swiping direction with the position of the function label. The user only needs to swipe in a direction where the position of each function label is located, and then the camera function corresponding to the position can be triggered. Meanwhile, due to the variable position of the function label, even swiping in the same direction may also trigger different camera functions. Compared to the existing camera function control manner, the camera function control manner of this application does not require deliberately remembering the direction of the swiping operation, and meanwhile supports multi-directional swiping, which not only facilitates the user operation, but also is applicable to various camera functions, improving the use experience of the user for capturing pictures of wonderful moments.

An implementation process of the above camera control methods corresponding to FIG. 7 and FIG. 8 is described below by using an electronic device as a mobile phone and a camera function as a photo taking function.

FIG. 9A and FIG. 9B are a schematic flowchart of a camera function control method provided by an embodiment of this application. Steps of the camera function control method are exemplarily described below; and include:

S901: A mobile phone displays a first interface of a first camera function, and the first interface is an interface for a user to operate camera functions.

The camera function may refer to a shooting mode of a camera, and the camera of the mobile phone may include a plurality of different shooting modes, in other words, the camera of the mobile phone may include a plurality of different camera functions. For example, as mentioned above, the camera of the mobile phone may include different camera functions such as a photo taking mode, a portrait mode, a video recording mode, a night scene mode, and a movie mode.

The first interface may be an interface corresponding to any shooting mode. The first interface may include a viewfinder frame, a shooting button, and other controls configured to set shooting parameters. The viewfinder frame may be configured to display an image captured in real time by the camera of the mobile phone, that is, the viewfinder frame is configured to preview in real time the image captured by the camera. The shooting button is configured to control shooting and save an image or a video. The user may click or swipe the shooting button, and the mobile phone may perform shooting and save the image or video in response to a user operation for the shooting button. The other controls configured to set the shooting parameters may include the foregoing gallery thumbnail, front and rear camera switch button, camera focal length adjustment control, smart visual control, AI photography control, flashlight control, filter shooting mode control, setting button, and the like. By clicking the gallery thumbnail, most recently saved photos or videos in the album may be displayed. By clicking the front and rear camera switch button, front and rear cameras may be switched. By swiping the camera focal length adjustment control, the camera focal length may be adjusted. By clicking the smart visual control, a preset application function, such as item recognition and text recognition, may be opened. By opening the AI photography control, photo taking environments, such as a portrait and a night scene, may be automatically recognized according to different scenarios, and photo taking parameters may be automatically adjusted. By clicking the flashlight control, a flashlight may be controlled to be turned on or off. B clicking the filter shooting mode control, different shooting modes may be selected to add different filters, such as an original image mode, a green and astringent filter mode, and an impression filter mode, to the taken pictures. A setting menu may be opened for setting camera parameters through the setting button.

Exemplarily, the mobile phone opens, in response to a trigger operation of the user for a camera application icon on a home screen, a camera application to display the first interface. It can be understood that after the camera application is opened, the first interface displayed on the mobile phone for the first time may be a default photo taking function interface, as shown in 2b in FIG. 2A to FIG. 2D. It can be further understood that after the camera application is opened, the user may also change, by clicking other function labels on the first interface, an interface of the camera function currently displayed on the mobile phone. For example, when the user clicks a portrait function label, the mobile phone switches to display a portrait function interface, as shown in 2c in FIG. 2A to FIG. 2D.

In this embodiment, the first interface displayed on the mobile phone may be a default camera function interface displayed when the camera application is started, or an interface of a camera function corresponding to the function label selected by the user, that is, the camera function control method in this application may be implemented on any camera function interface.

S902: The mobile phone detects whether a swiping operation of the user on the first interface exists, and the first interface includes a first region and a second region.

Exemplarily, as shown in FIG. 5, the first interface includes a first region 501 and a second region 502. The first region 501 is a control region for the camera function, preferably a shooting button, and the second region 502 is a region around the first region 501.

After starting the camera application and displaying the first interface, the mobile phone continues to detect whether the swiping operation of the user on a mobile phone screen exists on the first interface. The swiping operation may be a swiping operation in any swiping direction or any swiping path. When the swiping operation meets a preset control condition, the mobile phone controls the camera function in response to the swiping operation.

S903: If the swiping operation of the user on the first interface is detected, the mobile phone determines, on the basis of a movement trajectory of a corresponding touch point of the swiping operation, whether the swiping operation enters the second region from the first region.

In this embodiment, when the mobile phone detects that the swiping operation of the user on the first interface exists, the mobile phone obtains the movement trajectory of the touch point of the swiping operation on the screen, and determines, on the basis of the movement trajectory, whether to trigger camera function control.

Exemplarily; as shown in FIG. 6, when the movement trajectory of the touch point of the swiping operation on the screen is entering the second region 502 from the first region 501, the mobile phone further determines whether the swiping direction formed by the movement trajectory of the touch point points to a certain function label. If so, it is determined that the current swiping operation may implement selecting a camera function and triggering the camera function to run.

Selecting a camera function for control according to the control condition in combination with the swiping operation is specifically described below; the control condition in combination with the swiping operation including but not limited to the following two manners.

Manner I: swiping operation+sub-region. The second region includes a plurality of non-overlapping sub-regions, and each sub-region correspondingly covers one function label. Specific implementation process steps of the manner are as follows:

S904A: If the swiping operation enters the second region from the first region, when the swiping operation enters a target sub-region of the second region, the mobile phone determines a camera function corresponding to the target sub-region as a camera function triggered by the swiping operation.

As shown in FIG. 7, the second region 502 is divided into a plurality of sub-regions with different orientations, each sub-region does not overlap, and each sub-region correspondingly covers one function label. For example, in FIG. 7, a sub-region 701 corresponds to a portrait function label, a sub-region 702 corresponds to a photo taking function label, and a sub-region 703 corresponds to a video recording function label. When the swiping operation enters the sub-region 701 from the shooting button region, it is determined that the swiping operation triggers a portrait function. When the swiping operation enters the sub-region 702 from the shooting button region, it is determined that the swiping operation triggers a burst shooting function. When the swiping operation enters the sub-region 703 from the shooting button region, it is determined that the swiping operation triggers a video recording function.

S904B: The mobile phone starts the camera function triggered by the swiping operation, the layout of the first interface currently displayed on the mobile phone is adjusted to display a second interface corresponding to the camera function triggered by the swiping operation, and the second interface is a corresponding interface formed when the camera function runs.

In a process that the user performs the swiping operation on the first interface, the mobile phone automatically determines the camera function triggered by the swiping operation, then starts the camera function, adjusts the layout of the first interface currently displayed on the mobile phone in a startup process, such as hiding the function label, a flashlight icon, a setting menu icon, etc., or meanwhile further displays interface elements that are not displayed on the first interface before, such as displaying a video recording control button and video recording time when the video recording function is triggered.

It needs to be further described that starting the camera function to run and displaying the second interface corresponding to the camera function can be performed simultaneously, or after the second interface corresponding to the camera function is displayed, the camera function is started to run so as to take photos or record videos. In addition, the timing for starting the camera function to run can be either when the user swipes his/her finger out of the shooting button and then makes the finger enter the second region, or when the user swipes his/her finger over a corresponding function label.

S904C: If the camera function triggered by the swiping operation is the burst shooting function, the mobile phone controls, on the basis of the swiping operation, the burst shooting function to perform continuous photo taking on the second interface corresponding to the burst shooting function.

In this embodiment, after triggering the camera function, the mobile phone can further control, on the basis of the swiping operation, the camera function to run. For example, after the user swipes from the shooting button to the "photo taking" label and continues to swipe upwards to a certain distance, the finger stays on a screen of the mobile phone, and in response to the user operation of staying on the screen of the mobile phone, the mobile phone continues to perform continuous photo taking and save images. The number of the continuous photo taking and saved images can be related to the length of time during which the user's finger stays on the screen. After the user raises his/her finger from the screen, in response to the raising operation, the mobile phone can stop taking photos.

The camera function triggered by the swiping operation is the burst shooting function for achieving continuous photo taking, specifically including a photo taking function for achieving continuous photo taking or a portrait function for achieving continuous photo taking. By ways of the swiping operation of the user, the photo taking function or the portrait function can be used to perform continuous photo taking, thereby achieving burst shooting of photo taking or portrait burst shooting, reducing the operation of the user using a certain camera function to perform burst shooting and improves the use experience of the user.

In one possible implementation, the mobile phone sets the maximum number of burst shooting by default, or the user can pre-set the maximum number of burst shooting. In this way, if the mobile phone continues to perform continuous photo taking in response to the user operation of staying on the screen of the mobile phone, and saves images. When the number of performing continuous photo taking reaches the maximum number, even if the mobile phone detects that the user's finger still stays on the screen of the mobile phone, that is, the operation of the user raising his/her finger from the screen is not detected, the mobile phone can also stop taking photos.

In an implementation of the control condition in combination with the swiping operation of this embodiment, by dividing the second region, the plurality of function labels are respectively associated with each sub-region, making it convenient for the user to operate each corresponding sub-region by ways of swiping operation, and then control a plurality of camera functions through each sub-region. Compared to the existing camera function control manner, the camera function control manner of this application does not require deliberately remembering the direction of the swiping operation, and meanwhile supports multi-directional swiping, which not only facilitates the user operation, but also is applicable to various camera functions, improving the use experience of the user for capturing pictures of wonderful moments.

Manner II: swiping operation+angle. The second region corresponds to a plurality of non-overlapping angle ranges, and each angle range correspondingly covers one function label. Specific implementation process steps of the manner are as follows.

S905A: If the swiping operation enters the second region from the first region, when the swiping operation enters the second region, the mobile phone calculates an included angle between a swiping direction corresponding to the swiping operation and a preset reference direction.

As shown in FIG. 8, the second region 502 in FIG. 6 is divided into a plurality of angle ranges with different orientations, each angle range does not overlap, and each angle range correspondingly covers one function label. For example, in FIG. 8, an angle range A corresponds to a portrait function label, an angle range B corresponds to a photo taking function label, and an angle range C corresponds to a video recording function label. When the swiping operation enters the second region 502 from a shooting button region, and a swiping direction corresponds to the angle range A, it is determined that the swiping operation triggers the portrait function. When the swiping operation enters the second region 502 from the shooting button region, and the swiping direction corresponds to the angle range B, it is determined that the swiping operation triggers the photo taking function. When the swiping operation enters the second region 502 from the shooting button region, and the swiping direction corresponds to the angle range C, it is determined that the swiping operation triggers the video recording function.

It is assumed that a reference direction is divided by taking a positive x-axis direction as an angle, when the swiping operation enters the second region from the first region, the included angle between the swiping direction corresponding to the swiping operation and the preset reference direction is calculated, and the included angle is used for determining the camera function triggered by the swiping operation.

S905B: The mobile phone determines a camera function corresponding to the angle range including the included angle as the camera function triggered by the swiping operation.

As shown in FIG. 8, it is assumed that the angle range C (0 to 60 degrees) corresponds to the video recording function label, the angle range B (60 to 120 degrees) corresponds to the photo taking function label, and the angle range A (120 to 180 degrees) corresponds to the portrait function label. If the calculated included angle is 30 degrees, the included angle is within the angle range of 0 to 60 degrees, and it is determined that the swiping operation triggers the video recording function. If the calculated included angle is 90 degrees, the included angle is within the angle range of 60 to 120 degrees, and it is determined that the swiping operation triggers the burst shooting function. If the calculated included angle is 150 degrees, the included angle is within the angle range of 120 to 180 degrees, and it is determined that the swiping operation triggers the portrait function.

S905C: The mobile phone starts the camera function triggered by the swiping operation, the layout of the first interface currently displayed on the mobile phone is adjusted to display the second interface corresponding to the camera function triggered by the swiping operation, and the second interface is a corresponding interface formed when the camera function runs.

S905D: If the camera function triggered by the swiping operation is the burst shooting function, the mobile phone controls, on the basis of the swiping operation, the burst shooting function to perform continuous photo taking on the second interface corresponding to the burst shooting function.

The above steps S905C and S905D are the same as the steps S904B and S904C, and are not repeated here.

Exemplarily, FIG. 10A to FIG. 10F are a schematic diagram of a swiping photo taking interface. As shown in 10*a* in FIG. 10A to FIG. 10F, when a mobile phone opens a camera application in response to a user operation, the mobile phone displays a first interface corresponding to a photo taking function label by default. The user does not select other function labels, but directly performs a swiping operation on the first interface corresponding to the current photo taking function label (as shown in 10*a* in FIG. 10A to FIG. 10F, a black arrow indicates a swiping direction). As shown in 10*b* in FIG. 10A to FIG. 10F, when the swiping operation swipes outward from an internal region of a shooting button and passes through the edge of the shooting button, the mobile phone determines, on the basis of a movement trajectory of a touch point of the swiping operation on a screen, that the current swiping direction points to the photo taking function label, hides interface elements unrelated to the current photo taking, such as various function labels, a flashlight icon, and a setting menu icon, displays a viewfinder frame, a gallery thumbnail, and the shooting button (i.e., the second interface), and displays words "burst shooting" at the position of an original photo taking function label. Meanwhile, a number is displayed in the middle position of the shooting button, and the number represents the current cumulative number of continuously taken photos (initial value of 0). As shown in 10*c* in FIG. 10A to FIG. 10F, when the swiping operation continues to swipe in a direction where text ("burst shooting") of the photo taking function is located to enter the second region 502 and passes through the words "burst shooting", a connection line between the touch point of the swiping operation and the edge of the shooting button is displayed, and the connection line is used to indicate the swiping direction corresponding to the swiping operation. As shown in 10*d* in FIG. 10A to FIG. 10F, when the swiping operation continues to swipe in the current swiping direction, the number displayed in the middle position of the shooting button starts to increase. Meanwhile, as the number of the continuously taken photos increases, display of thumbnail preview photos displayed in the gallery thumbnail also refreshes accordingly. As shown in 10*e* in FIG. 10A to FIG. 10F, when the swiping operation stops, but the touch point does not disappear (the user's finger still stays on the current second interface), and the number displayed in the middle position of the shooting button continues to increase. It needs to be further described that when the cumulative number of the continuously taken photos reaches the maximum burst shooting number threshold, the mobile phone ends burst shooting and resumes displaying a third interface corresponding to the photo taking function label. As shown in 10*f* in FIG. 10A to FIG. 10F, when the touch point corresponding to the swiping operation disappears (the user's finger leaves the current second interface), the mobile phone ends burst shooting and resumes displaying the third interface corresponding to the photo taking function label before burst shooting starts, and refreshes display content of the gallery thumbnail. The third interface and the first interface both belong to operation interfaces of the camera function. The differences between the third interface and the first interface lie in that the content displayed in the gallery thumbnail is different, and the content displayed in real time in the viewfinder frame is different. Since both the content displayed in the gallery thumbnail and the content displayed in real time in the viewfinder frame dynamically change, the third interface can be directly regarded as the first interface at different time moments to a certain extent.

Exemplarily. FIG. 11A to FIG. 11G are a schematic diagram of another swiping photo taking interface. Exemplarily, as shown in 11*a* in FIG. 11A to FIG. 11G, after a mobile phone opens a camera application in response to a user operation, the mobile phone displays a first interface corresponding to a photo taking function label by default. As shown in 11*b* in FIG. 11A to FIG. 11G, a user selects the first interface corresponding to other camera function labels, such as selecting a portrait function label, and then the mobile phone correspondingly displays the first interface corresponding to the portrait function label. The user performs a swiping operation on the first interface corresponding to the current portrait function label (as shown in 11*b* in FIG. 11A to FIG. 11G, a black arrow indicates a swiping direction). As shown in 11*c* in FIG. 11A to FIG. 11G, when the swiping operation swipes outward from an internal region of a shooting button and passes through the edge of the shooting button, the mobile phone determines, on the basis of a movement trajectory of a touch point of the swiping operation on a screen, that the current swiping direction points to the photo taking function label, hides interface elements unrelated to the current photo taking, such as various function labels, a flashlight icon, and a setting menu icon, only displays a viewfinder frame, a gallery thumbnail, and the shooting button (i.e., the second interface), and displays words "burst shooting" at the position of an original photo taking function label. Meanwhile, a number is displayed in the middle position of the shooting button, and the number represents the current cumulative number of continuously taken photos (initial value of 0). As shown in 11*d* in FIG. 11A to FIG. 11G, when the swiping operation continues to swipe in a direction where text ("burst shooting") of the photo taking function is located to enter the second region 502 and passes through the words "burst shooting", a connection line between the touch point of the swiping operation and the edge of the shooting button is displayed, and the connection line is used to indicate the swiping direction corresponding to the swiping operation. As shown in 11*e* in FIG. 11A to FIG. 11G, when the swiping operation continues to swipe in the current swiping direction, the number displayed in the middle position of the shooting button starts to increase. Meanwhile, as the number of the continuously taken photos increases, display of thumbnail preview photos displayed in the gallery thumbnail also refreshes accordingly. As shown in 11*f* in FIG. 11A to FIG. 11G, when the swiping operation stops, but the touch point does not disappear (the user's finger still stays on the current second interface), and the number displayed in the middle position of the shooting button continues to increase. It needs to be further described that when the cumulative number of the continuously taken photos reaches the maximum burst shooting number threshold, the mobile phone ends burst shooting and resumes displaying a first interface corresponding to the portrait function label. As shown in 11*g* in FIG. 11A to FIG. 11G, when the touch point corresponding to the swiping operation disappears (the user's finger leaves the current second interface), the mobile phone ends burst shooting and resumes displaying the third interface corresponding to the portrait function label before burst shooting starts, and refreshes display content of the gallery thumbnail. The third interface and the first interface both belong to operation interfaces of the camera function. The differences between the third interface and the first interface lie in that the content displayed in the gallery thumbnail is different, and the content displayed in real time in the viewfinder frame is different.

Exemplarily, FIG. 12A to FIG. 12F are a schematic diagram of a swiping portrait burst shooting interface. As shown in 12*a* in FIG. 12A to FIG. 12F, when a mobile phone opens a camera application in response to a user operation, the mobile phone displays a first interface corresponding to a photo taking function label by default. A user does not select other function labels, but directly performs a swiping operation on the first interface corresponding to the current photo taking function label (as shown in 12*a* in FIG. 12A to FIG. 12F, a black arrow indicates a swiping direction). As shown in 12*b* in FIG. 12A to FIG. 12F, when the swiping operation swipes outward from an internal region of a shooting button and passes through the edge of the shooting button, the mobile phone determines, on the basis of a movement trajectory of a touch point of the swiping operation on a screen, that the current swiping direction points to a portrait function label, hides interface elements unrelated to the current photo taking, such as various function labels, a flashlight icon, and a setting menu icon, only displays a viewfinder frame, a gallery thumbnail, and the shooting button (i.e., the second interface), and displays words "portrait burst shooting" at the position of an original portrait function label. Meanwhile, a number is displayed in the middle position of the shooting button, and the number represents the current cumulative number of continuously taken photos (initial value of 0). As shown in 12*c* in FIG.

Figure 12A:
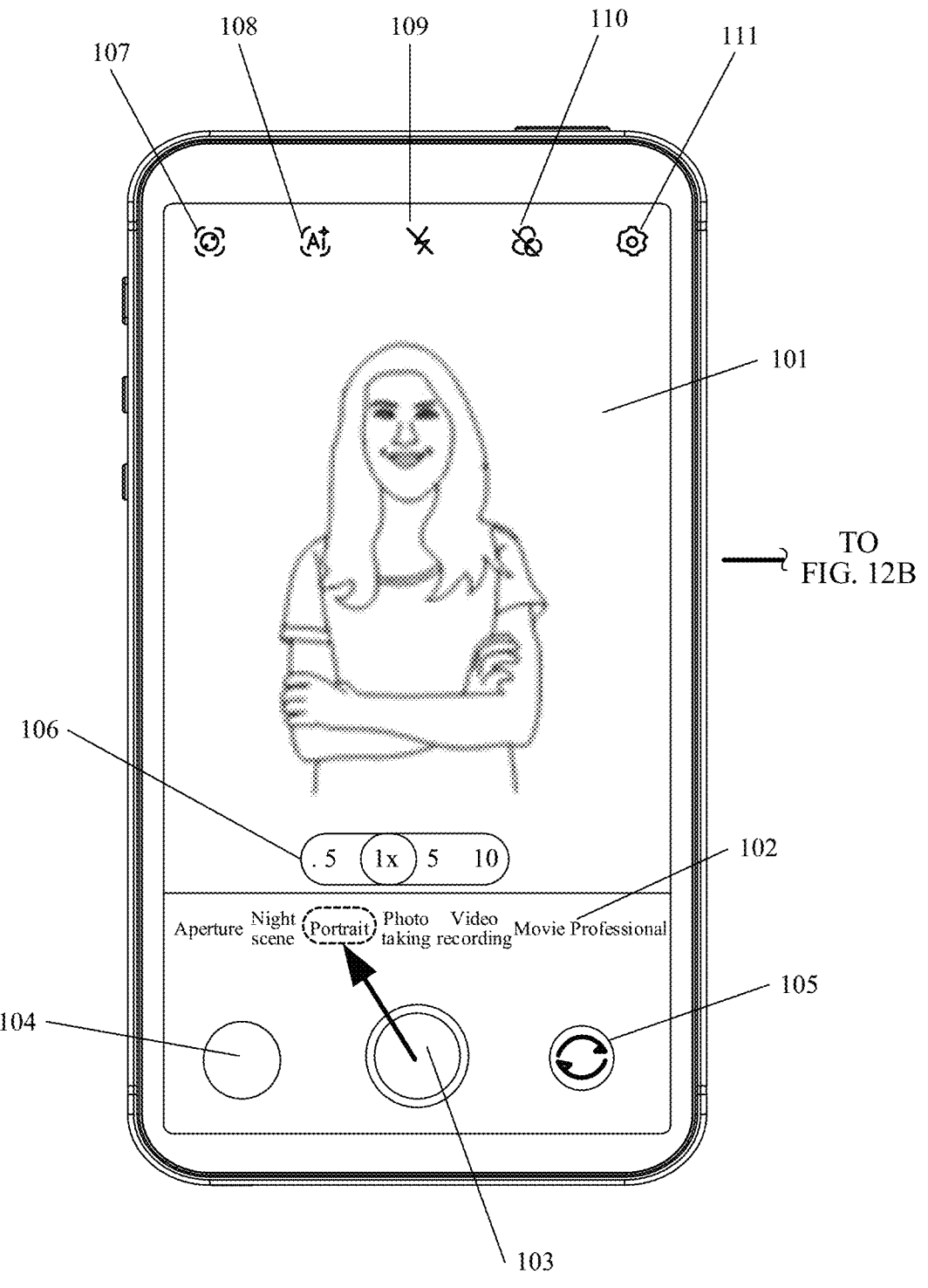
FIG. 12A to FIG. 12F are a schematic diagram of an interface provided by an embodiment of this application where a user swipes to perform portrait burst shooting.
Figure 12B:
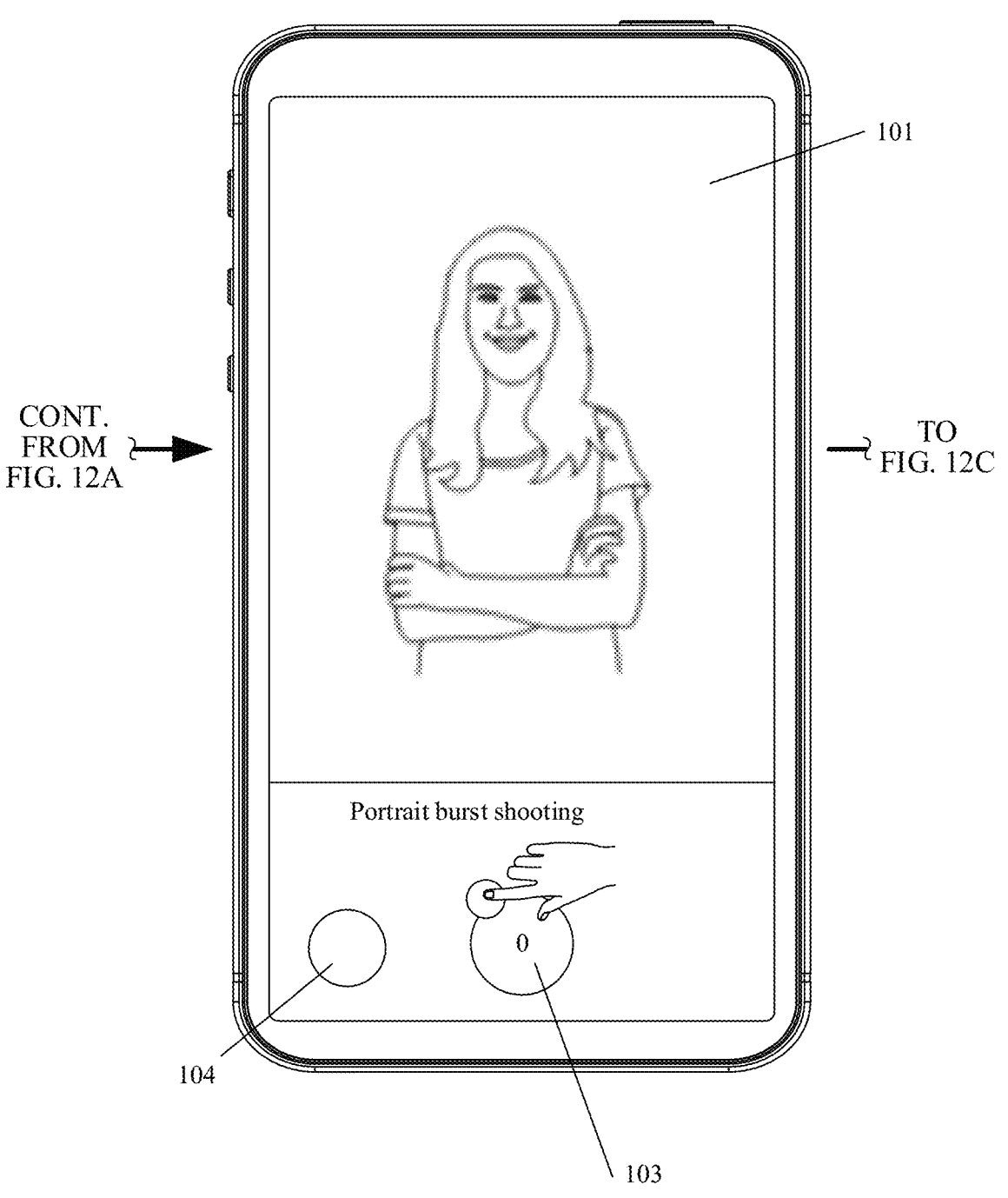
Figures 12B, 12C:
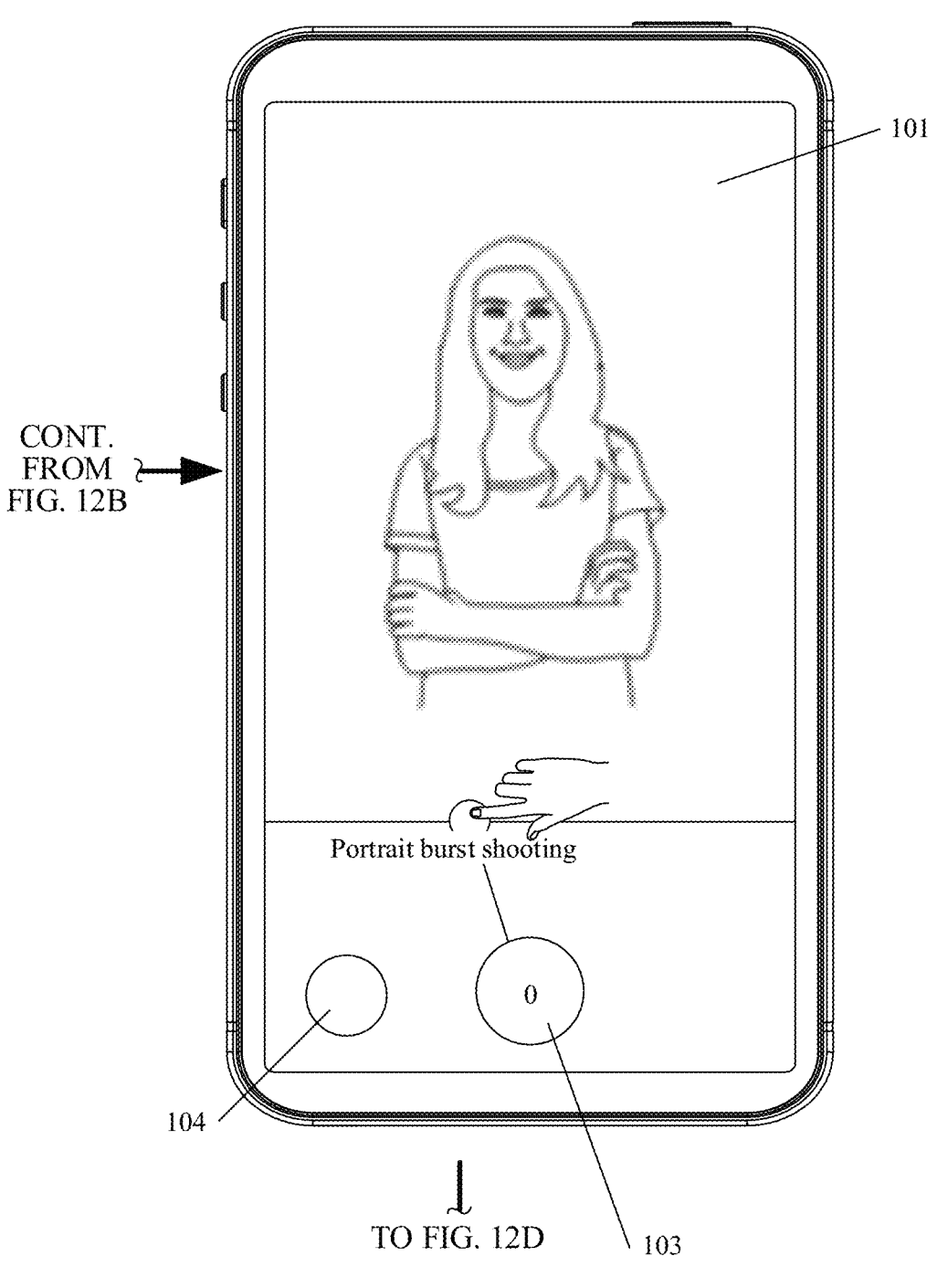
Figures 12D, 12E:
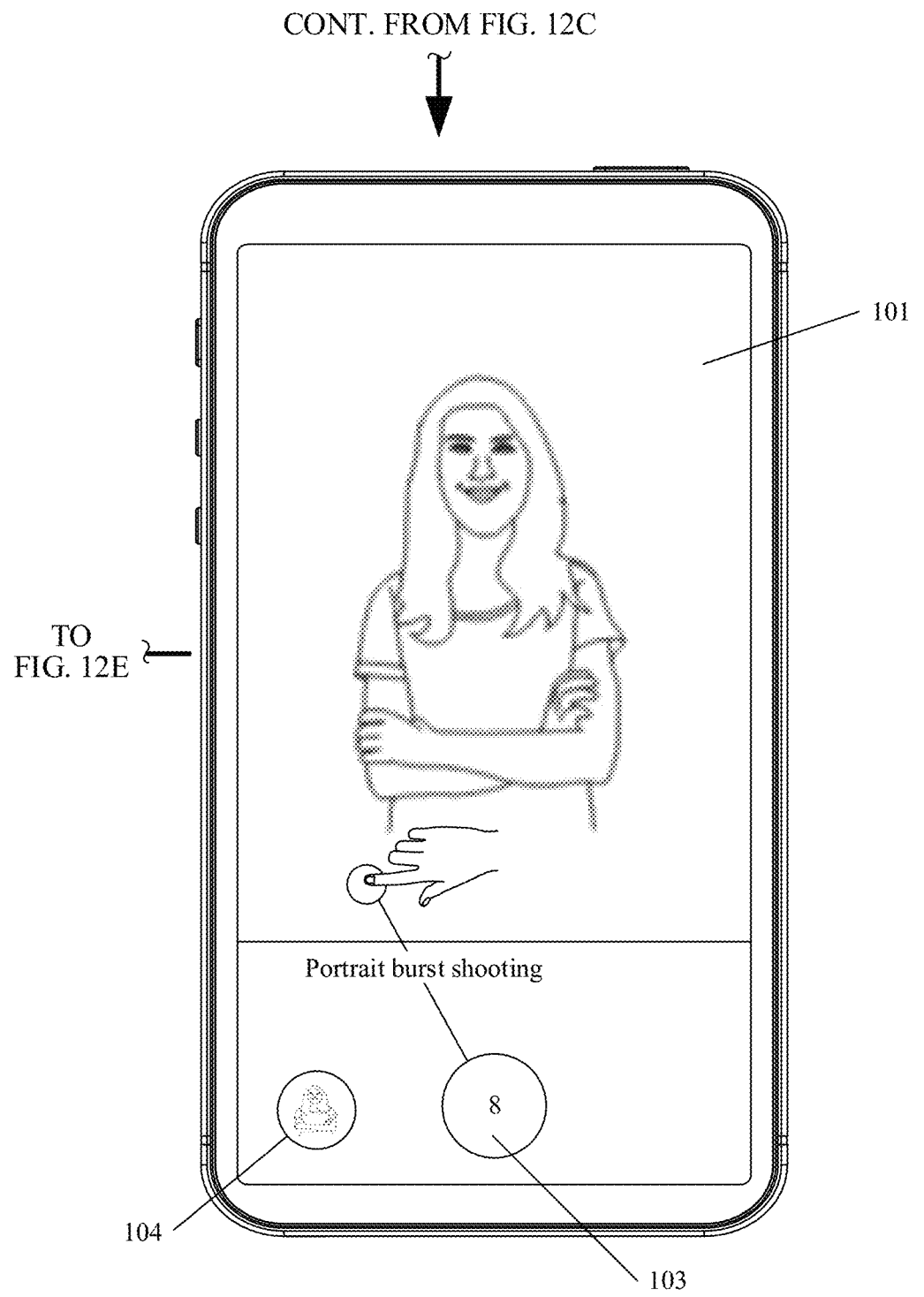
Figures 12D, 12E, 12F:
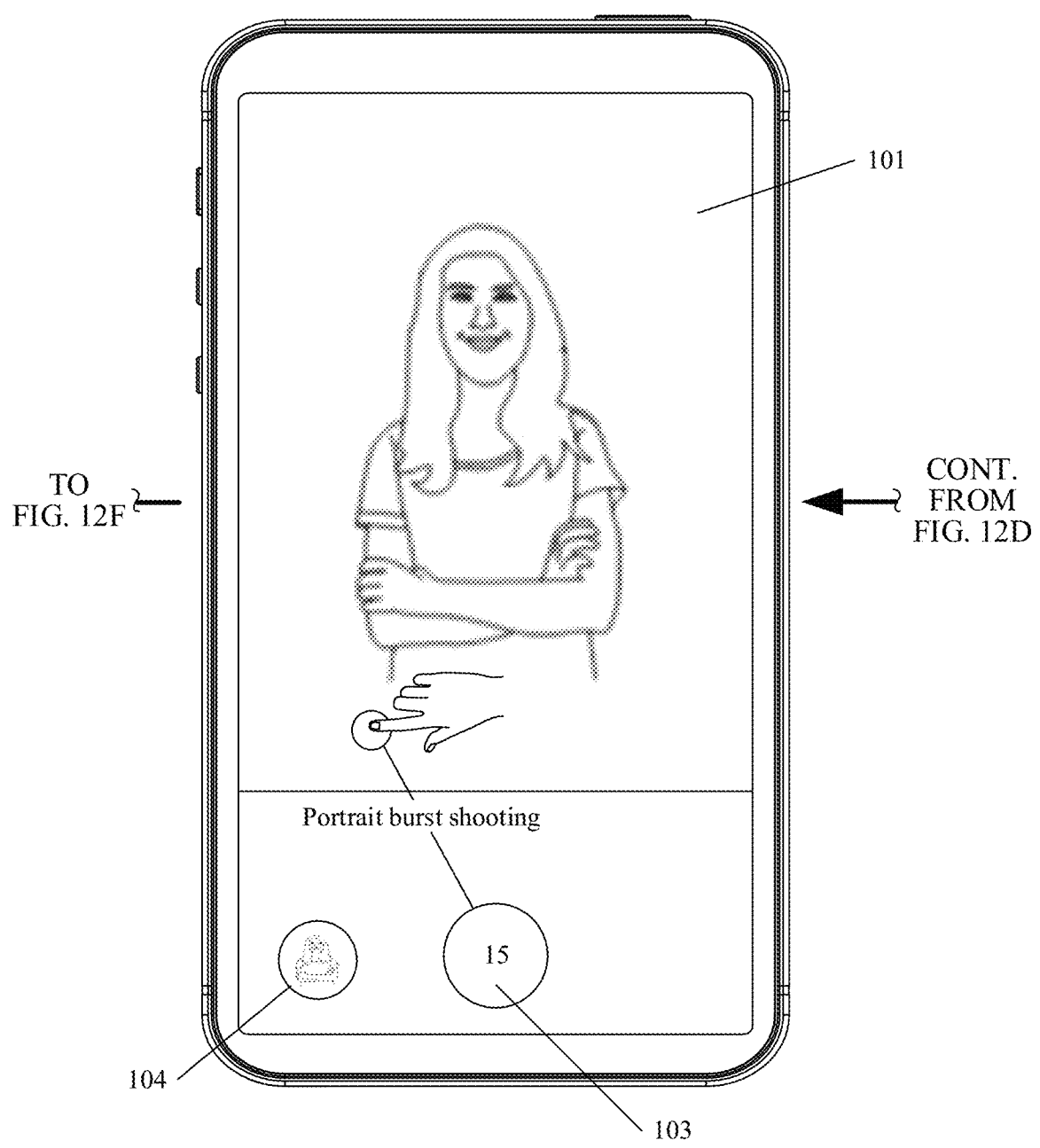
Figures 12E, 12F:
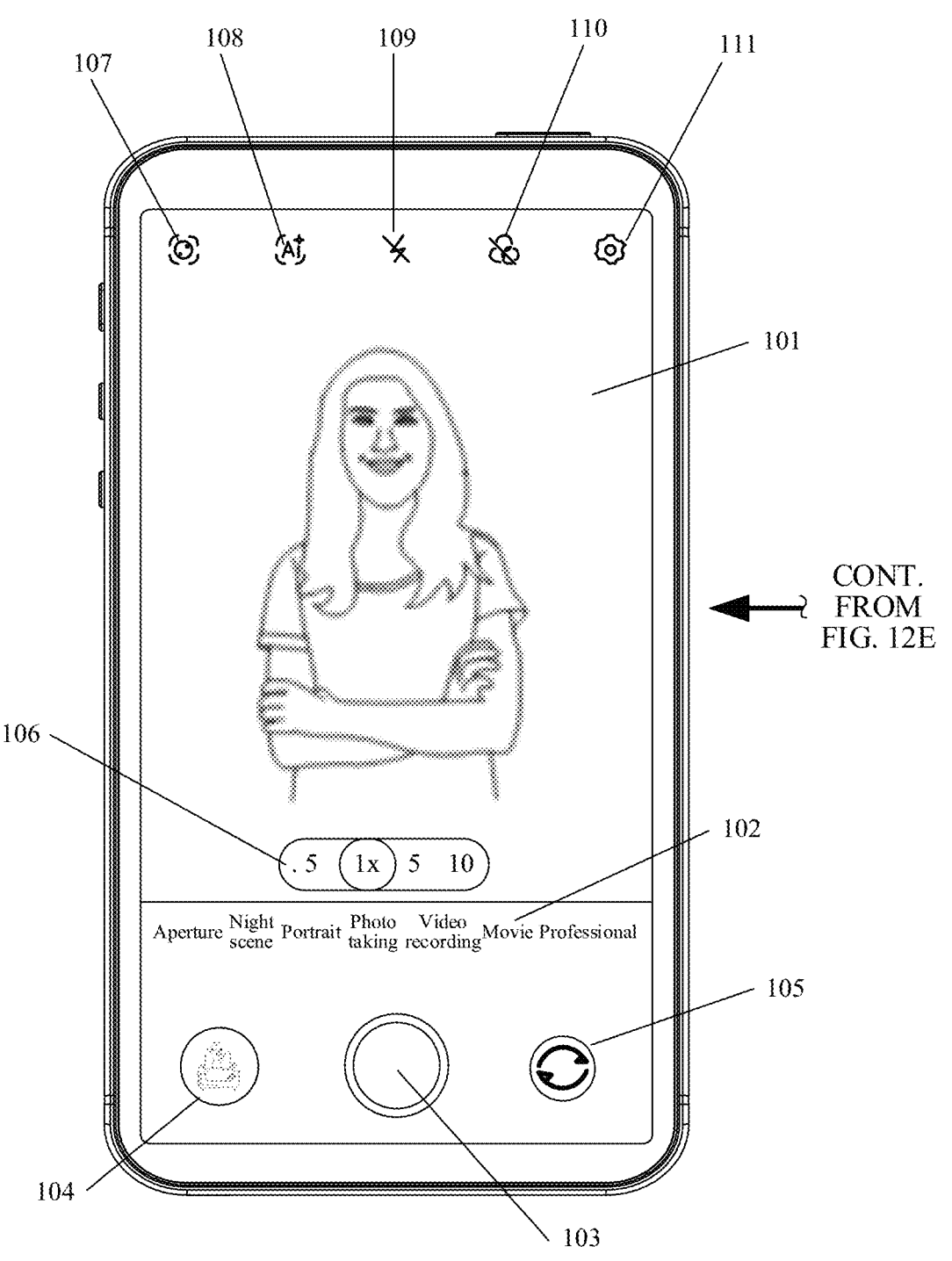
Figure 13A:
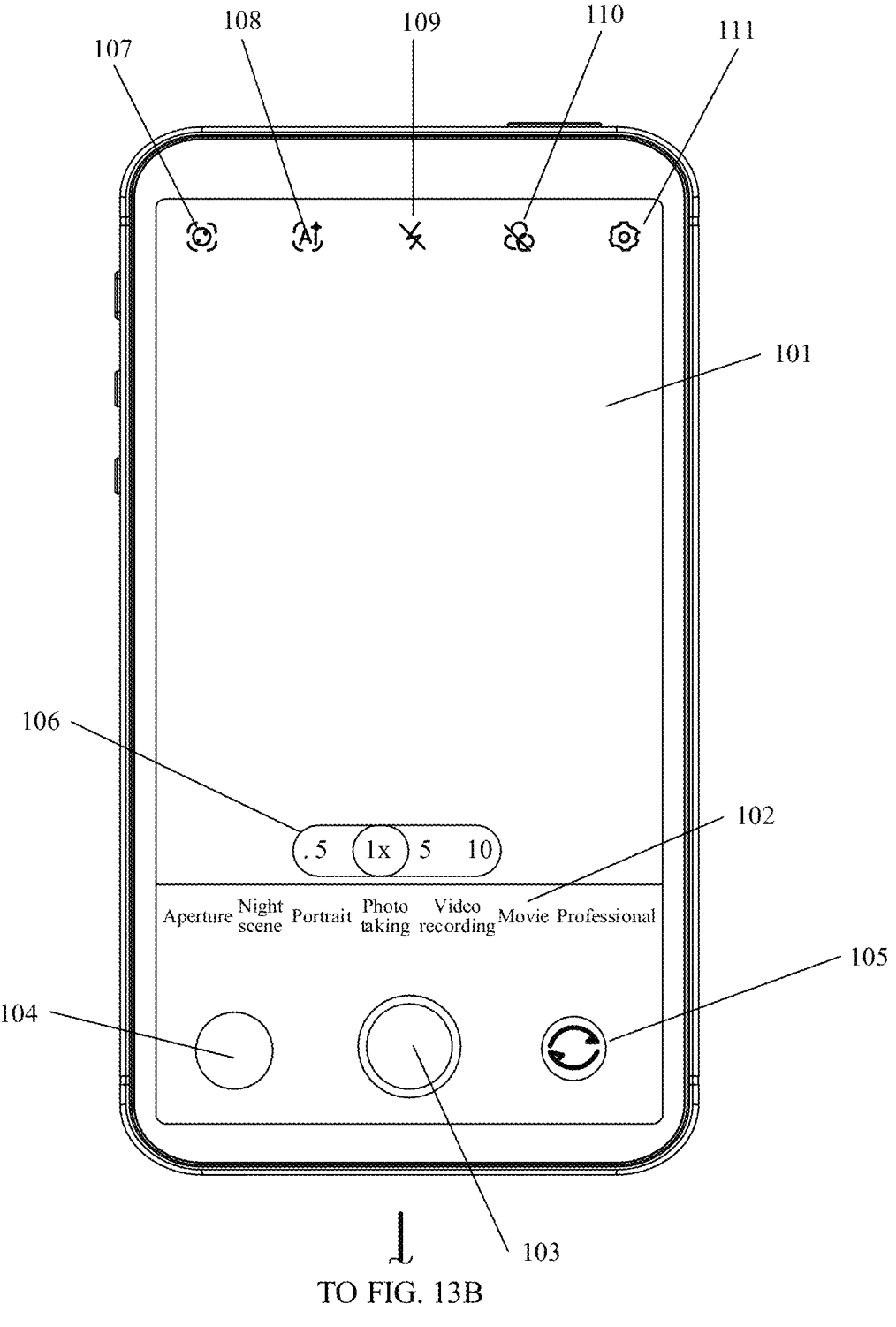
FIG. 13A to FIG. 13G are another schematic diagram of an interface provided by an embodiment of this application where a user swipes to perform portrait burst shooting.
Figures 13B, 13C:
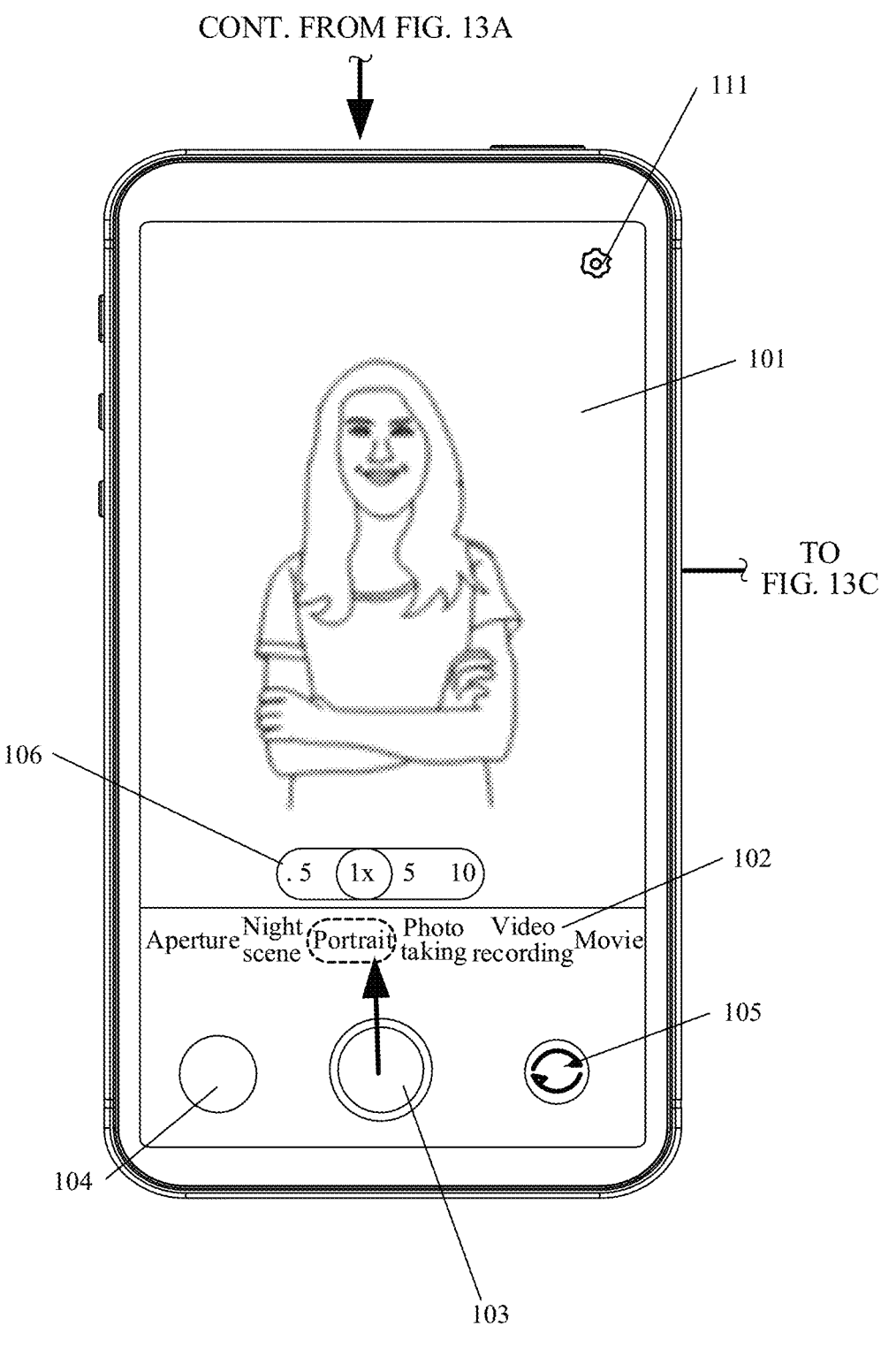
Figures 13B, 13C, 13D:
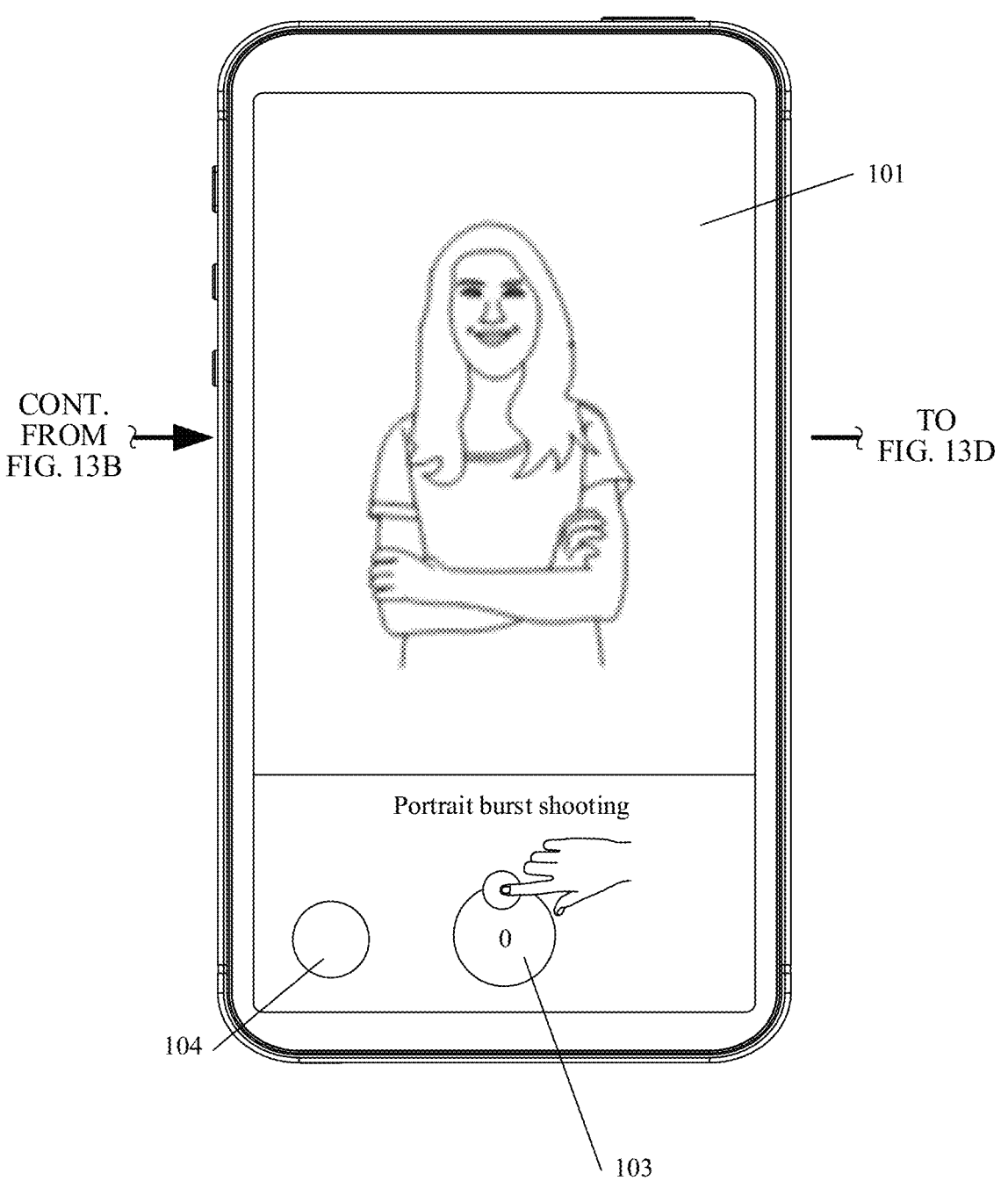
Figures 13C, 13D:
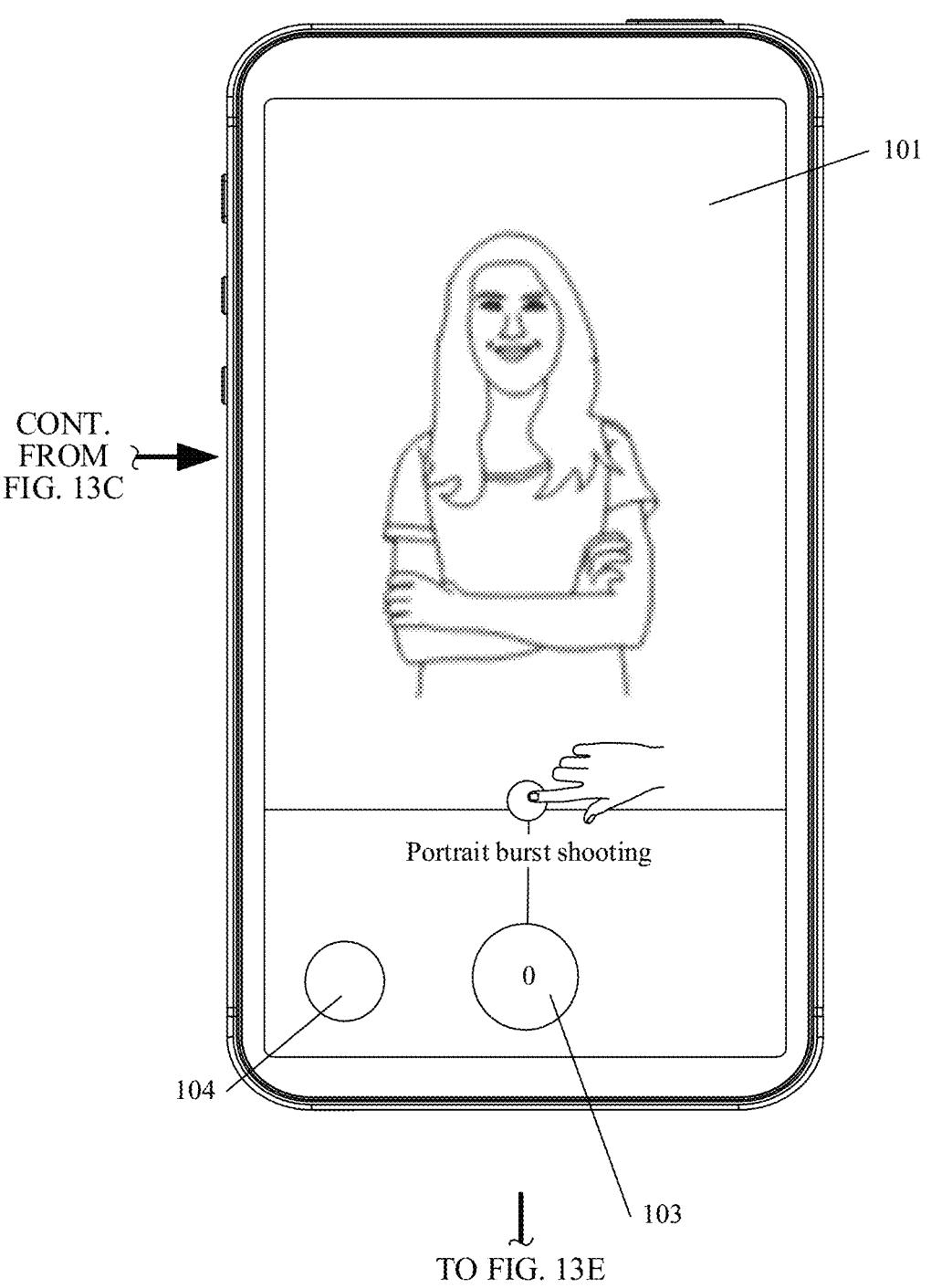
Figures 13E, 13F:
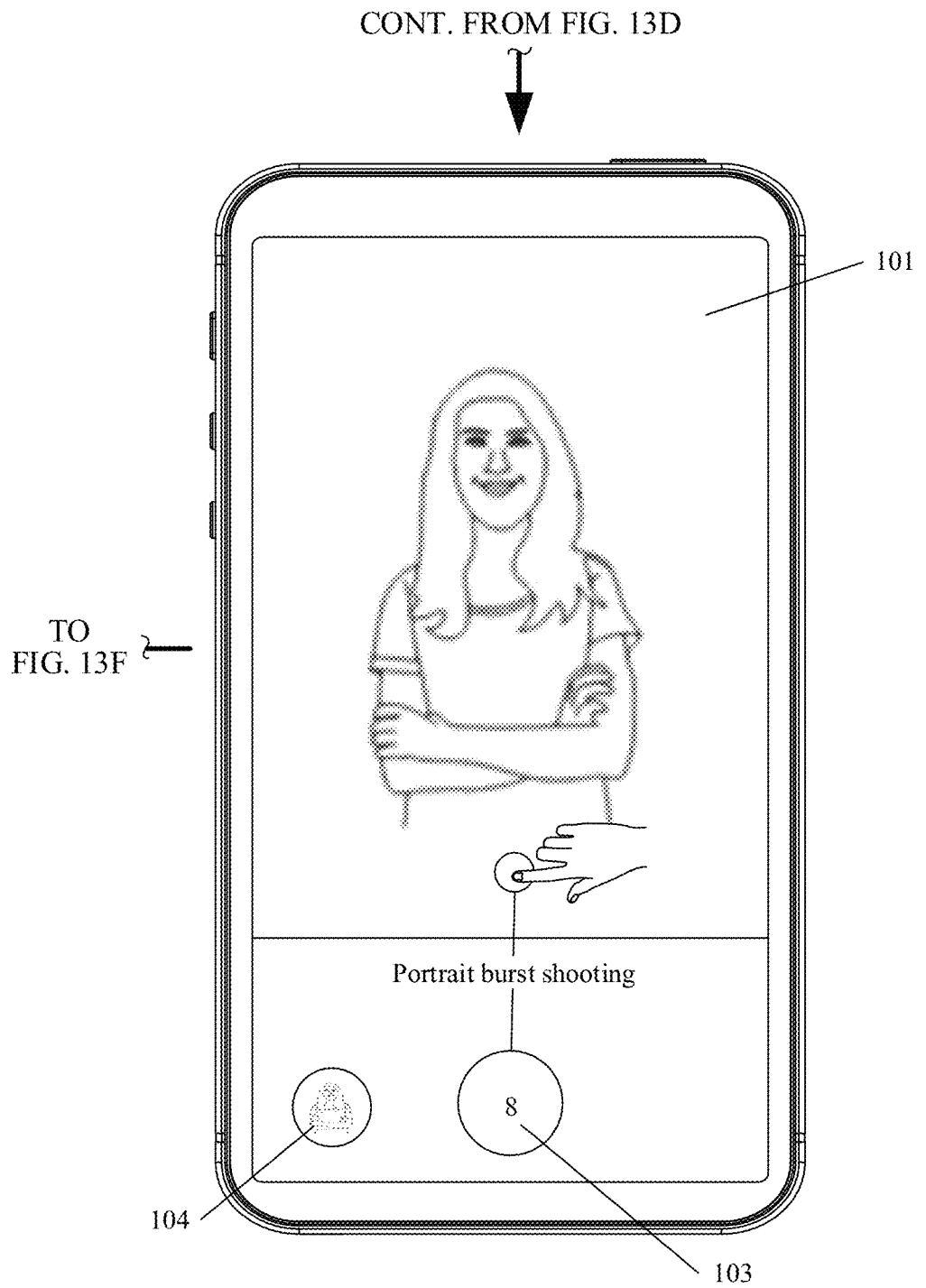
Figures 13E, 13F, 13G:
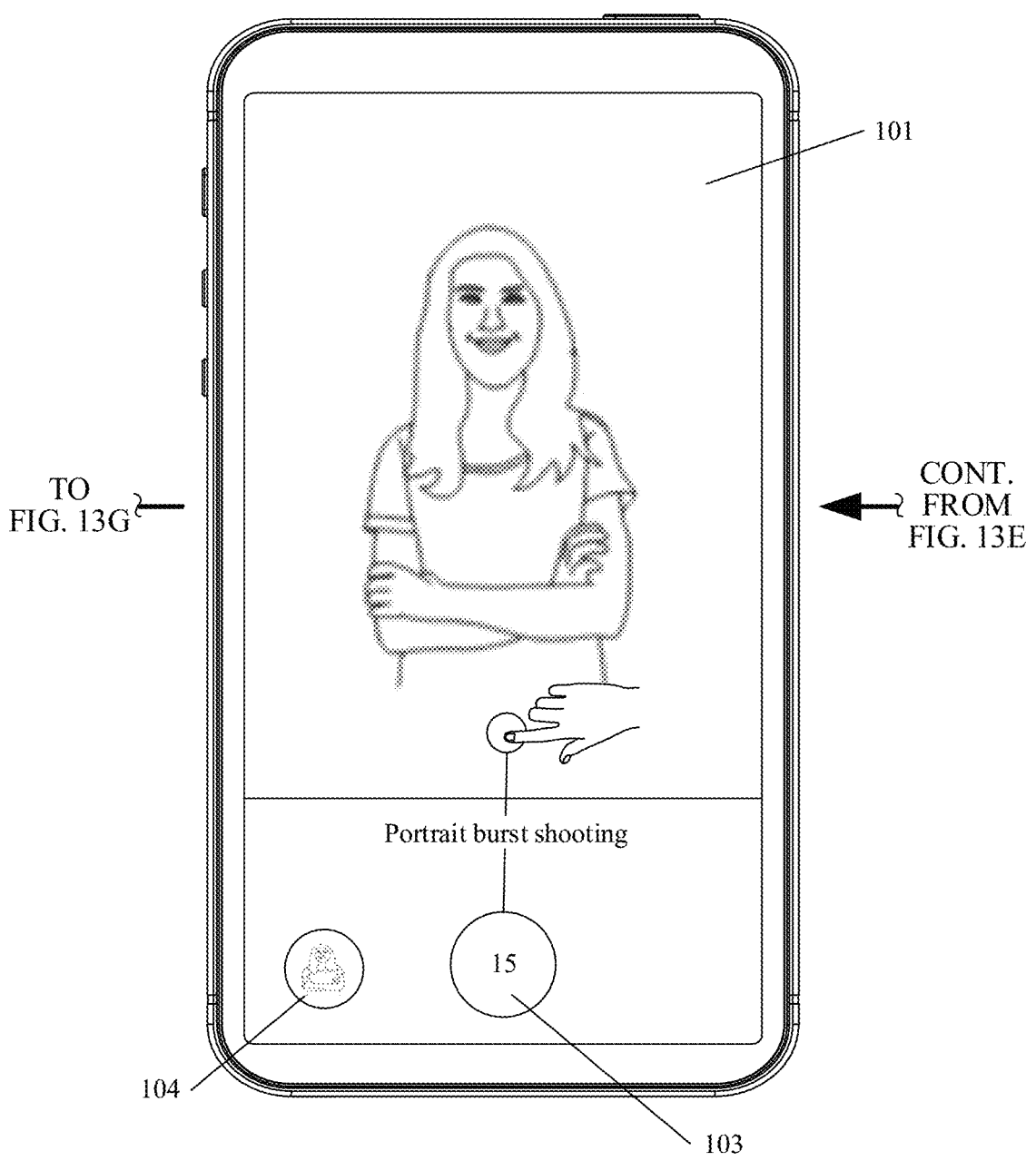
Figures 13F, 13G:
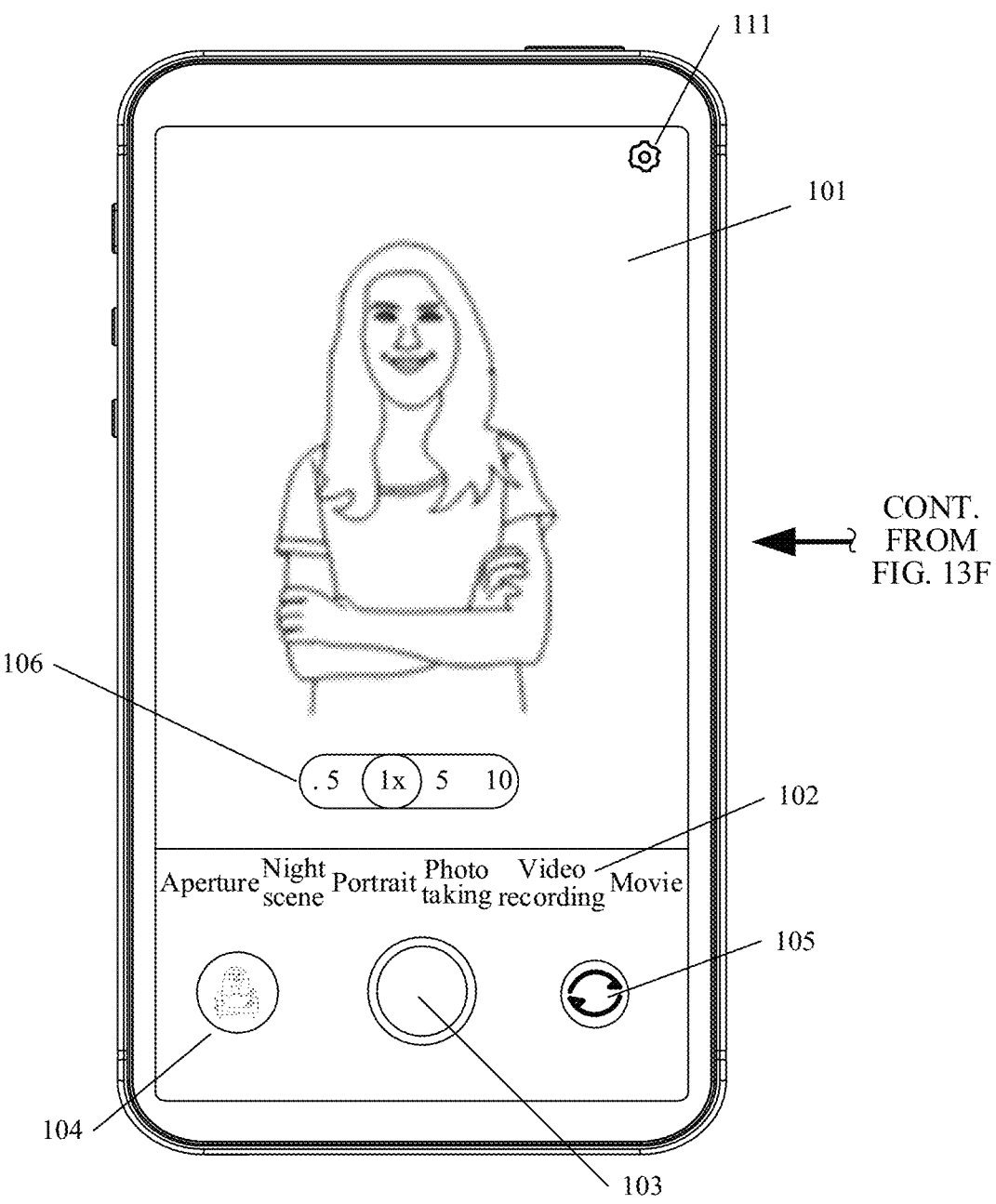
Figure 14A:
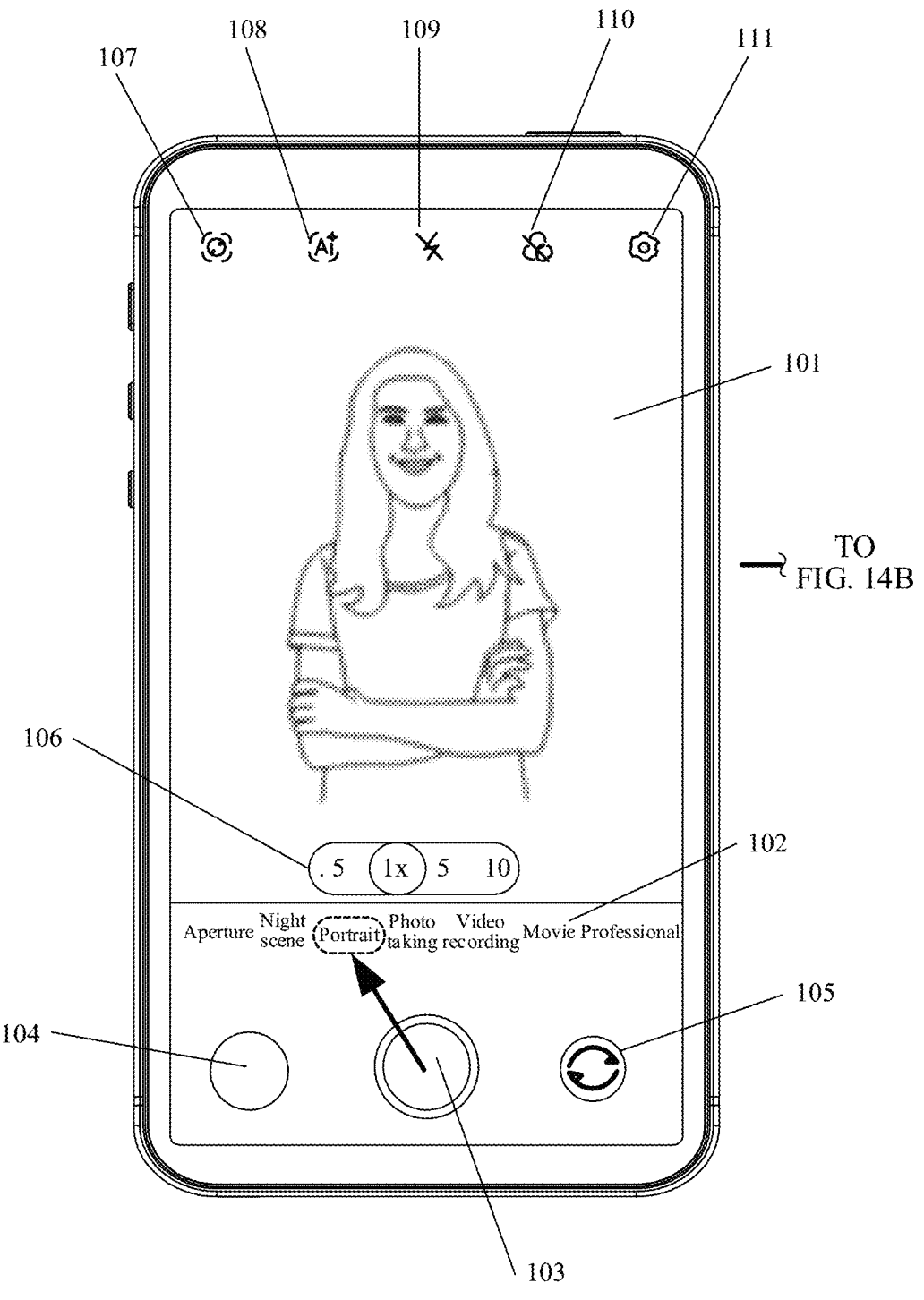
FIG. 14A to FIG. 14D are a schematic diagram of an interface provided by an embodiment of this application where a user swipes to perform portrait photo taking.
Figures 14A, 14B:
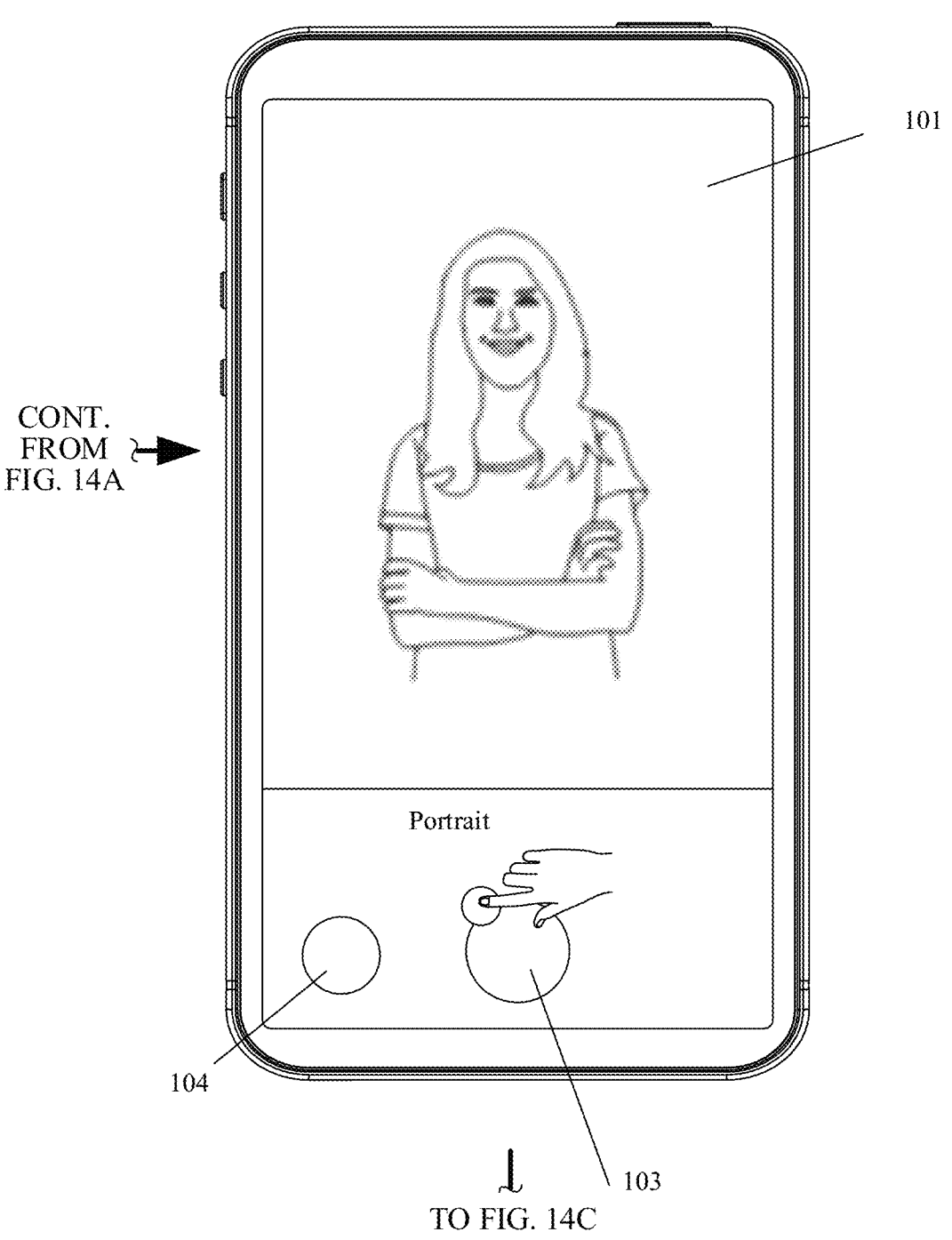
Figures 14C, 14D:
Figures 14C, 14D:
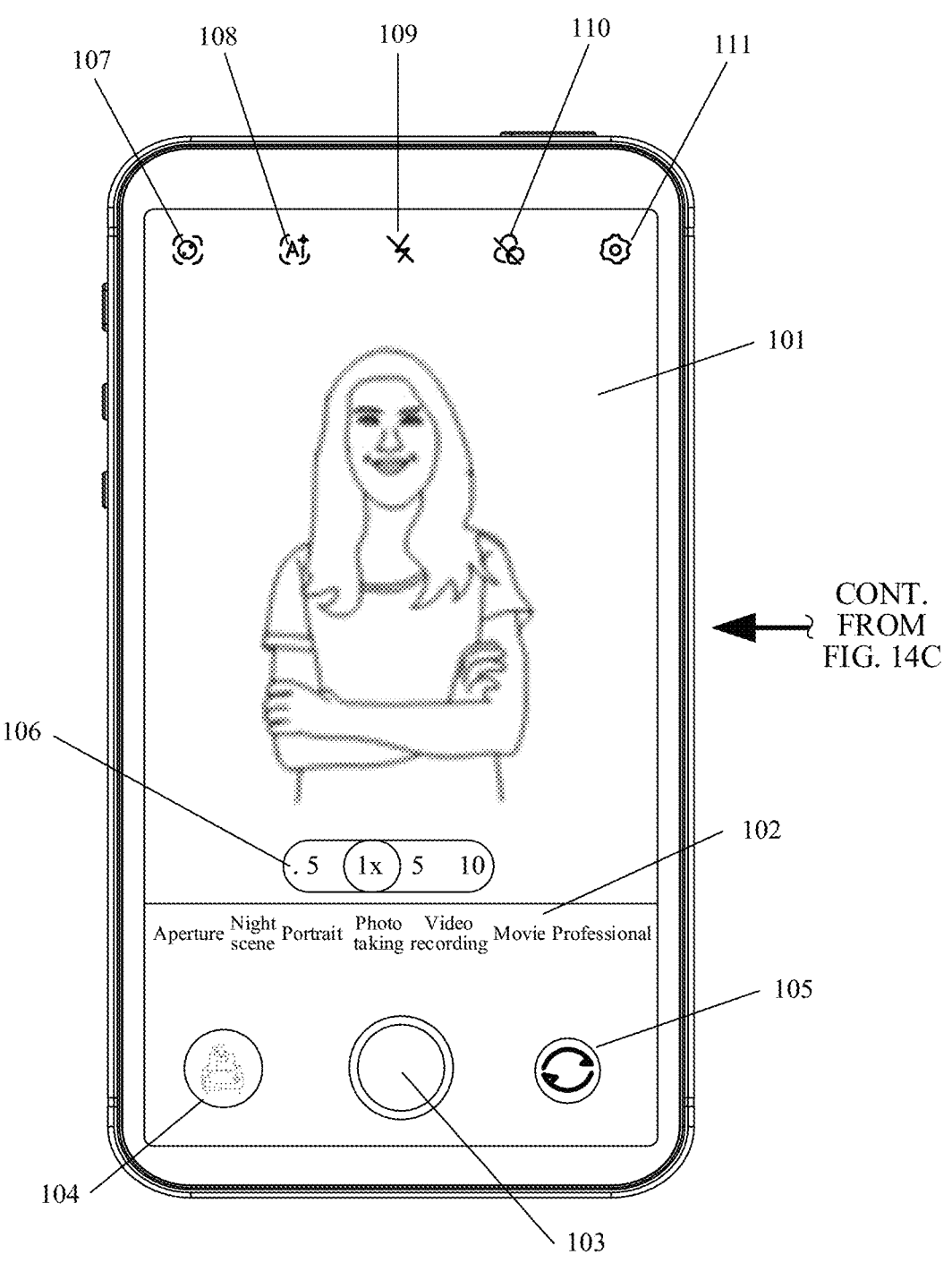

12A to FIG. 12F, when the swiping operation continues to swipe in a direction where text ("portrait burst shooting") of the portrait function is located to enter the second region 502 and passes through the words "portrait burst shooting", a connection line between the touch point of the swiping operation and the edge of the shooting button is displayed, and the connection line is used to indicate the swiping direction corresponding to the swiping operation. As shown in 12*d* in FIG. 12A to FIG. 12F, when the swiping operation continues to swipe in the current swiping direction, the number displayed in the middle position of the shooting button starts to increase. Meanwhile, as the number of the continuously taken photos increases, display of thumbnail preview photos displayed in the gallery thumbnail also refreshes accordingly. As shown in 12*e* in FIG. 12A to FIG. 12F, when the swiping operation stops, but the touch point does not disappear (the user's finger still stays on the current second interface), and the number displayed in the middle position of the shooting button continues to increase. It needs to be further described that when the cumulative number of the continuously taken photos reaches the maximum burst shooting number threshold, the mobile phone ends portrait burst shooting and resumes displaying the first interface corresponding to the photo taking function label. As shown in 12*f* in FIG. 12A to FIG. 12F, when the touch point corresponding to the swiping operation disappears (the user's finger leaves the current second interface), the mobile phone ends portrait burst shooting and resumes displaying a third interface corresponding to the photo taking function label before portrait burst shooting starts, and refreshes display content of the gallery thumbnail. The third interface and the first interface both belong to operation interfaces of the camera function. The differences between the third interface and the first interface lie in that the content displayed in the gallery thumbnail is different, and the content displayed in real time in the viewfinder frame is different.

Exemplarily: FIG. 13A to FIG. 13G are a schematic diagram of another swiping portrait burst shooting interface. As shown in 13*a* in FIG. 13A to FIG. 13G, after a mobile phone opens a camera application in response to a user operation, the mobile phone displays a first interface corresponding to a photo taking function label by default. As shown in 13*b* in FIG. 13A to FIG. 13G, the user selects the first interface corresponding to other camera function labels, such as selecting a portrait function label, and then the mobile phone correspondingly displays the first interface corresponding to the portrait function label. The user performs a swiping operation on the first interface corresponding to the current portrait function label (as shown in 13*b* in FIG. 13A to FIG. 13G, a black arrow indicates a swiping direction). As shown in 13*c* in FIG. 13A to FIG. 13G, when the swiping operation swipes outward from an internal region of a shooting button and passes through the edge of the shooting button, the mobile phone determines, on the basis of a movement trajectory of a touch point of the swiping operation on a screen, that the current swiping direction points to a portrait function label, hides interface elements unrelated to the current photo taking, such as various function labels, a flashlight icon, and a setting menu icon, only displays a viewfinder frame, a gallery thumbnail, and the shooting button (i.e., the second interface), and displays words "portrait burst shooting" at the position of an original portrait function label. Meanwhile, a number is displayed in the middle position of the shooting button, and the number represents the current cumulative number of continuously taken photos (initial value of 0)). As shown in 13d in FIG. 13A to FIG. 13G, when the swiping operation continues to swipe in a direction where text ("portrait burst shooting") of the portrait function is located to enter the second region 502 and passes through the words "portrait burst shooting", a connection line between the touch point of the swiping operation and the edge of the shooting button is displayed, and the connection line is used to indicate the swiping direction corresponding to the swiping operation. As shown in 13e in FIG. 13A to FIG. 13G, when the swiping operation continues to swipe in the current swiping direction, the number displayed in the middle position of the shooting button starts to increase. Meanwhile, as the number of the continuously taken photos increases, thumbnail preview photos displayed in the gallery thumbnail also refreshes accordingly. As shown in 13f in FIG. 13A to FIG. 13G, when the swiping operation stops, but the touch point does not disappear (the user's finger still stays on the current second interface), and the number displayed in the middle position of the shooting button continues to increase. It needs to be further described that when the cumulative number of the continuously taken photos reaches the maximum burst shooting number threshold, the mobile phone ends portrait burst shooting and resumes displaying the first interface corresponding to the portrait function label. As shown in 13g in FIG. 13A to FIG. 13G, when the touch point corresponding to the swiping operation disappears (the user's finger leaves the current second interface), the mobile phone ends portrait burst shooting and resumes displaying the third interface corresponding to the portrait function label before portrait burst shooting starts, and refreshes display content of the gallery thumbnail. The third interface and the first interface both belong to operation interfaces of the camera function. The differences between the third interface and the first interface lie in that the content displayed in the gallery thumbnail is different, and the content displayed in real time in the viewfinder frame is different.

Exemplarily. FIG. 14A to FIG. 14D are a schematic diagram of a swiping portrait photo taking interface. As shown in 14a in FIG. 14A to FIG. 14D, after a mobile phone opens a camera application in response to a user operation, the mobile phone displays a first interface corresponding to a photo taking function label by default. A user does not select other function labels, but directly performs a swiping operation on the first interface corresponding to the current photo taking function label (as shown in 14a in FIG. 14A to FIG. 14D, the black arrow indicates a swiping direction). As shown in 14b in FIG. 14A to FIG. 14D, when the swiping operation swipes outward from an internal region of a shooting button and passes through the edge of the shooting button, the mobile phone determines, on the basis of a movement trajectory of a touch point of the swiping operation on a screen, that the current swiping direction points to a portrait function label, hides interface elements unrelated to the current photo taking, such as various function labels, a flashlight icon, and a setting menu icon, displays a viewfinder frame, a gallery thumbnail, and the shooting button (i.e., the second interface), and displays a word "portrait" at the position of an original portrait function label. As shown in 14c in FIG. 14A to FIG. 14D, when the swiping operation continues to swipe in a direction where text ("portrait") of a portrait function is located to enter a second region 502 and passes through the word "portrait", a connection line between the touch point of the swiping operation and the edge of the shooting button is displayed, and the connection line is used to indicate a swiping direction corresponding to the swiping operation. Meanwhile, one portrait photo is taken and thumbnail preview photos displayed in the gallery thumbnail are refreshed. As shown in 14d in FIG. 14A to FIG. 14D, when the touch point corresponding to the swiping operation disappears (the user's finger leaves the current second interface), the mobile phone ends portrait photo taking and resumes displaying a third interface corresponding to the photo taking function label before portrait photo taking starts, and refreshes display content of the gallery thumbnail. The third interface and the first interface both belong to operation interfaces of the camera function. The differences between the third interface and the first interface lie in that the content displayed in the gallery thumbnail is different, and the content displayed in real time in the viewfinder frame is different.

In one optional embodiment, when controlling the photo taking function to perform continuous photo taking, a mobile phone invokes an image processing program adapted to the photo taking function to sequentially perform image processing on each generated photo. For example, if the mobile phone currently controls the portrait function to perform continuous photo taking, the mobile phone will automatically invoke a beautification program to process the portrait photo every time it generates one portrait photo, for example, face slimming, smoothing, background blurring, and the like are used for processing the portrait photo. If a user pre-sets beautification parameters, the beautification parameters set by the user are used: otherwise, default beautification parameters of the beautification program will be used.

In one optional embodiment, if a camera function triggered by a swiping operation of a user is a video recording function, continuing, on a second interface of the video recording function in response to the swiping operation, to swipe in a direction where text of the video recording function is located to control the video recording function to record videos; and switching, when the swiping operation fails, to display a third interface of the video recording function and continuing to keep the video recording function running.

Figure 15:
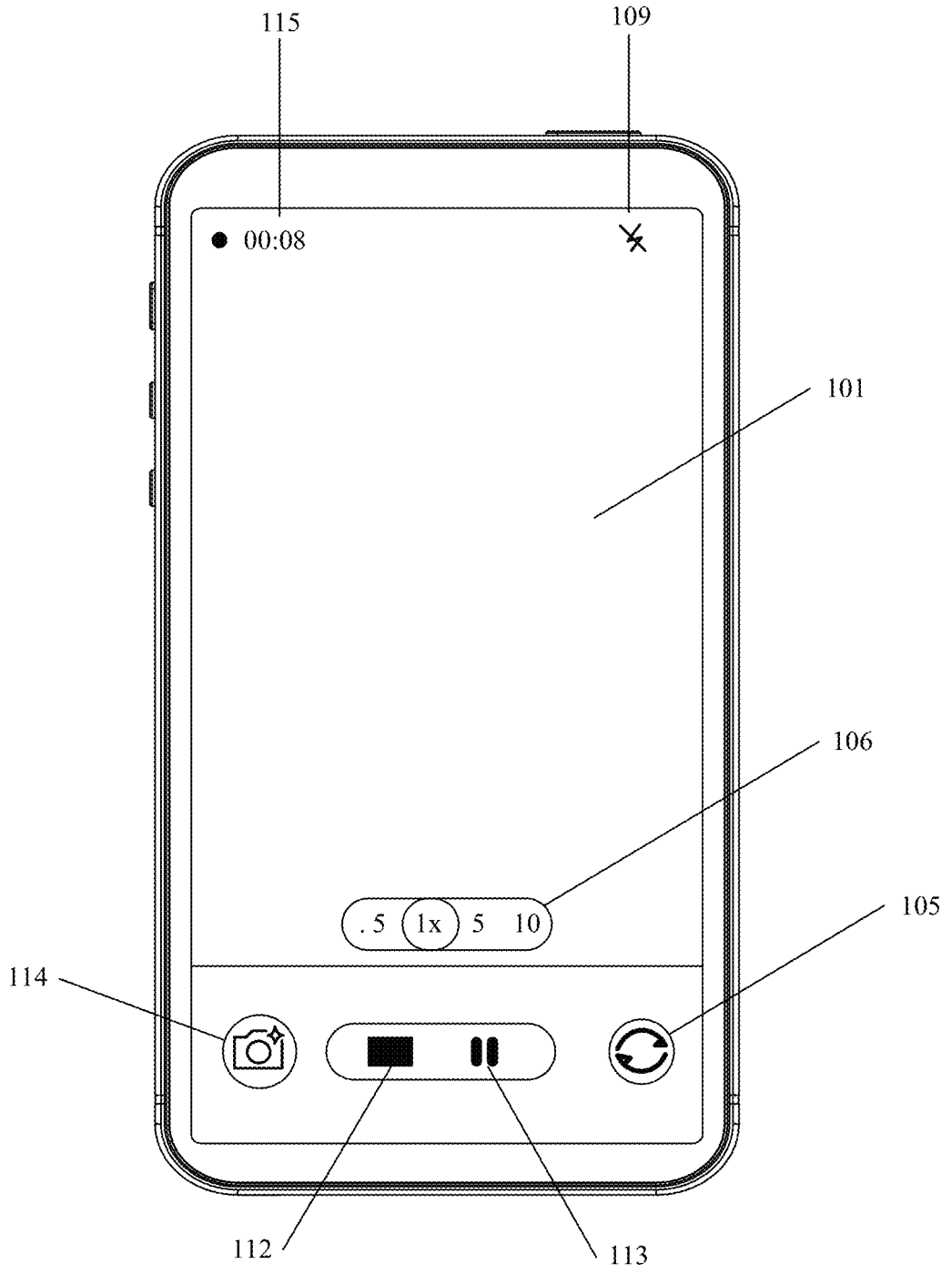
FIG. 15 is a schematic diagram of a video recording interface of a mobile phone provided by an embodiment of this application.
Figure 16A:
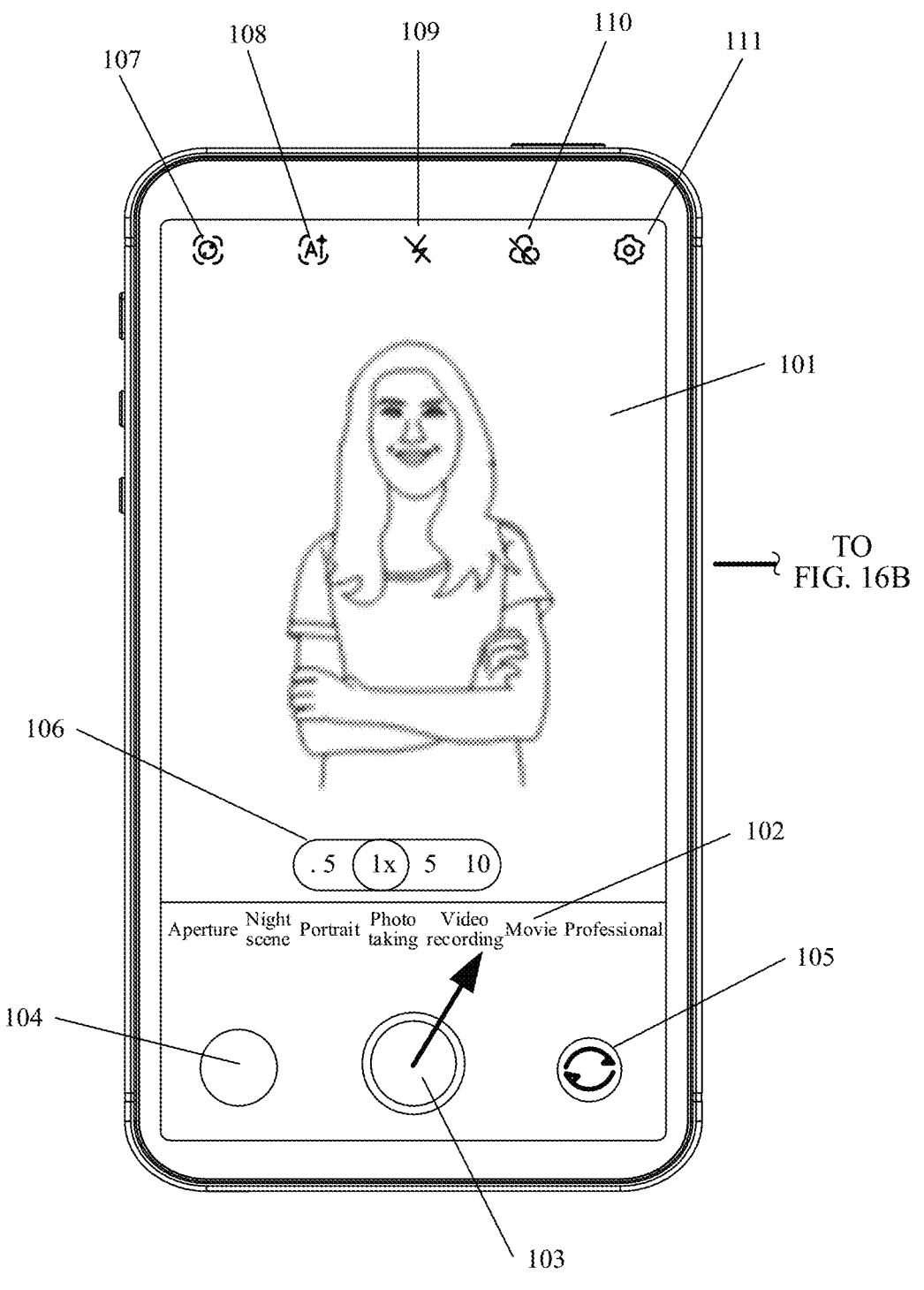
FIG. 16A to FIG. 16F are a schematic diagram of an interface provided by an embodiment of this application where a user swipes to record videos.
Figure 16B:
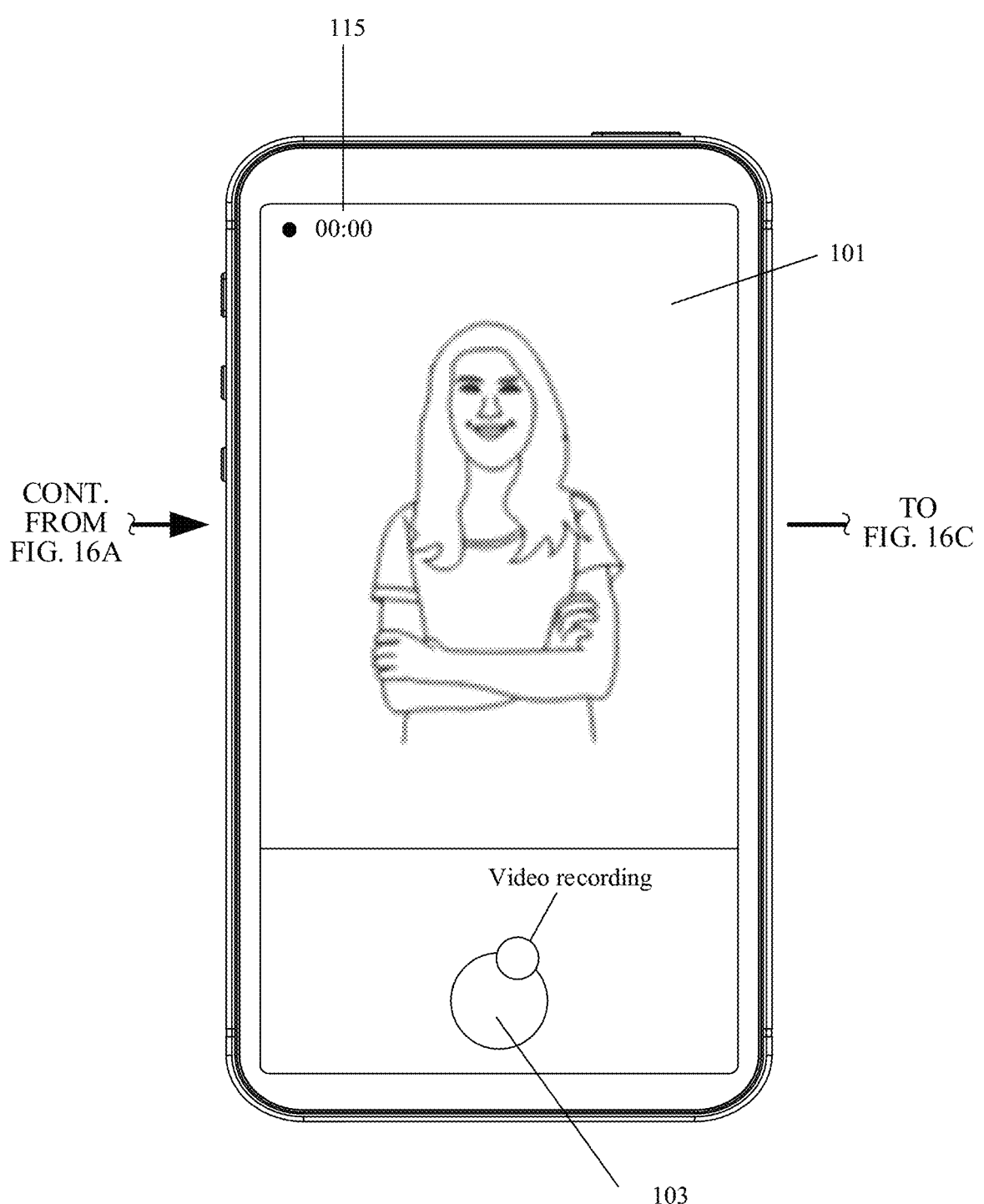
Figures 16B, 16C:
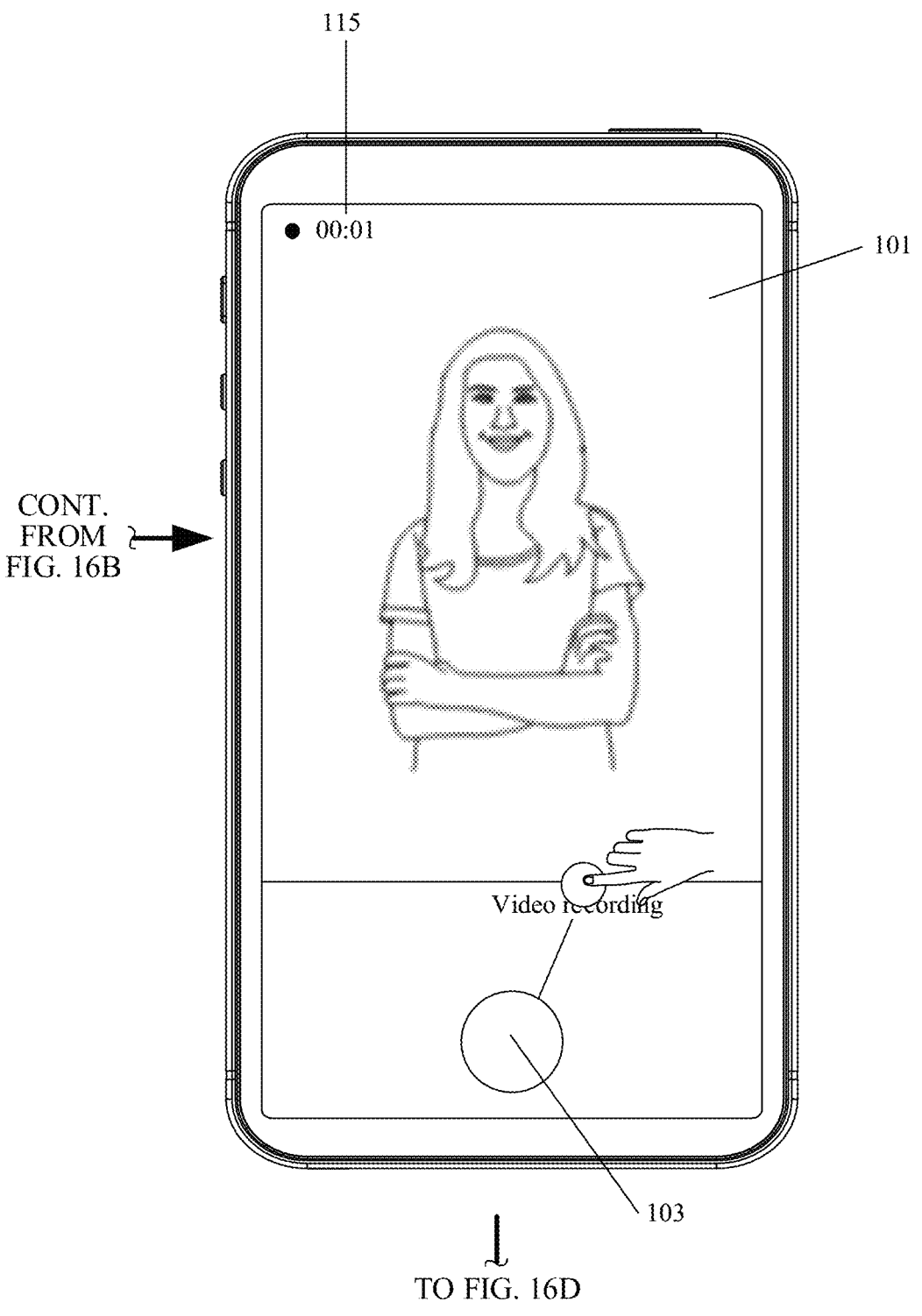
Figure 16D:
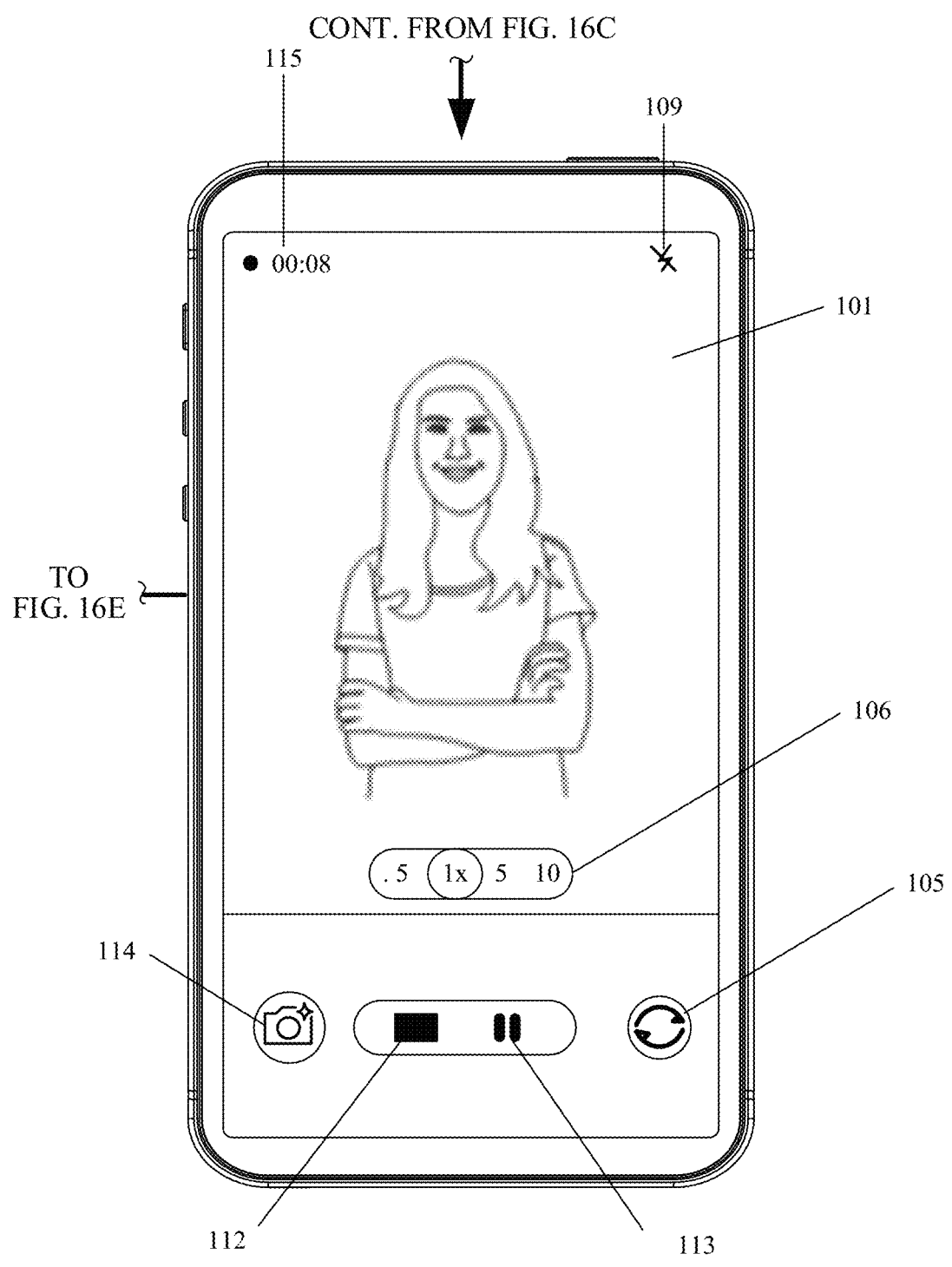
Figure 16E:
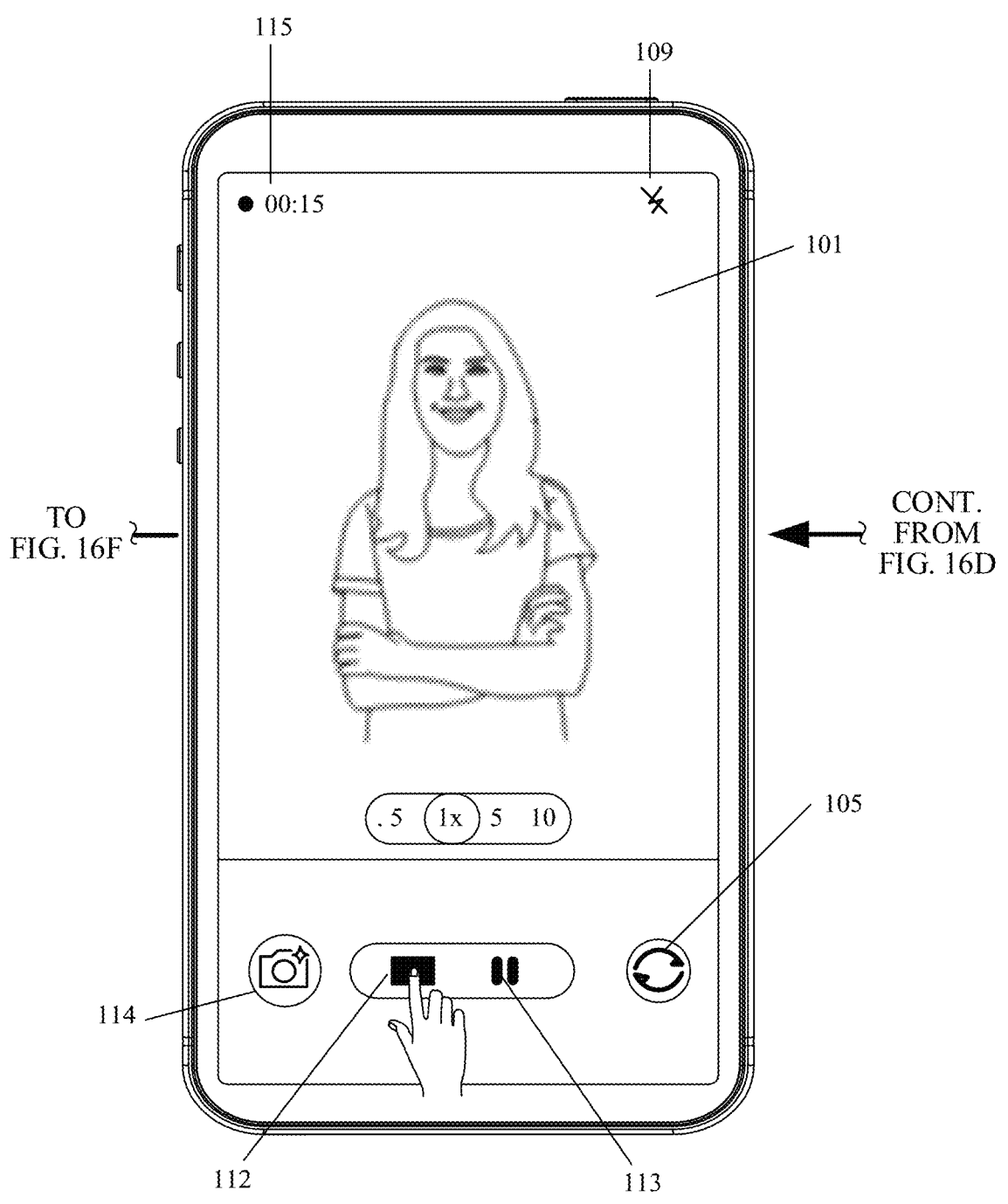
Figure 16F:
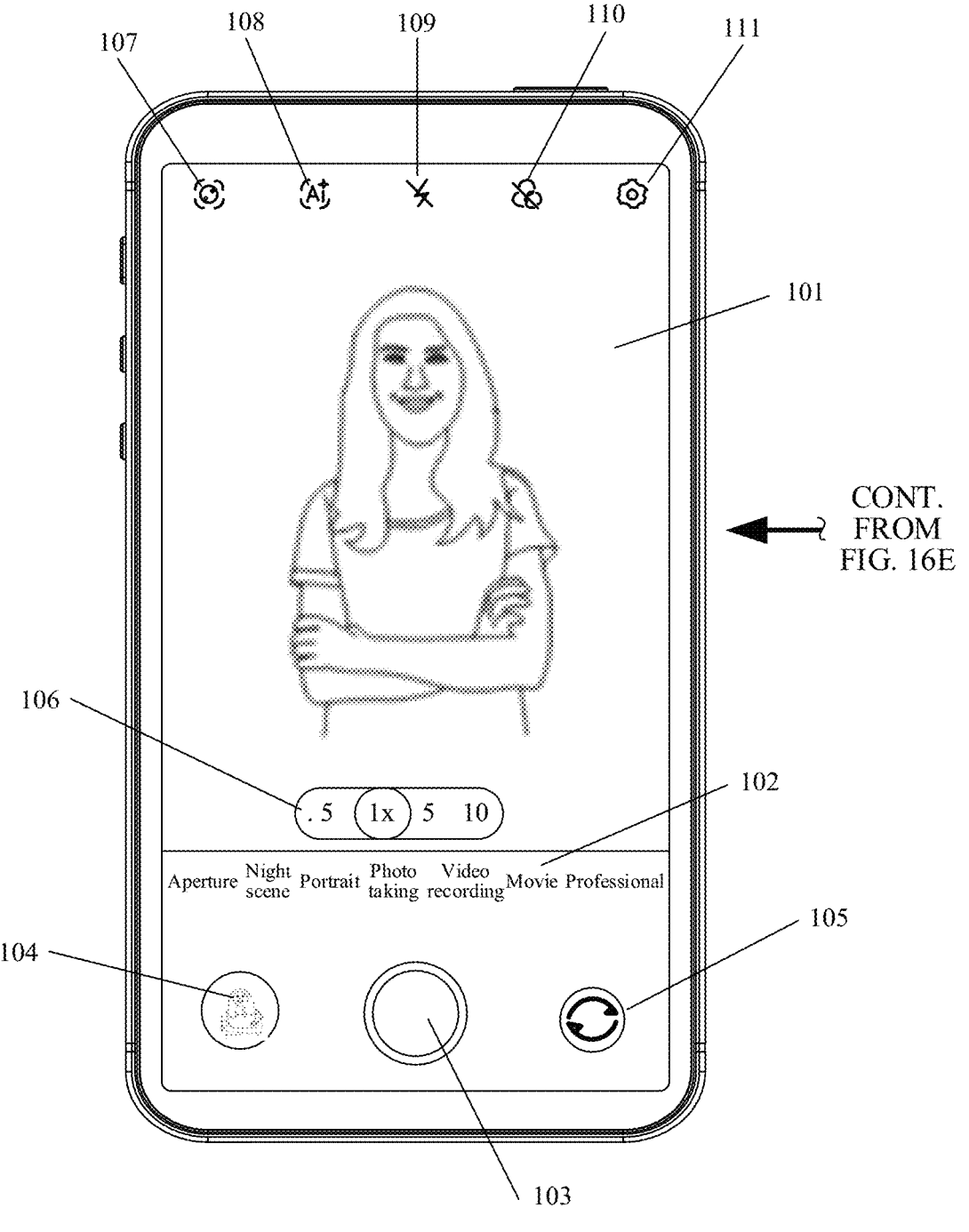
Figure 17A:
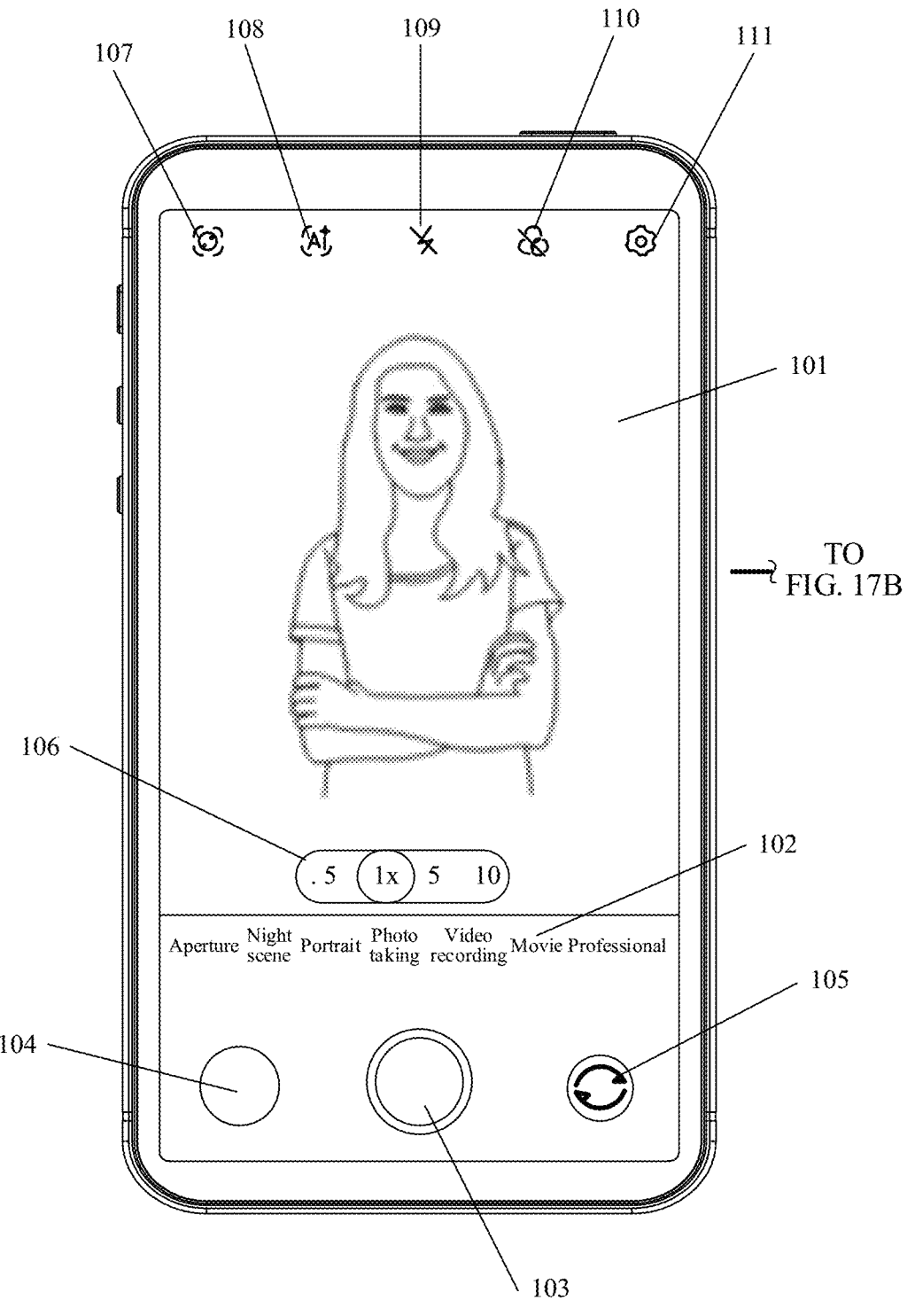
FIG. 17A to FIG. 17D are a schematic diagram of an interface provided by an embodiment of this application where a user performs a long-press operation to record videos.
Figure 17B:
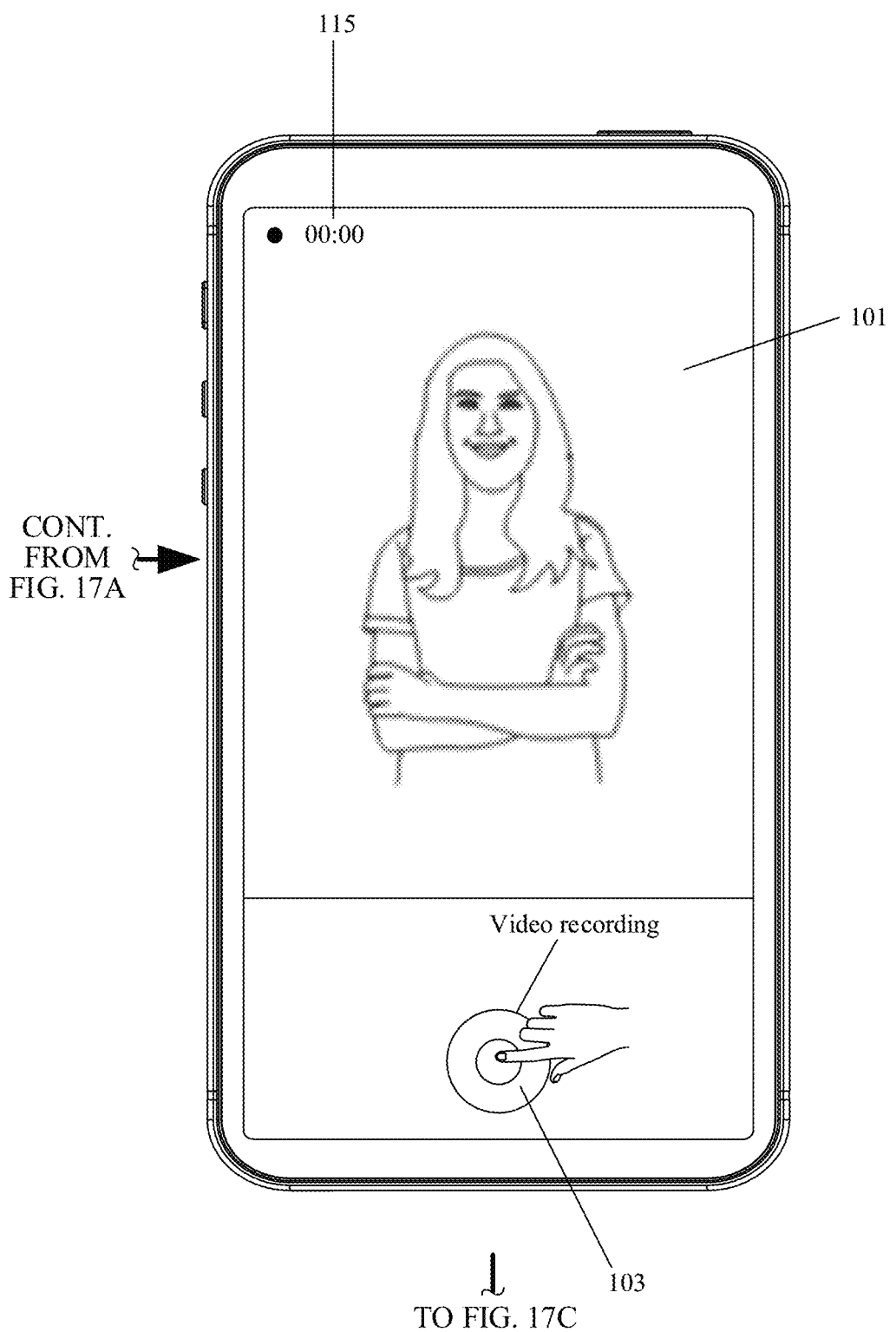
Figure 17C:
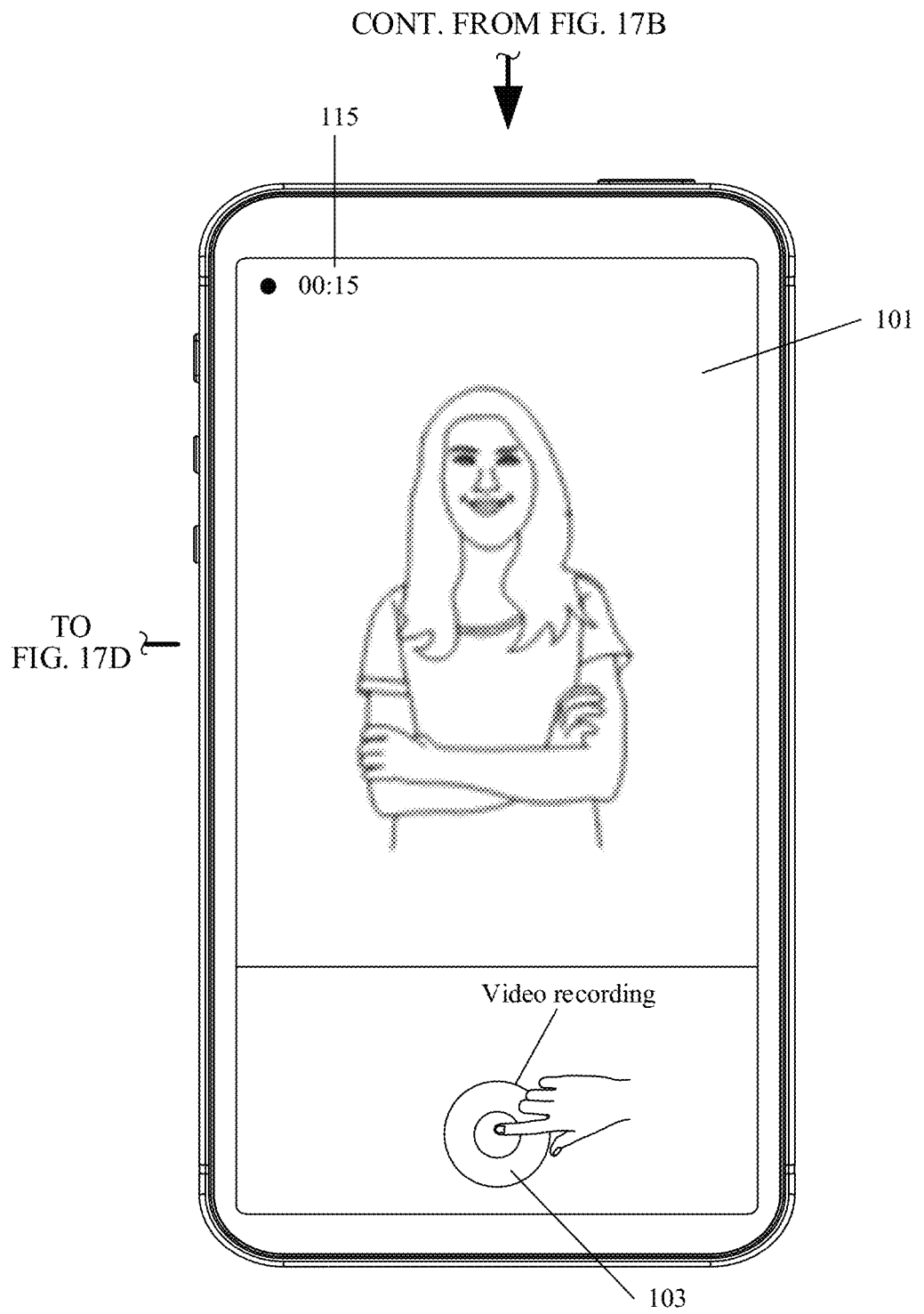
Figures 17C, 17D:
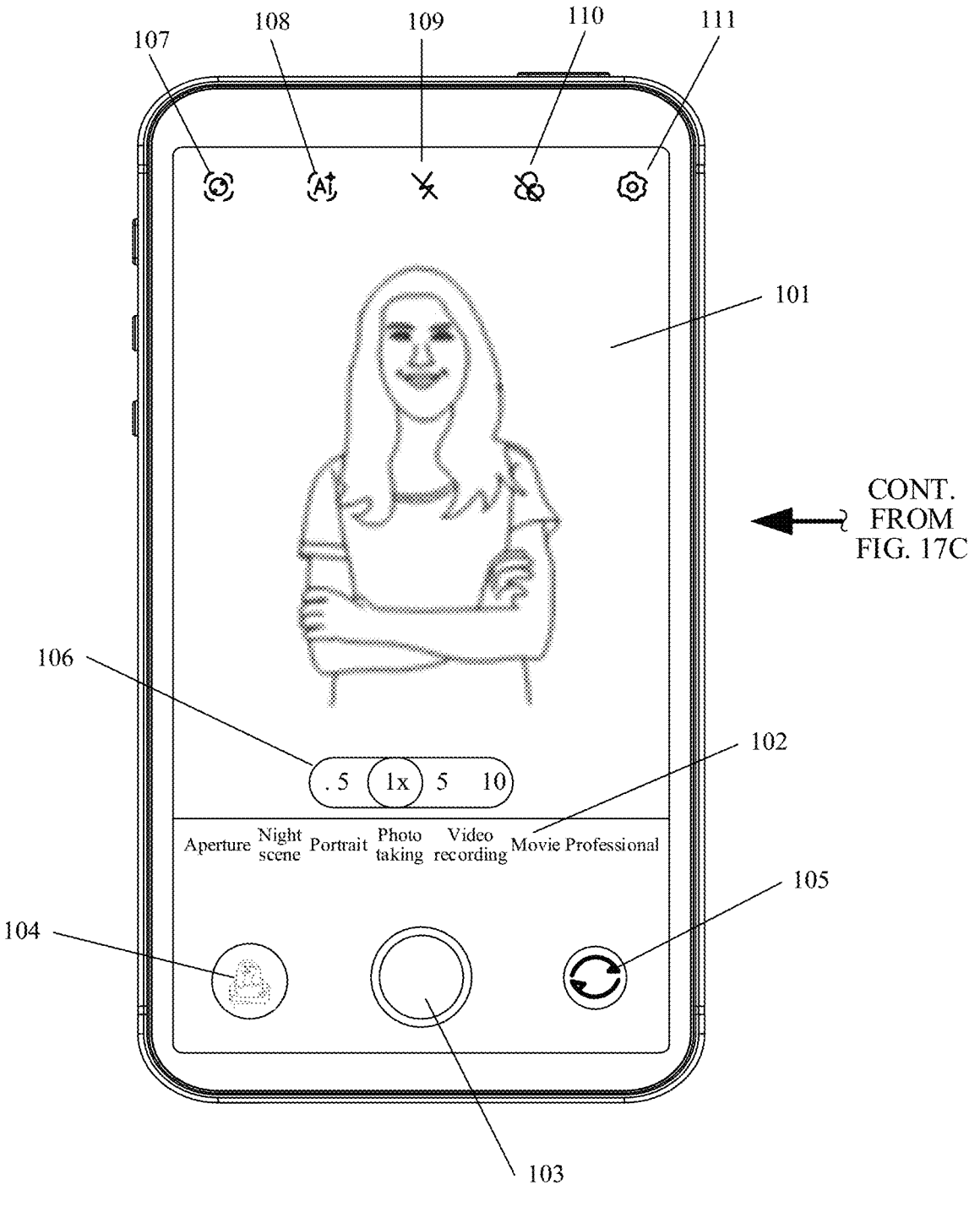

Exemplarily, the layout of a video recording interface as shown in FIG. 15 mainly includes: a view finder frame 101, a front and rear camera switch button 105, a camera focal length adjustment control 106, a flashlight control 109, a video recording control button 112, a pause button 113, a photo taking function switch button 114, and video recording time 115.

The viewfinder frame 101 is configured to display images captured in real time by a camera. By clicking the front and rear camera switch button 105, front and rear cameras can be switched. By swiping the camera focal length adjustment control 106, the camera focal length can be adjusted. By clicking the flashlight control 109, a flashlight can be controlled to be turned on or off. By clicking the video recording control button 112, a video recording function can start or end. By clicking the pause button 113, video recording can pause in a video recording process. By clicking the photo taking function switch button 114, switching from the video recording function to a photo taking function is achieved. The video recording time 115 is used to display the current video recording duration.

Exemplarily, FIG. 16A to FIG. 16F is a schematic diagram of a swiping video recording interface. As shown in 16a in FIG. 16A to FIG. 16F, a mobile phone opens a camera application in response to a user operation, and the mobile phone displays a first interface corresponding to a photo taking function label by default. A user does not select other function labels, but directly performs a swiping operation on the first interface corresponding to the current photo taking function label (as shown in 16a in FIG. 16A to FIG. 16F, a black arrow indicates a swiping direction). When the swiping operation swipes outward from an internal region of a shooting button and passes through the edge of the shooting button, or the user presses the shooting button for a long time and presses the shooting button without releasing it, as shown in 16b in FIG. 16A to FIG. 16F, the mobile phone determines, on the basis of a movement trajectory of a touch point of the swiping operation on a screen, that the current swiping direction points to a video recording function label, hides, in response to the operation of pressing the shooting button for a long time, interface elements unrelated to current video recording, such as various function labels, and a setting menu icon, displays a viewfinder frame and the shooting button (i.e., the second interface), displays words "video recording" at the position of an original video recording function label, and displays a connection line between the shooting button and the "video recording" label. The connection line can be used to prompt the user to swipe to the position of the "video recording" label to lock the video recording function, which means that video recording can continue while the user does not need to keep his/her finger on the screen. Meanwhile, video recording time is displayed on the left of the top of the viewfinder frame, and the number represents the cumulative duration of the current video recording (initial value of 00:00). As shown in 16c in FIG. 16A to FIG. 16F, when the swiping operation continues to swipe in a direction where text ("video recording") of the video recording function is located to enter a second region 502 and passes through words "video recording", the video recording time increases. As shown in 16d in FIG. 16A to FIG. 16F, a touch point corresponding to the swiping operation disappears (the user's finger leaves the current second interface), a third interface of the video recording function is displayed, the video recording function is locked, the video recording function continues running, and the video recording time increases. As shown in 16e in FIG. 16A to FIG. 16F, when the user clicks a video recording control button on the video recording interface, the mobile phone ends video recording and the video recording time stops increasing. As shown in 16f in FIG. 16A to FIG. 16F, when video recording ends, the mobile phone resumes displaying a fourth interface corresponding to a photo taking function label before video recording starts, and refreshes display content of a gallery thumbnail. The fourth interface and the first interface both belong to operation interfaces of the camera function. The differences between the fourth interface and the first interface lie in that the content displayed in the gallery thumbnail is different, and the content displayed in real time in the viewfinder frame is different. Since the content displayed in the gallery thumbnail and the content displayed in real time in the viewfinder frame dynamically change, the fourth interface can be directly regarded as the first interface at different time moments to a certain extent.

In one optional embodiment, when the mobile phone displays a camera function interface, if there exists a long-press operation in a control region (i.e., the first region) of the current camera function interface, a video recording function will be triggered to run. When the long-press operation fails, the mobile phone stops running the video recording function.

Exemplarily, FIG. 17A to FIG. 17D are a schematic diagram of a long-press video recording interface. As shown in 17a in FIG. 17A to FIG. 17D, after a mobile phone opens a camera application, the mobile phone displays a first interface corresponding to a photo taking function label by default. As shown in 17b in FIG. 17A to FIG. 17D, a user performs a long-press operation on a shooting button of the first interface, when long-press duration exceeds a preset duration threshold, the mobile phone hides interface elements unrelated to current video recording, such as various function labels, and a setting menu icon, only displays a viewfinder frame and the shooting button (i.e., the second interface), displays words "video recording" at the position of an original video recording function label, and generates a guide line. The guide line connects the words "video recording" with the edge of the shooting button. Meanwhile, video recording time is displayed on the left of the top of the viewfinder frame, and the number represents the cumulative duration of the current video recording (initial value of 00:00). As shown in 17c in FIG. 17A to FIG. 17D, the user continues performing the long-press operation, the mobile phone continues controlling the video recording function to run, and the video recording time increases. As shown in 17d in FIG. 17A to FIG. 17D, when the user releases his/her hand and ends the long-press operation, the mobile phone resumes displaying a third interface corresponding to a photo taking function label before video recording starts, and refreshes display content of a gallery thumbnail. The third interface and the first interface both belong to operation interfaces of the camera function. The differences between the third interface and the first interface lie in that the content displayed in the gallery thumbnail is different, and the content displayed in real time in the viewfinder frame is different.

In an implementation of the control condition in combination with the swiping operation of this embodiment, by performing angle range division on the second region, each function label is respectively associated with each angle range, making it convenient for the user to control various camera functions by ways of each angle range corresponding to the swiping operation. Compared to the existing camera function control manner, the camera function control manner of this application does not require deliberately remembering the direction of the swiping operation, and supports multi-directional swiping, which not only facilitates the user operation, but also is applicable to various camera functions, improving the use experience of the user for capturing pictures of wonderful moments.

Corresponding to the above embodiments, this application further provides an electronic device. The electronic device includes a memory configured to store a computer program and a processor configured to execute the computer program. When the computer program stored in the memory is executed by the processor, the electronic device is triggered to perform part or all of steps of the camera function control method in the above embodiment.

Figure 18:
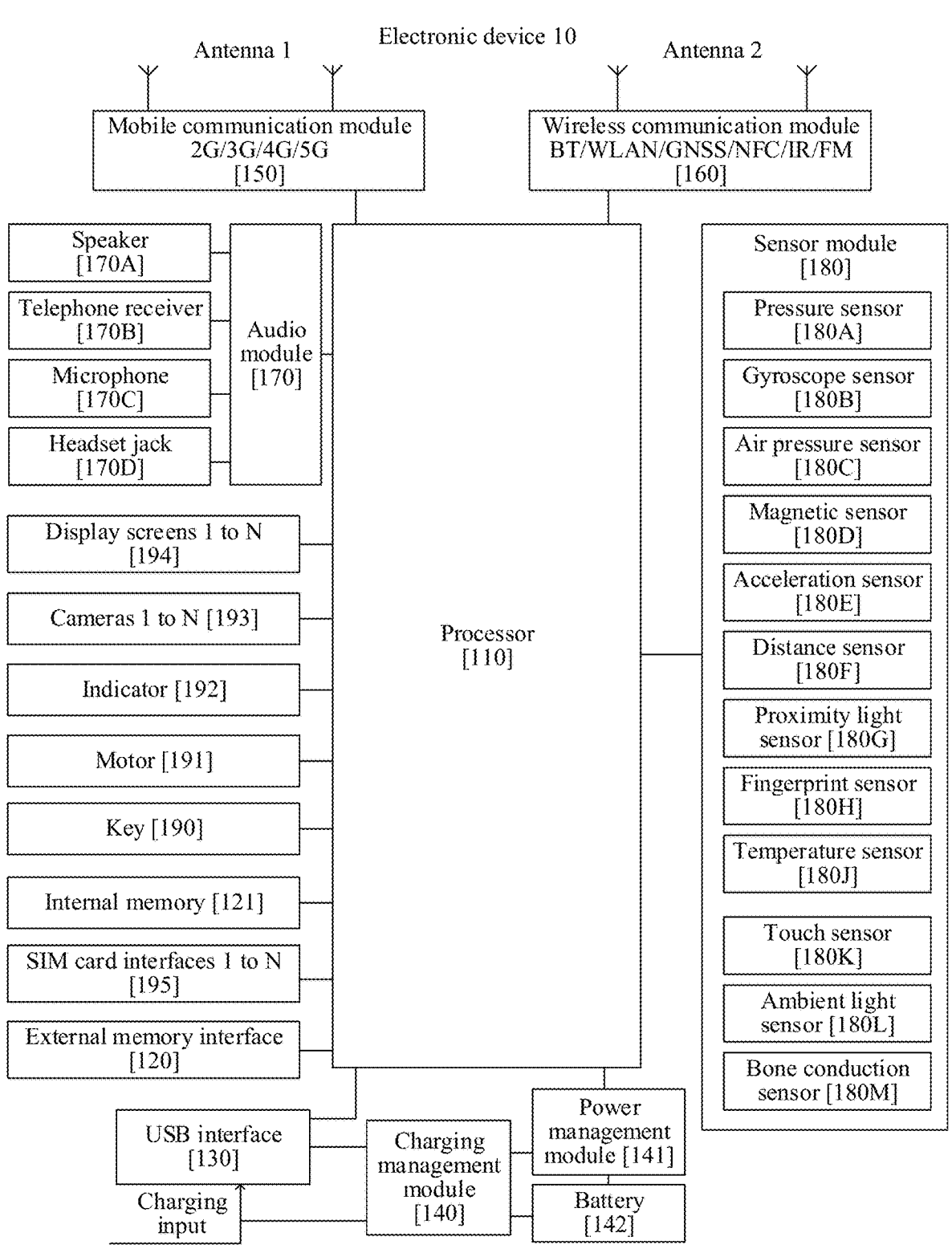
FIG. 18 is a schematic structural diagram of an electronic device provided by an embodiment of this application.

FIG. 18 is a schematic structural diagram of an electronic device provided by an embodiment of this application. With reference to FIG. 18, an electronic device 10 may include a processor 100, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a telephone receiver 170B, a microphone 170C, a headset jack 170D, a sensor module 180, a key 190, a motor 191, an indicator 192, a camera 193, a display screen 194, a subscriber identity module (subscriber identification module, SIM) card interface 195, and the like. The sensor module 180 may include a pressure sensor 180A, a gyroscope sensor 180B, an air pressure sensor 180C, a magnetic sensor 180D, an acceleration sensor 180E, a distance sensor 180F, a proximity light sensor 180G, a fingerprint sensor 180H, a temperature sensor 180J, a touch sensor 180K, an ambient light sensor 180L, a bone conduction sensor 180M, and the like.

It may be understood that an example structure in this embodiment of the present disclosure does not constitute a specific limitation on the electronic device 10. In some other embodiments of this application, the electronic device 10 may include more or fewer components than those shown in the figure, or some components may be combined, or some components may be divided, or different component arrangements may be used. The components shown in the figure may be implemented by hardware, software, or a combination of software and hardware.

The processor 100 may include one or more processing units. For example, the processor 100 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural network processing unit (neural network processing unit. NPU). Different processing units may be separate devices, or may be integrated into one or more processors.

The controller may generate an operation control signal according to instruction operation code and a timing signal, and control obtaining and executing of instructions.

A memory may be further arranged in the processor 100 to store instructions and data. In some embodiments, the memory in the processor 100 is a cache memory: The memory may store an instruction or data that is just used or cyclically used by the processor 100. If the processor 100 needs to use the instruction or the data again, the processor may directly invoke the instruction or the data from the memory, avoiding repeated access and reduces a waiting time of the processor 100, thereby improving system efficiency.

In some embodiments, the processor 100 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a bidirectional synchronous serial bus and includes a serial data line (serial data line, SDA) and a serial clock line (serial clock line, SCL). In some embodiments, the processor 100 may include a plurality of I2C buses. The processor 100 may be coupled to the touch sensor 180K, a charger, a flashlight, the camera 193, and the like by using different I2C bus interfaces respectively. For example, the processor 100 may be coupled to the touch sensor 180K by using the I2C interface, so that the processor 100 communicates with the touch sensor 180K by using the I2C bus interface, to implement a touch function of the electronic device 10.

The I2S interface may be configured to perform audio communication. In some embodiments, the processor 100 may include a plurality of I2S buses. The processor 100 may be coupled to the audio module 170 through the I2S bus to implement communication between the processor 100 and the audio module 170. In some embodiments, the audio module 170 may transmit an audio signal to the wireless communication module 160 through the I2S interface, to implement a function of answering a call through a Bluetooth headset.

The PCM interface may also be configured to perform audio communication, to sample, quantize, and encode an analog signal. In some embodiments, the audio module 170 may be coupled to the wireless communication module 160 through a PCM bus interface. In some embodiments, the audio module 170) may also transfer an audio signal to the wireless communication module 160 through the PCM interface, to implement the function of answering a call through the Bluetooth headset. Both the I2S interface and the PCM interface may be configured to perform audio communication.

The UART interface is a universal serial data bus and is configured to perform asynchronous communication. The bus may be a bidirectional communication bus. The bus converts data to be transmitted between serial communication and parallel communication. In some embodiments, the UART interface is usually configured to connect the processor 100 to the wireless communication module 160. For example, the processor 100 communicates with a Bluetooth module in the wireless communication module 160 by using a UART interface, to implement a Bluetooth function. In some embodiments, the audio module 170 may transfer an audio signal to the wireless communication module 160 through the UART interface, to implement a function of playing music through the Bluetooth headset.

The MIPI interface may be configured to connect the processor 100 to a peripheral device such as the display screen 194 or the camera 193. The MIPI interface includes a camera serial interface (camera serial interface, CSI), a display serial interface (display serial interface, DSI), and the like. In some embodiments, the processor 100 communicates with the camera 193 by using the CSI, to implement a shooting function of the electronic device 10. The processor 100 communicates with the display screen 194 by using the DSI, to implement a display function of the electronic device 10.

The GPIO interface may be configured by software. The GPIO interface may be configured as a control signal or a data signal. In some embodiments, the GPIO interface may be configured to connect the processor 100 to the camera 193, the display screen 194, the wireless communication module 160, the audio module 170, the sensor module 180, and the like. The GPIO interface may also be configured as an I2C interface, an I2S interface, a UART interface, a MIPI interface, and the like.

The USB interface 130 is an interface that complies with the USB standard specification, and may be specifically a Mini USB interface, a Micro USB interface, a USB Type C interface, and the like. The USB interface 130 may be configured to be connected to the charger to charge the electronic device 10, or may be used for data transmission between the electronic device 10 and a peripheral device. The USB interface may also be configured to connect to a headset to play audio through the headset. The interface may also be configured to connect to other electronic devices 10, such as an AR device.

It may be understood that an interface connection relationship between the modules illustrated in this embodiment of the present disclosure is merely an example for description, and does not constitute a limitation on a structure of the electronic device 10. In some other embodiments of this application, the electronic device 10 may also use an interface connection manner different from that in the above embodiment, or use a combination of a plurality of interface connection manners.

The charging management module 140 is configured to receive a charging input from the charger. The charger may be a wireless charger or a wired charger. In some embodiments of wired charging, the charging management module 140 may receive a charging input of the wired charger through the USB interface 130. In some embodiments of wireless charging, the charging management module 140 may receive a wireless charging input by using a wireless charging coil of the electronic device 10. When charging the battery 142, the charging management module 140) may further supply power to the electronic device 10 by using the power management module 141.

The power management module 141 is configured to be connected to the battery 142, the charging management module 140, and the processor 100. The power management module 141 receives an input of the battery 142 and/or the charging management module 140, to supply power to the processor 100, the internal memory 121, the display screen 194, the camera 193, the wireless communication module 160, and the like. The power management module 141 may also be configured to monitor parameters such as a battery capacity, a number of battery cycles, and a battery health status (power leakage and impedance). In some other embodiments, the power management module 141 may also be arranged in the processor 100. In some other embodiments, the power management module 141 and the charging management module 140 may also be arranged in a same device.

A wireless communication function of the electronic device 10 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 10 may be configured to cover one or more communication frequency bands. Different antennas may further be multiplexed to improve utilization of the antennas. For example, the antenna 1 may be multiplexed into a diversity antenna of a wireless local area network. In some other embodiments, the antennas may be used in combination with a tuning switch.

The mobile communication module 150 may provide a solution to wireless communication such as 2G/3G/4G/5G applied to the electronic device 10. The mobile communication module 150 may include at least one filter, a switch, a power amplifier, a low noise amplifier (low noise amplifier, LNA), and the like. The mobile communication module 150 may receive an electromagnetic wave by using the antenna 1, perform processing such as filtering and amplification on the received electromagnetic wave, and transfer the electromagnetic wave to the modem processor for demodulation. The mobile communication module 150 may further amplify a signal modulated by the modem processor, and convert the signal into an electromagnetic wave by using the antenna 1 for radiation. In some embodiments, at least some function modules of the mobile communication module 150 may be arranged in the processor 100. In some embodiments, at least some of the functional modules of the mobile communication module 150 may be arranged in a same device with at least some of modules of the processor 100.

The modem processor may include a modulator and a demodulator. The modulator is configured to modulate a low frequency baseband signal to be sent into a medium and high frequency signal. The demodulator is configured to demodulate the received electromagnetic wave signal into a low frequency baseband signal. Then the demodulator transfers the low frequency baseband signal obtained through demodulation to the baseband processor for processing. The low frequency baseband signal is processed by the baseband processor and then transferred to the application processor. The application processor outputs a sound signal through an audio device (which is not limited to the speaker 170A, the telephone receiver 170B, and the like), or displays an image or a video through the display screen 194. In some embodiments, the modem processor may be an independent device. In some other embodiments, the modem processor may be independent of the processor 100, and is arranged in a same device with the mobile communication module 150 or other function modules.

The wireless communication module 160 may provide a solution to wireless communication applied to the electronic device 10, for example, a wireless local area network (wireless local area networks, WLANs) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), and an infrared (infrared, IR) technology.

The wireless communication module 160 may be one or more components into which at least one communication processing module is integrated. The wireless communication module 160 receives an electromagnetic wave by using the antenna 2, performs frequency modulation on and filtering processing on an electromagnetic wave signal, and transmits a processed signal to the processor 100. The wireless communication module 160 may further receive a signal to be sent from the processor 100, perform frequency modulation on and amplify the signal to be sent, and convert the signal to be sent into an electromagnetic wave by using the antenna 2 for radiation.

In some embodiments, the antenna 1 is coupled to the mobile communication module 150 of the electronic device 10, and the antenna 2 is coupled to the wireless communication module 160, so that the electronic device 10 can communicate with a network and other devices by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time division code division multiple access (time division code division multiple access, TD-SCDMA), long term evolution (long term evolution, LTE), BT, a GNSS, a WLAN, NFC, FM, and/or an IR technology. The GNSS may include a global positioning system (global positioning system, GPS), a global navigation satellite system (global navigation satellite system, GLONASS), a beidou navigation satellite system (beidou navigation satellite system, BDS), a quasi-zenith satellite system (quasi-zenith satellite system, QZSS), and/or a satellite based augmentation system (satellite based augmentation system, SBAS).

The electronic device 10 implements a display function by using the GPU, the display screen 194, the application processor, and the like. The GPU is a microprocessor for image processing and connects the display screen 194 and the application processor. The GPU is configured to perform mathematical and geometric calculations, and is configured to render graphics. The processor 100 may include one or more GPUs, and execute program instructions to generate or change display information.

The display screen 194 is configured to display an image, a video, and the like. The display screen 194 includes a display panel. The display panel may adopt a liquid crystal display (liquid crystal display, LCD), an organic light-emitting diode (organic light-emitting diode, OLED), an active matrix organic light-emitting diode or an active-matrix organic light-emitting diode (active-matrix organic light-emitting diode, AMOLED), a flexible light-emitting diode (flexible light-emitting diode, FLED), Miniled, MicroLed, Micro-oLed, a quantum dot light-emitting diode (quantum dot light emitting diode, QLED), or the like. In some embodiments, the electronic device 10 may include one or N display screens 194. N is a positive integer greater than one.

The electronic device 10 may implement a shooting function by using the ISP, the camera 193, the video codec, the GPU, the display screen 194, the application processor, and the like.

The ISP is configured to process data fed back by the camera 193. For example, during taking photos, a shutter is opened. Light is transmitted to a photosensitive element of the camera through a lens, and an optical signal is converted into an electric signal. The photosensitive element of the camera transmits the electrical signal to the ISP for processing, and the electrical signal is converted into an image visible to a naked eye. The ISP may also perform algorithm optimization on noise, brightness, and skin tone of an image. The ISP may also optimize parameters such as exposure and color temperature of a shooting scene. In some embodiments, the ISP may be arranged in the camera 193.

The camera 193 is configured to capture a still image or video. An optical image is generated for an object by using a lens and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transfers the electrical signal to the ISP, to convert the electrical signal into a digital image signal. The ISP outputs the digital image signal to the DSP for processing. The DSP converts the digital image signal into an image signal in standard RGB and YUV formats. In some embodiments, the electronic device 10 may include one or N cameras 193, and N is a positive integer greater than 1.

The digital signal processor is configured to process a digital signal, and in addition to a digital image signal, the digital signal processor may further process other digital signals. For example, when the electronic device 10 performs frequency selection, the digital signal processor is configured to perform Fourier transform and the like on frequency energy.

The video codec is configured to compress or decompress a digital video. The electronic device 10 may support one or more video codecs. In this way, the electronic device 10 may play or record videos in a plurality of encoding formats, for example, moving picture experts group (moving picture experts group, MPEG) 1, MPEG 2, MPEG 3, and MPEG 4.

An NPU is a neural network (neural network, NN) computing processor. By using the structure of a biological neural network, such as, a transmission mode between neurons of a human brain, the NPU can process input information quickly and learn by itself continuously. The NPU may be configured to implement an application such as intelligent cognition of the electronic device 10, for example, image recognition, facial recognition, voice recognition, and text understanding.

The internal memory 121 may include one or more random access memories (random access memories, RAMs) and one or more non-volatile memories (non-volatile memories, NVMs).

The random access memory may include a static random access memory (static random access memory, SRAM), a dynamic random access memory (dynamic random access memory, DRAM), a synchronous dynamic random access memory (synchronous dynamic random access memory, SDRAM), a double data rate synchronous dynamic random access memory (double data rate synchronous dynamic random access memory, DDR SDRAM, for example, a fifth generation DDR SDRAM is generally referred to as a DDR5 SDRAM), and the like.

The non-volatile memory may include a magnetic disk storage device and a flash memory.

The flash memory may be divided into NOR FLASH, NAND FLASH, 3D NAND FLASH, and the like according to an operation principle, or may be divided into a single-level cell (single-level cell, SLC), a multi-level cell (multi-level cell, MLC), a triple-level cell (triple-level cell, TLC), a quad-level cell (quad-level cell, QLC), and the like according to an electrical potential level of a storage unit, or may be divided into a universal flash storage (universal flash storage, UFS), an embedded multimedia card, (embedded multimedia card, eMMC), and the like according to a storage specification.

The random access memory may be directly read and written by the processor 100, may be configured to store executable programs (for example, machine instructions) of an operating system or other running programs, or may be configured to store data of users and applications.

The non-volatile memory may also store the executable programs, the data of the users and the applications, and the like, and may be loaded into the random access memory in advance for the processor 100 to perform direct reading and writing.

The external memory interface 120 may be configured to connect to an external non-volatile memory, to expand a storage capability of the electronic device 10. The external non-volatile memory communicates with the processor 100 by using the external memory interface 120, to implement a data storage function, for example storing a file such as a music or a video in the external non-volatile memory.

The electronic device 10 may implement an audio function such as music playing or sound recording by using the audio module 170, the speaker 170A, the telephone receiver 170B, the microphone 170C, the headset jack 170D, the application processor, and the like The audio module 170 is configured to convert digital audio information into an analog audio signal output, and is also configured to convert an analog audio input into a digital audio signal. The audio module 170 may further be configured to encode and decode audio signals. In some embodiments, the audio module 170 may be arranged in the processor 100, or some function modules of the audio module 170 are arranged in the processor 100.

The speaker 170A, also referred to as "horn", is configured to convert an electrical audio signal into a sound signal.

Music may be listened to or a hands-free call may be answered by using the speaker 170A in the electronic device 10.

The telephone receiver 170B, also referred to as "handset", is configured to convert an electrical audio signal into a sound signal. When the electronic device 10 is configured to answer a call or receive voice information, the telephone receiver 170B may be put close to a human ear to receive a voice.

The microphone 170C, also referred to as "mouthpiece" or "mike", is configured to convert a sound signal into an electrical signal. When making a call or sending voice information, a user may make a sound by approaching the microphone 170C through the mouth of the user, to input a sound signal into the microphone 170C. At least one microphone 170C may be arranged in the electronic device 10. In some other embodiments, two microphones 170C may be arranged in the electronic device 10, to acquire a sound signal and implement a noise reduction function. In some other embodiments, three, four, or more microphones 170C may also be arranged in the electronic device 10, to acquire a sound signal, implement noise reduction, recognize a sound source, implement a directional sound recording function, and the like.

The headset jack 170D is configured to be connected to a wired headset. The headset jack 170D may be a USB interface 130, or may be a 3.5 mm open mobile electronic device 10 platform (open mobile terminal platform, OMTP) standard interface or cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be arranged on the display screen 194. There are many types of pressure sensors 180A, such as a resistive pressure sensor, an inductive pressure sensor, and a capacitive pressure sensor. The capacitive pressure sensor may be a parallel plate including at least two conductive materials. In a case that a force is applied onto the pressure sensor 180A, a capacitance between electrodes changes. The electronic device 10 determines a pressure strength based on a change in the capacitance. When a touch operation is performed on the display screen 194, the electronic device 10 detects intensity of the touch operation according to the pressure sensor 180A. The electronic device 10 may also calculate a touch position based on a detection signal of the pressure sensor 180A. In some embodiments, touch operations that are performed on a same touch position but have different touch operation intensities may correspond to different operation instructions. For example, when a touch operation whose touch operation strength is less than a first pressure threshold is performed on an SMS application icon, an instruction of checking an SMS is executed. When a touch operation whose touch operation strength is greater than or equal to a first pressure threshold is performed on an SMS application icon, an instruction of creating a new SMS is executed.

The gyroscope sensor 180B may be configured to determine a motion posture of the electronic device 10. In some embodiments, an angular velocity of the electronic device 10 around three axes (i.e., x, y, and z axes) may be determined through the gyroscope sensor 180B. The gyroscope sensor 180B may be configured to prevent jitter during shooting. Exemplarily, when the shutter is pressed, the gyroscope sensor 180B detects an angle at which the electronic device 10 jitters, and calculates, based on the angle, a distance for which a lens module needs to compensate, and allows the lens to cancel the jitter of the electronic device 10 through reverse motion, thereby preventing jitter. The gyroscope sensor 180B may also be used in navigation and a motion sensing game scenario.

The air pressure sensor 180C is configured to measure an air pressure. In some embodiments, the electronic device 10 calculates an altitude by using an air pressure value measured by the air pressure sensor 180C, to assist in positioning and navigation.

The magnetic sensor 180D includes a Hall sensor. The electronic device 10 may detect opening and closing of a flip leather case by using the magnetic sensor 180D. In some embodiments, when the electronic device 10 is a flip phone, the electronic device 10 may detect opening and closing of a flip cover based on the magnetic sensor 180D. Further, features such as automatic unlocking of the flip cover are set based on the detected opening and closing states of the leather case or opening and closing states of the flip cover.

The acceleration sensor 180E may detect an acceleration value of the electronic device 10 in each direction (generally three axes). When the electronic device 10 is stationary, a magnitude and a direction of a gravity may be detected. The acceleration sensor may be further configured to recognize a posture of the electronic device 10, and is applied to switching between landscape orientation and portrait orientation, and applied to an application such as a pedometer.

The distance sensor 180F is configured to measure a distance. The electronic device 10 may measure a distance by infrared light or laser. In some embodiments, in a shooting scenario, the electronic device 10 may measure a distance by using the distance sensor 180F, to implement quick focusing.

The proximity light sensor 180G may include, for example, a light-emitting diode (LED) and a light detector, for example, a photodiode. The light-emitting diode may be an infrared light-emitting diode. The electronic device 10 emits infrared light outwards by using the light-emitting diode. The electronic device 10 detects infrared reflected light from a nearby object by using the photodiode. When sufficient reflected light is detected, it may be determined that there exists an object near the electronic device 10. When insufficient reflected light is detected, the electronic device 10 may determine that there exists no object near the electronic device 10. The electronic device 10 may detect, by using the proximity light sensor 180G, that a user holds the electronic device 10 to approach to an ear for a call, so as to automatically turn off screen to save power. The proximity light sensor 180G may be further configured to automatically unlock and lock the screen in a leather case mode and a pocket mode.

The ambient light sensor 180L is configured to perceive ambient light brightness. The electronic device 10 may adaptively adjust a luminance of the display screen 194 according to the perceived ambient light brightness. The ambient light sensor 180L may also be configured to automatically adjust white balance during taking photos. The ambient light sensor 180L may also cooperate with the proximity light sensor 180G to detect whether the electronic device 10 is in a pocket to prevent a false touch.

The fingerprint sensor 180H is configured to acquire a fingerprint. The electronic device 10 may implement fingerprint unlock, application lock accessing, fingerprint photo taking, fingerprint call answering, and the like by using a feature of the acquired fingerprint.

The temperature sensor 180J is configured to detect temperature. In some embodiments, the electronic device 10 executes a temperature processing policy by using a temperature detected by the temperature sensor 180J. For example, when a temperature reported by the temperature sensor 180J exceeds a threshold, the electronic device 10 reduces performance of a processor near the temperature sensor 180J, to reduce power consumption and implement heat protection. In some other embodiments, when the temperature is lower than another threshold, the electronic device 10 heats the battery 142, to avoid an abnormal shutdown of the electronic device 10 caused by low temperature. In some other embodiments, when the temperature is lower than still another threshold, the electronic device 10 boosts an output voltage of the battery 142 to prevent abnormal shutdown caused by low temperature.

The touch sensor 180K is also referred to as a "touch device". The touch sensor 180K may be arranged on the display screen 194. The touch sensor 180K and the display screen 194 form a touchscreen, also referred to as "touch control screen". The touch sensor 180K is configured to detect a touch operation on or near the touch sensor. The touch sensor may transfer the detected touch operation to the application processor to determine a type of a touch event. A visual output related to the touch operation may be provided by using the display screen 194. In some other embodiments, the touch sensor 180K may also be arranged on a surface of the electronic device 10 at a position different from that of the display screen 194.

The bone conduction sensor 180M may acquire a vibration signal. In some embodiments, the bone conduction sensor 180M may acquire a vibration signal of an acoustic portion vibrating bone of a human body. The bone conduction sensor 180M may also come into contact with a human pulse to receive a blood pressure pulsation signal. In some embodiments, the bone conduction sensor 180M may also be arranged in the headset, to be combined into a bone conduction headset. The audio module 170 may acquire a voice signal through parsing based on the vibration signal of the acoustic portion vibrating bone, which is acquired by the bone conduction sensor 180M, to implement a voice function. The application processor may parse heart rate information based on the blood pressure pulsation signal acquired by the bone conduction sensor 180M, to implement a heart rate measurement function.

The key 190 includes a power key, a volume key, and the like. The key 190 may be a mechanical key, or a touch key. The electronic device 10 may receive a key input, and generate a key signal input related to user setting and function control of the electronic device 10.

The motor 191 may generate a vibration prompt. The motor 191 may be used for an incoming call vibration prompt and a touch vibration feedback. For example, touch operations performed on different applications (for example, photo taking and audio playing) may correspond to different vibration feedback effects. The motor 191 may also correspond to different vibration feedback effects for touch operations applied to different regions of the display screen 194. Different application scenarios (for example, a time reminder, information receiving, an alarm clock, and a game) may further correspond to different vibration feedback effects. Customization of a touch vibration feedback effect may also be supported.

The indicator 192 may be an indicator light that may be configured to indicate a charging state and a power change, or may be configured to indicate a message, a missed call, a notification, and the like.

The SIM card interface 195 is configured to connect an SIM card. The SIM card may be inserted into the SIM card interface 195 or plugged from the SIM card interface 195, to come into contact with or be separated from the electronic device 10. The electronic device 10 may support one or N SIM card interfaces, where N is a positive integer greater than 1. The SIM card interface 195 can support a Nano SIM card, a Micro SIM card, an SIM card, and the like. A plurality of frame cards may be simultaneously inserted into the same SIM card interface 195. Types of the plurality of frame cards may be the same or different. The SIM card interface 195 may further be compatible with different types of SIM cards. The SIM card interface 195 may also be compatible with an external memory card. The electronic device 10 interacts with a network by using the SIM card, to implement functions such as a call and data communication. In some embodiments, the electronic device 10 uses an eSIM, that is, an embedded SIM card. An eSIM card may be embedded in the electronic device 10 and cannot be separated from the electronic device 10.

This embodiment further provides a computer storage medium. The computer storage medium stores computer instructions. The computer instructions, when run on an electronic device 10, make the electronic device 10 to perform the above relevant method steps to implement the camera function control method in the above embodiment.

This embodiment further provides a computer program product. When the computer program product runs on a computer, the computer is made to perform the above related steps to implement the camera function control method in the above embodiment.

In addition, an embodiment of this application further provides an apparatus. The apparatus may be specifically a chip, a component, or a module. The apparatus may include a processor and a memory that are connected. The memory is configured to store computer-executable instructions. When the apparatus runs, the processor may execute the computer-executable instructions stored in the memory, to make the chip perform the camera function control method in the above method embodiments.

The electronic device, the computer storage medium, the computer program product, or the chip provided in the embodiments of this application may be configured to perform the corresponding method provided above. Therefore, for beneficial effects that can be achieved, please refer to the beneficial effects of the corresponding method provided above. Details are not described herein again.

The above descriptions about implementations allow a person skilled in the art to understand that, for the purpose of convenient and brief description, division of the above function modules is taken as an example for illustration. In actual application, the above functions can be allocated to different modules and implemented according to requirements, that is, an inner structure of an apparatus is divided into different function modules to implement all or part of the functions described above.

In the several embodiments provided in this application, it is to be understood that the disclosed apparatus and method may be implemented in other manners. For example, the apparatus embodiment described above is merely exemplary. For example, the division of module or unit is merely a logical function division and may be other division manners during actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separate, and components displayed as units may be one or more physical units, may be located in one place, or may be distributed in a plurality of different places. Some or all of the units may be selected according to actual needs to achieve the objectives of the solutions of the embodiments.

In addition, functional units in the embodiments of this application may be integrated into one processing unit, or each of the units may be physically separated, or two or more units may be integrated into one unit. The integrated unit may be implemented in the form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in the embodiments of this application essentially, or the part contributing to the prior art, or all or some of the technical solutions may be implemented in the form of a software product. The software product is stored in a storage medium and includes several instructions for making a device (which may be a single-chip microcomputer, a chip, or the like) or a processor (processor) perform all or some of the steps of the methods described in the embodiments of this application. The storage medium described above includes: any medium that can store program codes, such as a USB flash disk, a mobile hard disk, a Read-Only Memory (Read-Only Memory, ROM), a Random Access Memory (Random Access Memory, RAM), a magnetic disk, or an optical disc.

Finally, it is to be noted that the above embodiments are only intended for describing the technical solutions of this application but not for limiting this application. Although this application is described in detail with reference to the preferred embodiments, a person of ordinary skill in the art should understand that modifications or equivalent replacements can be made to the technical solutions of this application without departing from the spirit and scope of the technical solutions of this application.

The invention claimed is:

1. A camera function control method, applied to an electronic device, wherein the electronic device comprises a plurality of camera functions, a first interface corresponding to the camera function comprises a first region and a second region, the first region is a shooting button of a camera, the second region is a region other than the shooting button of the camera, the second region comprises a plurality of function labels for identifying the camera function, and the camera function control method comprises:

displaying the first interface of a first camera function of the electronic device;

receiving a first operation of a user on the first interface of the first camera function, wherein the first operation comprises a swiping operation;

determining, when the swiping operation enters the second region from the first region on the first interface of the first camera function, whether a swiping direction corresponding to the swiping operation points to a first function label;

if the swiping direction points to the first function label, switching to display a second interface of a second camera function identified by the first function label, wherein the second interface comprises a text indicating the second camera function, a display position of the text is the same as a display position of the first function label; and controlling the second camera function to run in response to the swiping operation that continues to swipe in a direction in which the text of the second camera function is located on the second interface of the second camera function.

2. The camera function control method according to claim 1, wherein the second region comprises a plurality of non-overlapping sub-regions, each sub-region covers one function label, and division of each sub-region is related to a relative position between the shooting button and each function label.

3. The camera function control method according to claim 2, wherein the determining, when the swiping operation enters the second region from the first region on the first interface of the first camera function, whether a swiping direction corresponding to the swiping operation points to a first function label comprises:

when the swiping operation enters the second region from the first region on the first interface of the first camera function, determining whether the swiping operation enters a target sub-region of the second region; and if the swiping operation enters the target sub-region of the second region, determining that a function label covered by the target sub-region is the first function label to which the swiping direction corresponding to the swiping operation points.

4. The camera function control method according to claim 1, wherein the second region corresponds to a plurality of non-overlapping angle ranges, each angle range covers one function label, and division of each angle range is related to the relative position between the shooting button and each function label.

5. The camera function control method according to claim 4, wherein the determining, when the swiping operation enters the second region from the first region on the first interface of the first camera function, whether a swiping direction corresponding to the swiping operation points to a first function label comprises:

when the swiping operation enters the second region from the first region on the first interface of the first camera function, calculating an included angle between the swiping direction corresponding to the swiping operation and a preset reference direction; and if the angle range comprises the included angle, determining that a function label covered by the angle range comprising the included angle is the first function label to which the swiping direction corresponding to the swiping operation points.

6. The camera function control method according to claim 1, further comprising:

when switching to display the second interface of the second camera function identified by the first function label, hiding related controls displayed on the first interface of the first camera function, wherein the related controls comprise all function labels displayed on the first interface of the first camera function.

7. The camera function control method according to claim 1, wherein the first operation further comprises a long-press operation, and the method further comprises:

when there exists the long-press operation in the first region on the first interface of the first camera function, determining whether long-press duration of the long-press operation reaches a preset duration threshold;

if the long-press duration of the long-press operation reaches the preset duration threshold, switching to display a second interface of a video recording function; and when the long-press duration of the long-press operation exceeds the duration threshold on the second interface of the video recording function, controlling the video recording function to run.

8. The camera function control method according to claim 7, further comprising:

when the long-press operation fails on the second interface of the video recording function, stopping running the video recording function and resuming displaying the first interface of the first camera function.

9. The camera function control method according to claim 1, wherein the function label is swipeable, and when the user swipes any function label on the first interface of the first camera function, display positions of all the function labels change.

10. The camera function control method according to claim 9, further comprising:

obtaining a second function label selected by the user by swiping the function label on the first interface of the first camera function; and switching to display a first interface of a third camera function identified by the second function label.

11. The camera function control method according to claim 1, wherein the second camera function comprises a burst shooting function, the first function label comprises a photo taking function label, and the second interface of the second camera function comprises: a text of the burst shooting function;

the controlling the second camera function to run in response to the swiping operation that continues to swipe in a direction in which the text of the second camera function is located on the second interface of the second camera function comprises:

controlling the burst shooting function to continuously capture photos in response to the swiping operation that continues to swipe in a direction in which the text of the burst shooting function is located on a second interface of the burst shooting function; and the camera function control method further comprises:

when the swiping operation fails or a number of continuously taken photos reaches a preset threshold, stopping running the burst shooting function and resuming displaying the first interface of the first camera function, wherein the number of continuously taken photos is related to duration of the swiping operation, and the duration comprises swiping duration and staying duration of the swiping operation on the second interface of the burst shooting function.

12. The camera function control method according to claim 1, wherein the second camera function comprises a portrait function, the first function label comprises a portrait function label, and the controlling the second camera function to run in response to the swiping operation that continues to swipe in a direction in which the text of the second camera function is located on the second interface of the second camera function comprises:

controlling the portrait function to take a photo in response to the swiping operation that continues to swipe in a direction in which text of the portrait function is located on the second interface of the portrait function; and invoking an image processing program adapted to the portrait function to perform image processing on the generated photo and saving a processed photo.

13. The camera function control method according to claim 1, wherein the second camera function comprises a video recording function, the first function label comprises a video recording function label, and the controlling the second camera function to run in response to the swiping operation that continues to swipe in a direction in which the text of the second camera function is located on the second interface of the second camera function comprises:

controlling the video recording function to record a video in response to the swiping operation that continues to swipe in a direction in which text of the video recording function is located on the second interface of the video recording function; and when the swiping operation fails, switching to display a third interface of the video recording function and continuing to keep the video recording function running.

14. The camera function control method according to claim 13, further comprising:

when a user-triggered command for stopping video recording is received on the third interface of the video recording function, stopping running the video recording function and resuming displaying the first interface of the first camera function.

15. An electronic device, comprising:

a processor and a memory, and the processor is configured to invoke a computer program in the memory to perform a camera function control method, the method comprising:

displaying the first interface of a first camera function of the electronic device, wherein the electronic device comprises a plurality of camera functions, a first interface corresponding to the camera function comprises a first region and a second region, the first region is a shooting button of a camera, the second region is a region other than the shooting button of the camera, the second region comprises a plurality of function labels for identifying the camera function;

receiving a first operation of a user on the first interface of the first camera function, wherein the first operation comprises a swiping operation;

determining, when the swiping operation enters the second region from the first region on the first interface of the first camera function, whether a swiping direction corresponding to the swiping operation points to a first function label;

if the swiping direction points to the first function label, switching to display a second interface of a second camera function identified by the first function label, wherein the second interface comprises a text indicating the second camera function, a display position of the text is the same as a display position of the first function label; and controlling the second camera function to run in response to the swiping operation that continues to swipe in a direction in which the text of the second camera function is located on the second interface of the second camera function.

16. The electronic device according to claim 15, wherein the second region comprises a plurality of non-overlapping sub-regions, each sub-region covers one function label, and division of each sub-region is related to a relative position between the shooting button and each function label.

17. The electronic device according to claim 16, wherein the determining, when the swiping operation enters the second region from the first region on the first interface of the first camera function, whether a swiping direction corresponding to the swiping operation points to a first function label comprises:

when the swiping operation enters the second region from the first region on the first interface of the first camera function, determining whether the swiping operation enters a target sub-region of the second region; and if the swiping operation enters the target sub-region of the second region, determining that a function label covered by the target sub-region is the first function label to which the swiping direction corresponding to the swiping operation points.

18. The electronic device according to claim 15, wherein the second region corresponds to a plurality of non-overlapping angle ranges, each angle range covers one function label, and division of each angle range is related to the relative position between the shooting button and each function label.

19. The electronic device according to claim 18, wherein the determining, when the swiping operation enters the second region from the first region on the first interface of the first camera function, whether a swiping direction corresponding to the swiping operation points to a first function label comprises:

when the swiping operation enters the second region from the first region on the first interface of the first camera function, calculating an included angle between the swiping direction corresponding to the swiping operation and a preset reference direction; and if the angle range comprises the included angle, determining that a function label covered by the angle range comprising the included angle is the first function label to which the swiping direction corresponding to the swiping operation points.

20. A non-transitory computer-readable storage medium storing computer instructions, which when run on an electronic device, cause the electronic device to perform a camera function control method, the method comprising:

displaying the first interface of a first camera function of the electronic device, wherein the electronic device comprises a plurality of camera functions, a first interface corresponding to the camera function comprises a first region and a second region, the first region is a shooting button of a camera, the second region is a region other than the shooting button of the camera, the second region comprises a plurality of function labels for identifying the camera function:

receiving a first operation of a user on the first interface of the first camera function, wherein the first operation comprises a swiping operation;

determining, when the swiping operation enters the second region from the first region on the first interface of the first camera function, whether a swiping direction corresponding to the swiping operation points to a first function label;

if the swiping direction points to the first function label, switching to display a second interface of a second camera function identified by the first function label, wherein the second interface comprises a text indicating the second camera function, a display position of the text is the same as a display position of the first function label; and controlling the second camera function to run in response to the swiping operation that continues to swipe in a direction in which the text of the second camera function is located on the second interface of the second camera function.

* * * * *